US012661676B2

(12) United States Patent
Jordan

(10) Patent No.: US 12,661,676 B2
(45) Date of Patent: Jun. 23, 2026

(54) CLEANING NOZZLE FOR CRYOGENIC FLUID FUELING RECEPTACLE

(71) Applicant: Kevin Jordan, Gibsonville, NC (US)

(72) Inventor: Kevin Jordan, Gibsonville, NC (US)

(73) Assignee: Engineered Controls International, LLC, Elon, NC (US)

( * ) Notice: Subject to any disclaimer, the term of this patent is extended or adjusted under 35 U.S.C. 154(b) by 303 days.

(21) Appl. No.: 18/251,344

(22) PCT Filed: Nov. 17, 2021

(86) PCT No.: PCT/US2021/072470
§ 371 (c)(1),
(2) Date: May 1, 2023

(87) PCT Pub. No.: WO2022/109569
PCT Pub. Date: May 27, 2022

(65) Prior Publication Data

US 2023/0390798 A1 Dec. 7, 2023

Related U.S. Application Data

(60) Provisional application No. 63/134,454, filed on Jan. 6, 2021, provisional application No. 63/114,748, filed on Nov. 17, 2020.

(51) Int. Cl.
*B05B 15/555* (2018.01)
*B05B 1/14* (2006.01)
(Continued)

(52) U.S. Cl.
CPC .............. *B05B 15/555* (2018.02); *B05B 1/14* (2013.01); *B05B 1/304* (2013.01); *B08B 5/02* (2013.01); *B05B 15/63* (2018.02)

(58) Field of Classification Search
CPC ......... B05B 15/555; B05B 1/14; B05B 1/304; B05B 15/63; B08B 5/02
(Continued)

(56) References Cited

U.S. PATENT DOCUMENTS 6,945,477 B2 9/2005 Lambert et al.
8,113,240 B2 2/2012 Blanchard et al.
(Continued)

FOREIGN PATENT DOCUMENTS

CN 208679500 4/2019
CN 110778831 2/2020
(Continued)

OTHER PUBLICATIONS

International Search Report and Written Opinion for PCT/US2021/072470 dated Mar. 15, 2022, 13 pp.
(Continued)

*Primary Examiner* — Len Tran
(74) *Attorney, Agent, or Firm* — Neal, Gerber & Eisenberg LLP

(57) ABSTRACT

A cleaning nozzle for cleaning a fueling receptacle capable of receiving a separate fueling nozzle for transferring cryogenic fluid from a fueling station is disclosed. An example cleaning nozzle includes a body that defines a cavity. The example cleaning nozzle includes a nozzle head coupled to and extending from a distal end of the body. The nozzle head defines a plurality of spray holes to spray pressurized air onto the fueling receptacle. The example cleaning nozzle includes a blower that defines a blower inlet, a blower outlet, and a blower flow path extending between the blower inlet and the blower outlet. The blower comprises a valve and a lever operatively coupled to the valve. The example cleaning nozzle includes an insert defining an insert flow path that is fluidly coupled to the blower outlet. The example cleaning
(Continued)

nozzle includes a connector fluidly connecting the insert and the nozzle head.

15 Claims, 41 Drawing Sheets

(51) Int. Cl.

*B05B 1/30* (2006.01)
*B08B 5/02* (2006.01)
*B05B 15/63* (2018.01)

(58) Field of Classification Search

USPC .......................................................... 239/106

See application file for complete search history.

(56) References Cited

U.S. PATENT DOCUMENTS

| | | | |
|---|---|---|---|
| 11,435,022 | B2 | 9/2022 | Hasunuma |
| 2016/0332175 | A1 | 11/2016 | Fu et al. |
| 2017/0028423 | A1 | 2/2017 | Sharp et al. |
| 2018/0354778 | A1 | 12/2018 | Rathbun et al. |
| 2019/0232312 | A1 | 8/2019 | Furukawa et al. |
| 2020/0070180 | A1 * | 3/2020 | Tibell ...................... B05B 1/005 |
| 2020/0318768 | A1 | 10/2020 | Tickle et al. |

FOREIGN PATENT DOCUMENTS

| | | |
|---|---|---|
| CN | 211260317 | 8/2020 |
| EP | 3726123 | 10/2020 |
| EP | 3589419 | 4/2021 |
| JP | 2016080067 | 5/2016 |
| WO | WO 1983001748 | 5/1983 |
| WO | WO 1998040568 | 9/1998 |
| WO | WO 2020206123 | 10/2020 |

OTHER PUBLICATIONS

International Search Report and Written Opinion for PCT/US2021/072463 dated Apr. 7, 2022, 12 pp.

U.S. Appl. No. 18/251,329, filed May 1, 2023, 110 pp.

* cited by examiner

CLEANING NOZZLE FOR CRYOGENIC FLUID FUELING RECEPTACLE

CROSS-REFERENCE

This application claims priority to International Patent Application No. PCT/US2021/072470, filed on Nov. 17, 2021, which claims priority to U.S. Provisional App. No. 63/114,748, filed on Nov. 17, 2020, and U.S. Provisional App. No. 63/134,454, filed on Jan. 6, 2021. The contents of each application are incorporated herein by reference in their entireties.

TECHNICAL FIELD

The present disclosure generally relates to cryogenic fluid and, more specifically, to cleaning stations for cryogenic fluid nozzles and receptacles.

BACKGROUND

Nozzles and receptacles are designed to transfer fluid into a connected storage tank. One example of a receptacle is a vehicle fuel port. One example of a nozzle is a fuel dispenser at a fueling station. One example of a connected storage tank is a fuel tank disposed on the vehicle. Fluids such as liquid natural gas (LNG) and liquefied petroleum gas (LPG), are transferred between storage tanks via specialized nozzles and receptacles. Further, such LNG may be stored in liquid form at cryogenic temperatures (e.g., −150 degrees C. or −238 degrees F.).

In some instances, water may accumulate on valve surfaces of a fueling receptacle and/or a fueling nozzle and become frozen due to the cryogenic temperatures of the fluid flowing through the fueling receptacle. As a result, valve(s) of the fueling receptacle and/or the fueling nozzle may become frozen in an open position, thereby making it difficult for an operator to stop of the flow of fluid. Additionally, dirt and/or other material may collect on a fueling receptacle over time, thereby preventing a tight seal from forming between the fueling receptacle and the fueling nozzle used to transfer cryogenic fluid.

Some storage tanks may include a spray nozzle that is configured to clean a fueling receptacle between uses. Commonly, the spray nozzle is an off-the-shelf nozzle that is not designed to clean receptacles specialized for cryogenic fluid transfer. As a result, users may have difficulty in thoroughly cleaning the specialized fueling receptacles with such a nozzle.

Some storage tanks may include a holster through which warm air flows and in which a fueling nozzle is inserted between uses. Commonly, the holster is an off-the-shelf tube that is not designed to clean nozzles specialized for cryogenic fluid transfer. As a result, users may have difficulty in thoroughly cleaning the specialized fueling nozzles with such a holster.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
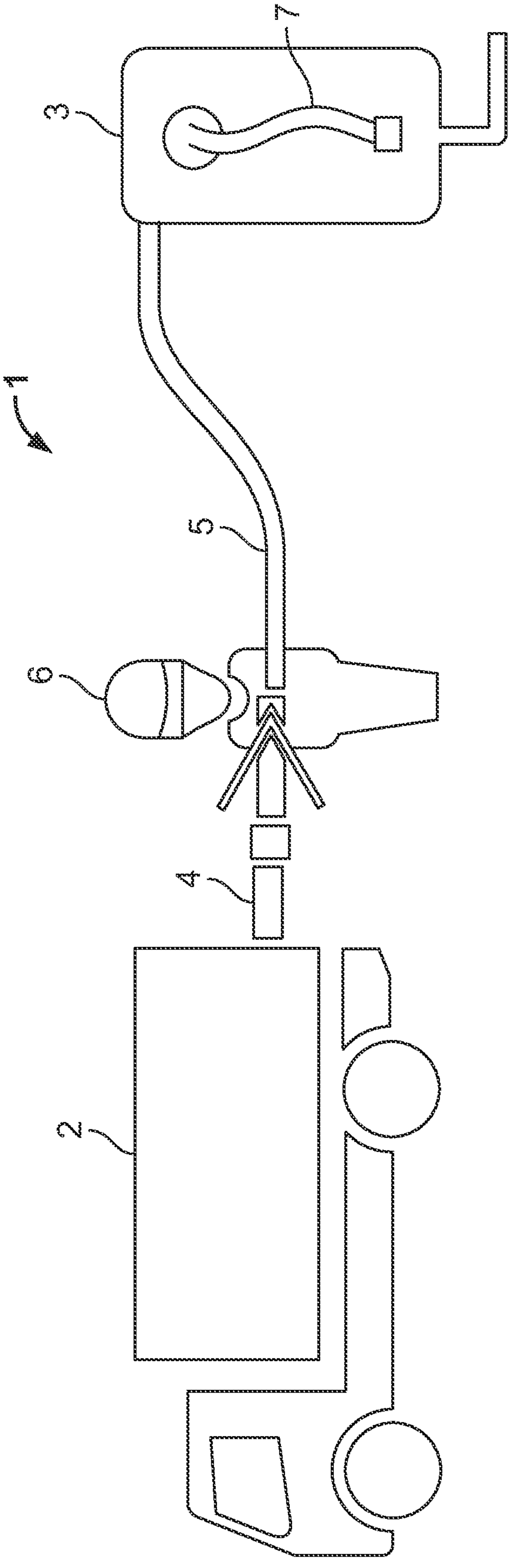
FIG. 1 illustrates an example system for filling a fill tank with cryogenic fluid.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Example cleaning nozzles disclosed herein are configured to thoroughly and easily clean fueling receptacles that are used to transfer cryogenic fluid, such as LNG, between storage tanks. For example, cleaning nozzles disclosed herein include a plurality of spray holes that are positioned and oriented to thoroughly clean surfaces of the fueling receptacles. Further, cleaning nozzles disclosed herein include alignment mechanisms to properly align the cleaning nozzles with respective fueling receptacles and, in turn, direct the spray openings of the cleaning nozzles toward the surfaces of the fueling receptacles.

Example cleaning receptacles disclosed herein are configured to thoroughly and easily clean fueling nozzles that are used to transfer cryogenic fluid, such as LNG, between storage tanks. For example, cleaning receptacles disclosed herein include a plurality of spray holes that are positioned and oriented to thoroughly clean surfaces of the fueling nozzles with warm air, such as air warmer than an ambient temperature. Further, cleaning receptacles disclosed herein are configured to vent moisture from the fueling nozzles to deter moisture from collecting and freezing on inner surfaces of the fueling nozzles.

Turning to the figures, FIG. 1 illustrates an example system 1 for filling a fill tank 2 with cryogenic fluid in accordance with the teachings herein. As illustrated in FIG. 1, the system 1 includes a source tank 3 configured to store the cryogenic fluid and the fill tank 2 configured to receive the cryogenic fluid from the source tank 3. Further, a fueling receptacle 4 is connected to the fill tank 2, and a hose 5 is connected to the source tank 3. In order to enable the fill tank 2 to collect the cryogenic fluid from the source tank 3, an operator 6 couples the hose 5 to the fueling receptacle 4 to fluidly couple the fill tank 2 to the source tank 3. For example, the operator 6 couples the hose 5 to the fueling receptacle 4 via a fueling nozzle of the hose 5. After the cryogenic fluid is transferred from the source tank 3 and to the fill tank 2, the fueling receptacle 4 of the fill tank 2 and the fueling nozzle of the source tank 3 are decoupled. Subsequently, the fueling nozzle is used to fill another fill tank via a similar process. Over time, a fueling receptacle connected to a source tank may become dirty. In the illustrated example, the source tank 3, the hose 5, and the cleaning hose 7 are part of a fixed station, and the fill tank 2 and the fueling receptacle 4 are on a vehicle. In other examples, the fill tank 2 and/or the fueling receptacle 4 are part of a fixed station, and/or the source tank 3, the hose 5, and/or the cleaning hose 7 are on a vehicle.

Figure 2:
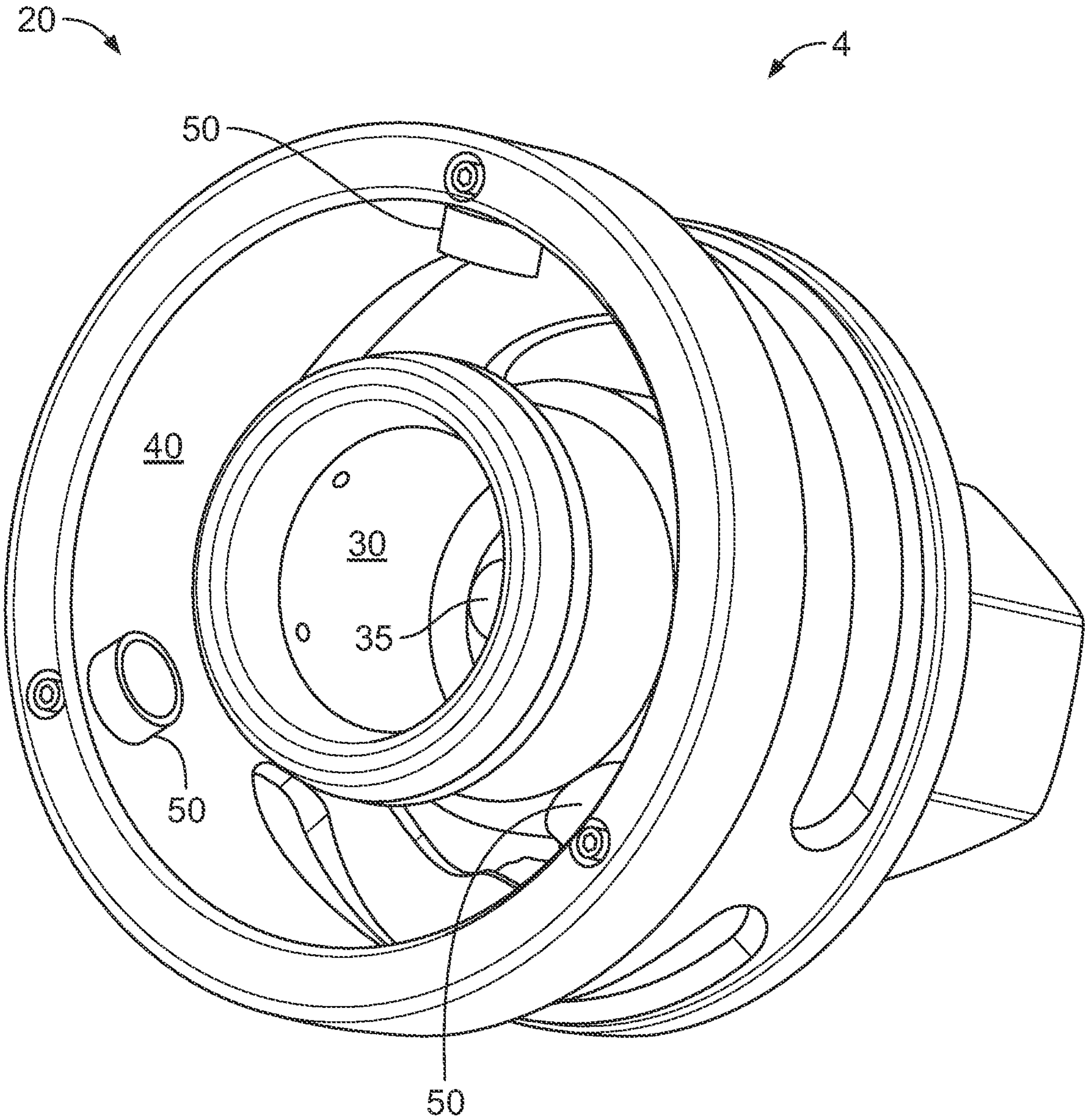
FIG. 2 depicts an example fueling receptacle of a source tank within the system of FIG. 1.

FIG. 2 depicts an outer end 20 of an example of the fueling receptacle 4. The fueling receptacle 4 includes a flow body 30 through which the cryogenic fluid is configured to flow. A poppet 35 is positioned within the flow body 30 to control the flow of the cryogenic fluid through the flow body 30. An outer body 40 extends circumferentially around the flow body 30 adjacent the outer end 20 of the fueling receptacle 4. Locating members extend inwardly from the outer body 40 toward the flow body 30. In the illustrated example, the locating members are bearings 50 that are equally spaced apart along an inner circumference of the outer body 40. For example, three bearings 50 are spaced apart from each other by about 120 degrees along the inner circumference of the outer body 40. As disclosed below in greater detail, the bearings 50 are configured to engage a portion of a nozzle (e.g. a fueling nozzle or a cleaning nozzle) to facilitate alignment between the nozzle and the fueling receptacle 4 as the nozzle couples to the fueling receptacle 4 and prevent rotation of a fueling nozzle and/or the cleaning nozzle with respect to the fueling nozzle. Additionally, when the nozzle is coupled to the fueling receptacle 4, the bearings prevent the nozzle from rotating relative to the fueling receptacle 4. Features of the example fueling receptacle 4 are further disclosed in commonly owned U.S. Pat. application Ser. No. 16/838,251 and International App. No. PCT/US2020/026388, the disclosures of which are incorporated by reference in their entirety.

Returning to FIG. 1, a cleaning hose 7 is located near the source tank 3 and/or the hose 5. Pressurized air and/or another cleaning fluid is configured to flow through the cleaning hose 7. Additionally, a cleaning nozzle (e.g., cleaning nozzle 100 of FIGS. 3-9, cleaning nozzle 200 of FIGS. 10-14, cleaning nozzle 300 of FIGS. 15-16, cleaning nozzle 400 of FIGS. 17-18, cleaning nozzle 500 of FIGS. 19-20, cleaning nozzle 1000 of FIGS. 21-28) is connected to an end of the cleaning hose 7 and configured to emit the pressurized air. In order to (1) inhibit a receptacle valve (e.g., the poppet 35 of FIG. 2) from becoming frozen in an open position and (2) promote formation of a tight seal between the fueling nozzle of the source tank 3 and the fueling receptacle 4 of the fill tank 2, the operator 6 cleans the fueling receptacle 4 of water and/or other material using the cleaning hose 7 prior to connecting the fueling nozzle to the fueling receptacle 4. For example, prior to connecting the fueling nozzle of the source tank 3 to the fueling receptacle 4 of the fill tank 2, the operator 6 holds the cleaning nozzle adjacent the fueling receptacle 4 of the fill tank 2. In turn, the cleaning nozzle sprays the pressurized air onto the fueling receptacle 4 to blow and/or otherwise remove dirt and/or other material from the fueling receptacle 4 that may otherwise prevent the fueling receptacle 4 from forming a tight seal with the fueling nozzle of the source tank 3. After the fueling receptacle 4 has been cleaned by the cleaning nozzle, the operator 6 connects the fueling nozzle of the source tank 3 to the fueling receptacle 4 of the fill tank 2 to begin the filling process.

FIGS. 3-9 depict an embodiment of a cleaning nozzle 100 in accordance with the teachings herein. The cleaning nozzle 100 includes a body 110, a nozzle head 120, an alignment extension 140, and a shield 150. The body 110 of the illustrated example comprises a substantially cylindrical main body 113 having an outer surface 116. A proximal end 111 of the body 110 (also referred to as a "first end" or an "inlet end") defines an inlet 171 of the cleaning nozzle 100, and an opposing distal end 112 of the body 110 (also referred to as a "second end" or an "outlet end") defines an outlet 172 of the cleaning nozzle 100. The inlet 171 and the outlet 172 of the cleaning nozzle 100 are selectively in fluid connection together via a valve (e.g., a valve 180 of FIGS. 7-9). For example, pressurized air is to travel into the inlet 171, through a cavity 170 defined by the body 110, and out of the outlet 172 to clean the fueling receptacle 4.

As shown in FIGS. 6-9, the body 110 includes the main body 113, an end cap 114, and a seal 115. The main body 113 defines the outlet 172 at the distal end 112 of the body 110. The end cap 114 is connected to the main body 113 and defines the inlet 171 at the proximal end 111 of the body 110. The seal 115 (e.g., an O-ring) is positioned between the main body 113 and the end cap 114. The inlet 171 defined by the end cap 114 is configured to fixedly receive a connector (e.g., a connector 265 of FIGS. 10 and 12-14) that is fixed to the cleaning hose 7 to enable the cleaning nozzle 100 to receive pressurized air and/or other cleaning fluid from a corresponding source. For example, the inlet 171 includes internal threads that are configured to threadably receive the connector 265. Additionally, the end cap 114 is configured to decouple from the main body 113 to provide access to components housed within the cavity 170 of the body 110, for example, for maintenance purposes.

Figure 4:
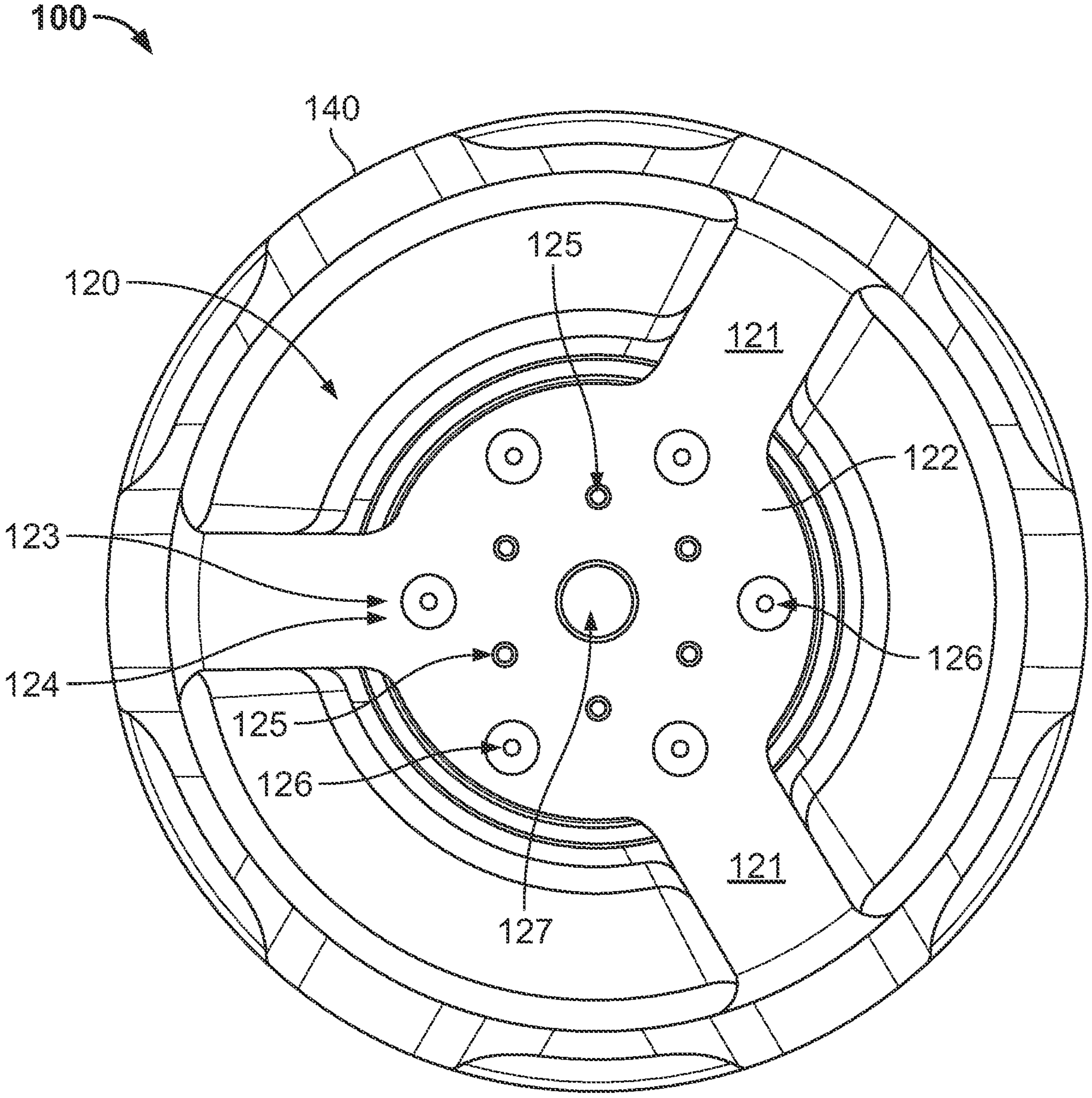
FIG. 4 is a front view of the cleaning nozzle of FIG. 3.
Figure 6:
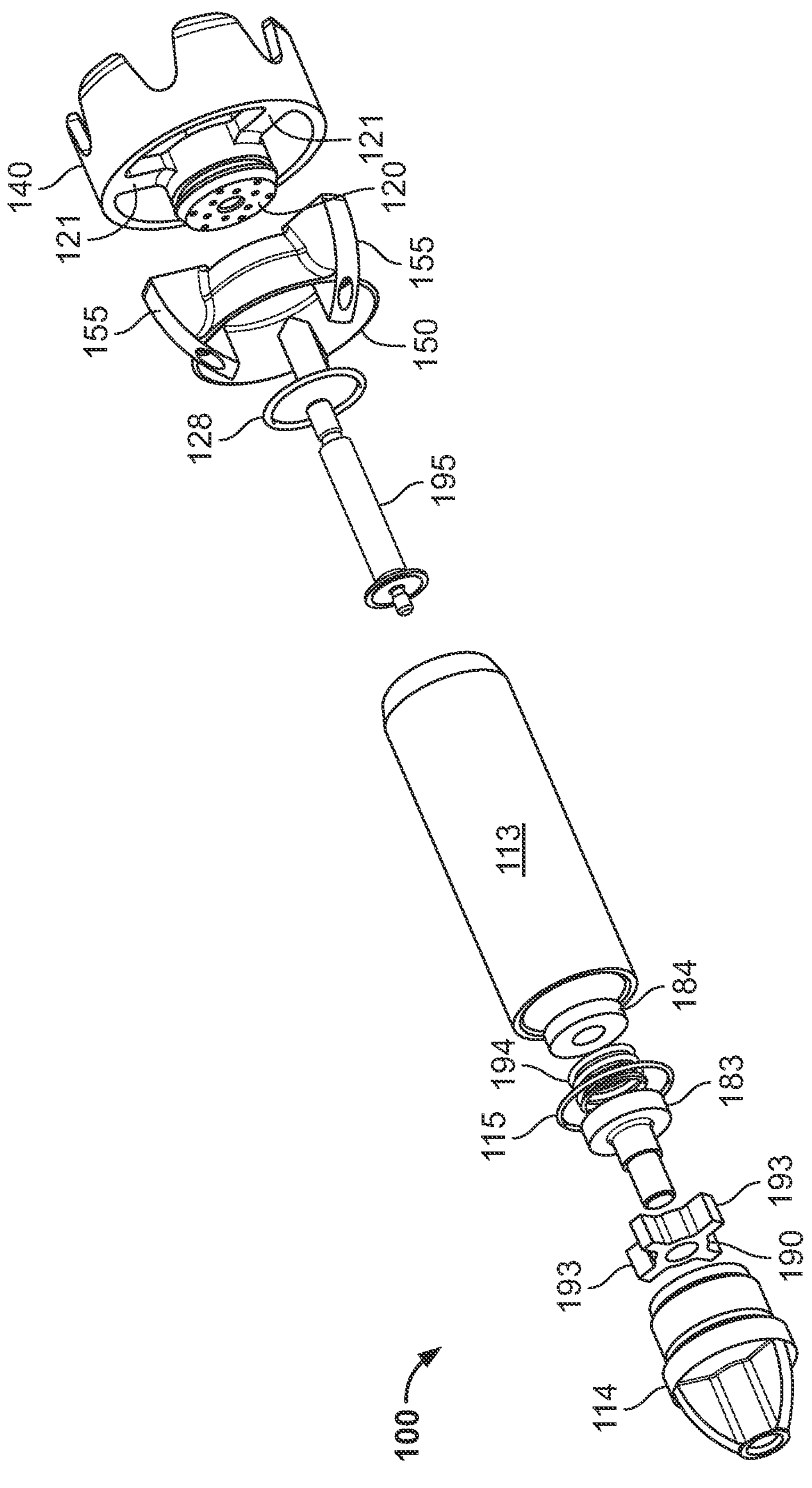
FIG. 6 is an exploded view of the cleaning nozzle of FIG. 3.
Figure 7:
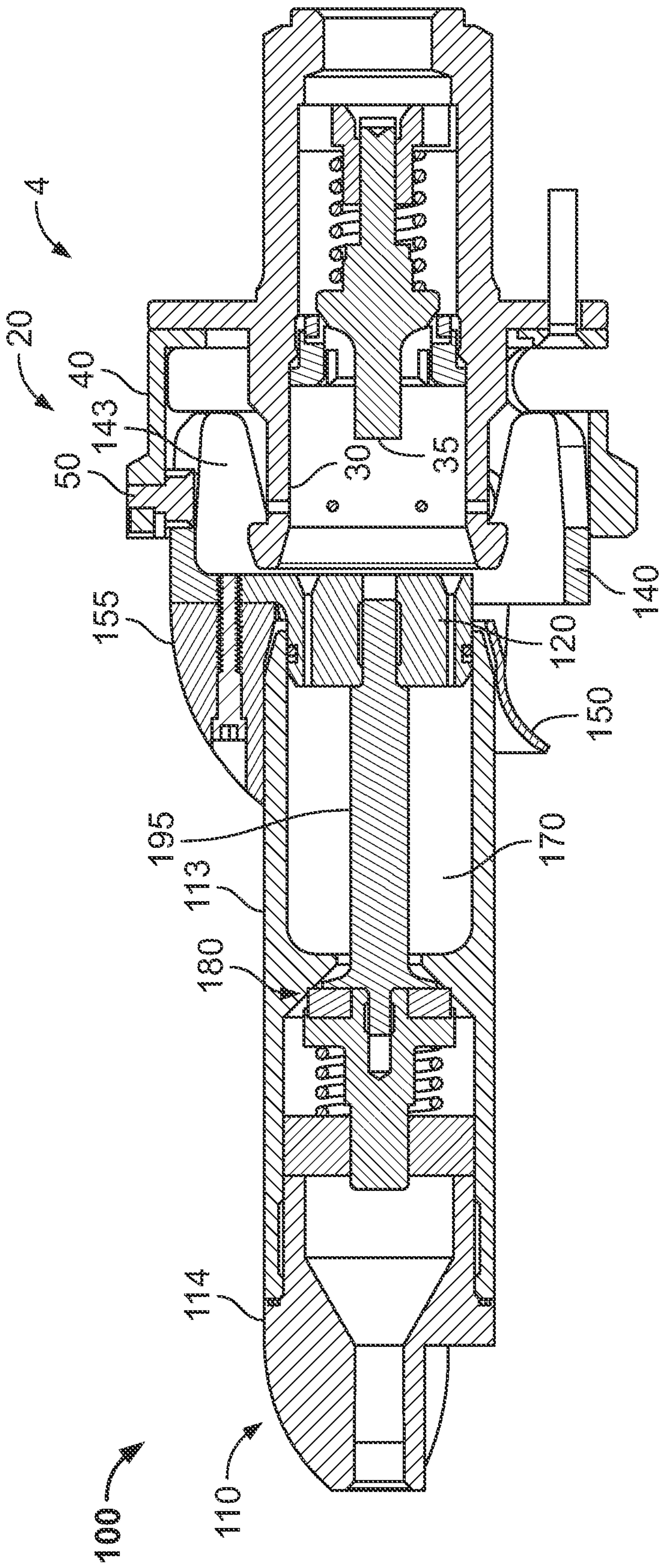
FIG. 7 is a cross-sectional view of the cleaning nozzle of FIG. 3 coupled to the fueling receptacle of FIG. 2.
Figure 8:
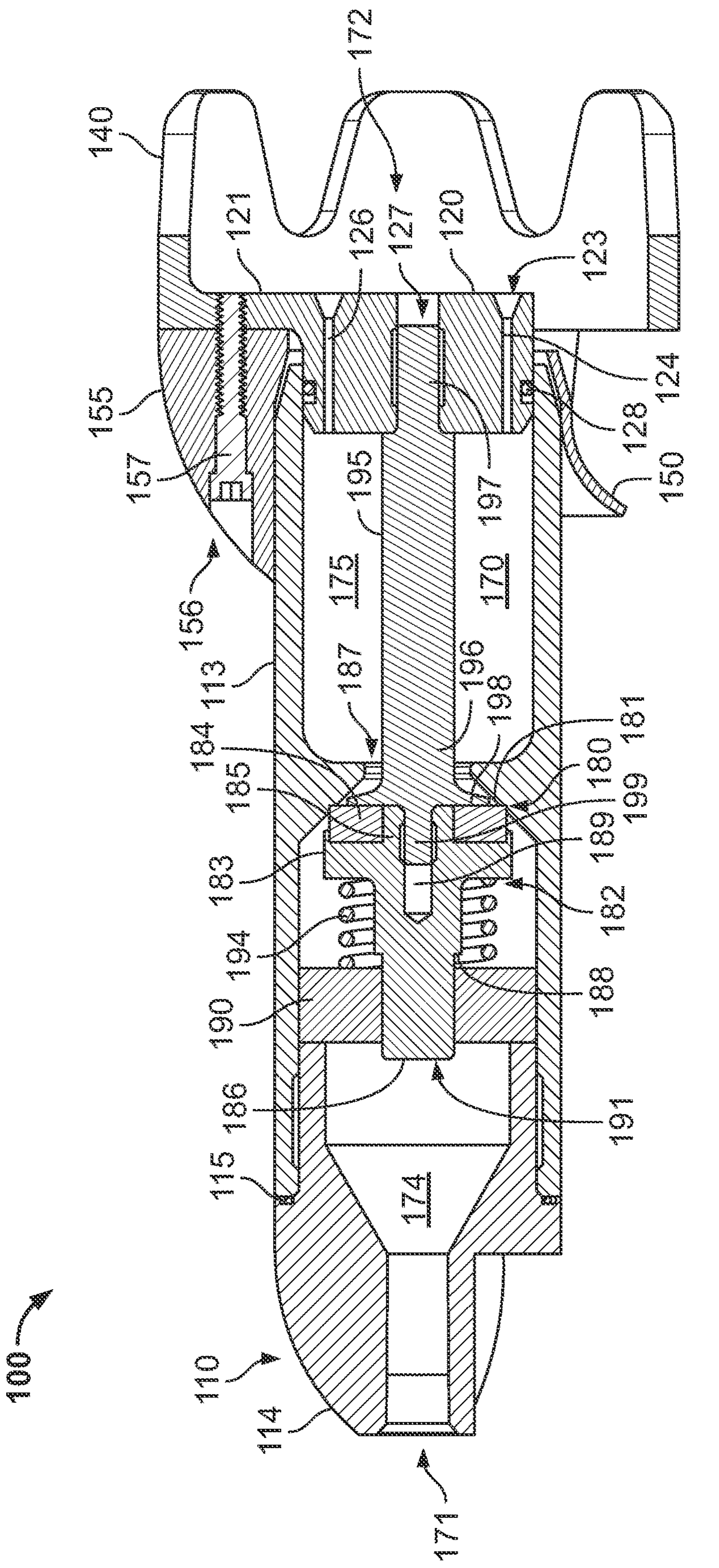
FIG. 8 is a cross-sectional view of the cleaning nozzle of FIG. 3 in a closed position.
Figure 9:
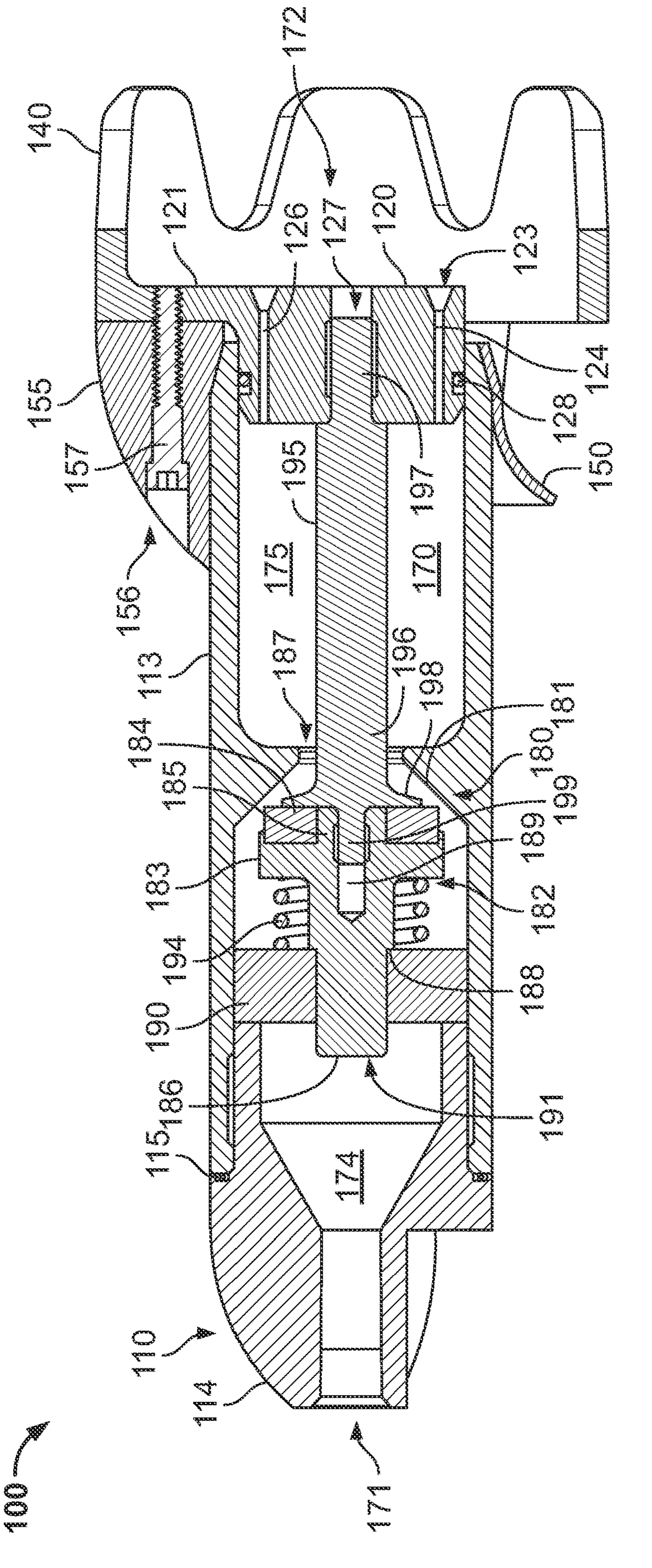
FIG. 9 is a cross-sectional view of the cleaning nozzle of FIG. 3 in an open position.

The nozzle head 120 extends outwardly beyond the distal end 112 of the body 110. As shown in FIGS. 7-9, the nozzle head 120 is slidably received and extends partially within the cavity 170 of the body 110 at the distal end 112. As shown in FIG. 4, one or more support arms 121 extend between the nozzle head 120 and the alignment extension 140. As shown in FIG. 6, the support arms 121 are integrally formed with both the nozzle head 120 and the alignment extension 140 such that the nozzle head 120 is integrally formed with the alignment extension 140. Further, the nozzle head 120 includes an outer surface 122 that defines a plurality of spray openings 123 of a respective plurality of spray holes 124. As shown in FIGS. 7-9, the spray holes 124 are defined by the nozzle head 120 and extend through a thickness of the nozzle head 120 to fluidly connect to the cavity 170 of the body 110. As disclosed below in greater detail, pressurized air flows through the spray holes 124 and out of the spray openings 123 to clean a fueling receptacle (e.g., the fueling receptacle 4).

In the illustrated example, the spray holes 124 include a first set of spray holes 125 and a second set of spray holes 126. The first set of spray holes 125 and a second set of spray holes 126 are configured to thoroughly clean surfaces of the fueling receptacle 4. For example, the first set of spray holes 125 are sized, positioned, and oriented to spray pressurized air onto the poppet 35 of the fueling receptacle 4 to clean surfaces of the poppet 35. The second set of spray holes 126 are sized, positioned, and oriented to spray pressurized air onto and, in turn, clean surfaces of the flow body 30 of the fueling receptacle 4.

As illustrated in FIG. 4, the first set of spray holes 125 are arranged circumferentially about a center axis of the nozzle head 120 and equidistantly apart from each other. The second set of spray holes 126 also are arranged circumferentially about a center axis of the nozzle head 120 and equidistantly apart from each other. Each of the first set of spray holes 125 are closer to each other and the center axis compared to the proximity of each of the second set of spray holes 126 to each other and the center axis. That is, a circumference formed by the first set of spray holes 125 is less than circumference formed by the second set of spray holes 126. Each of the first set of spray holes 125 are shaped and positioned in order to spray pressurized air onto surfaces of the poppet 35 of the fueling receptacle 4. For example, the spray opening 123 of each of the first set of spray holes 125 is substantially straight and perpendicular to the outer surface 122 of the nozzle head 120 in order to direct the pressurized air onto the poppet 35 housed within the flow body 30. Each of the second set of spray holes 126 are shaped and positioned in order to spray pressurized air onto surfaces of the flow body 30 of the fueling receptacle 4. For example, the spray opening 123 of each of the second set of spray holes 126 is defined by an inner chamfer to be cone-shaped (e.g., with a vertex angle of about 45 degrees) in order to direct the pressurized air radially outwardly onto the surfaces of the flow body 30. Additionally, each of the first set of spray holes 125 has a first diameter that is less than a second diameter of each of the second set of spray holes 126 to affect the flow of the pressurized air out of the first and second set of spray holes 125, 126.

Figure 5:
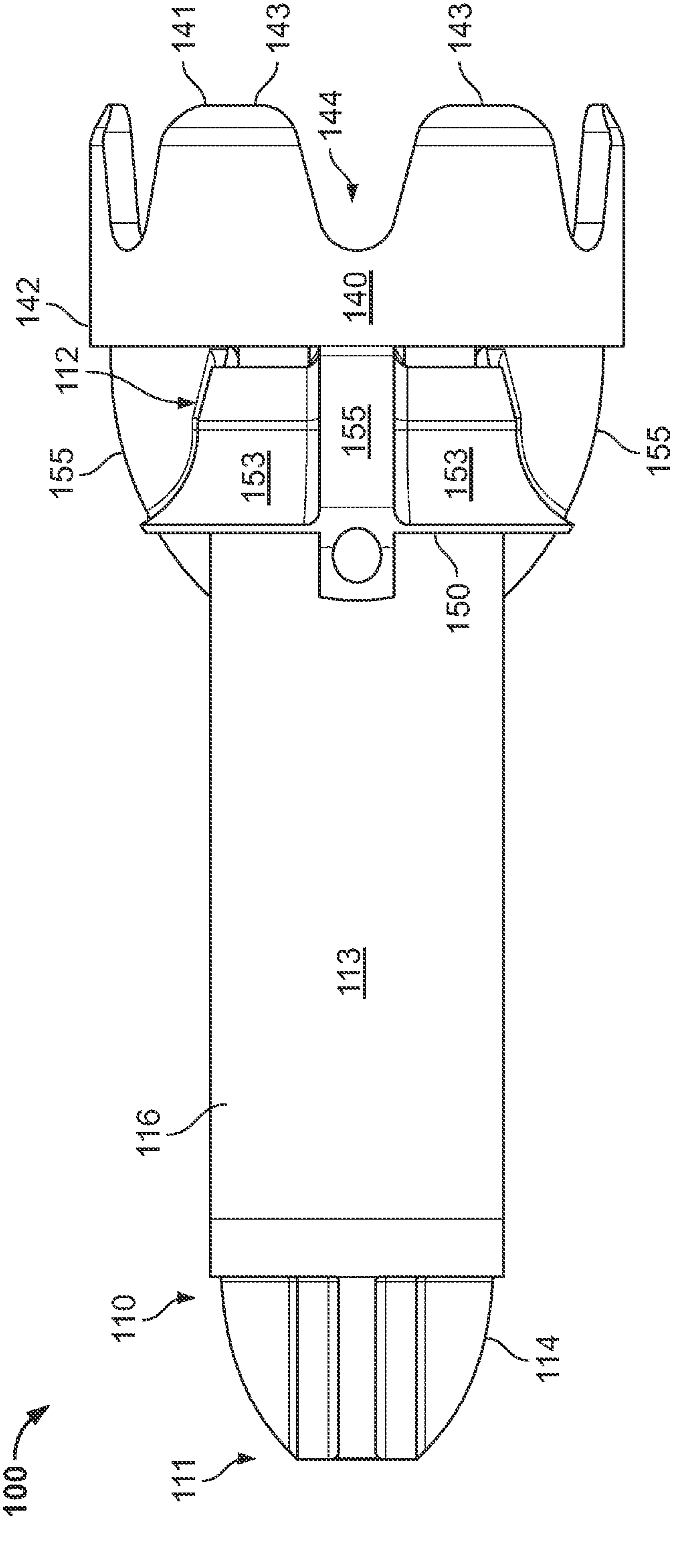
FIG. 5 is a side view of the cleaning nozzle of FIG. 3.

The alignment extension 140 extends longitudinally beyond the nozzle head 120 and the distal end 112 of the body 110. The alignment extension 140 includes a distal end 141 and a proximal end 142. The proximal end 142 is coupled to and extends from the nozzle head 120. As shown in FIG. 6, the alignment extension 140 is integrally formed with the nozzle head 120. As shown in FIG. 5, the distal end 141 of the alignment extension 140 includes one or more flanges 143 that define one or more slots 144. The slots 144 are configured to receive the bearings 50 of the fueling receptacle 4 to facilitate the operator 6 in quickly and easily positioning the cleaning nozzle 100 to clean the fueling receptacle 4. In the illustrated example, the slots 144 extend linearly in a direction parallel to a longitudinal center axis of the body 110 to enable the alignment extension 140 to receive and connect to the fueling receptacle 4 without twisting and/or rotating the cleaning nozzle 100.

In the illustrated example, the flanges 143 are equally sized with each other. Further, the flanges 143 are equally spaced apart from each other circumferentially around a center axis of the alignment extension 140 such that the slots 144 are equally sized and spaced apart with respect to each other. The slots 144 are equally sized and equidistantly spaced apart to facilitate alignment with the bearings 50 of the fueling receptacle 4. For example, the alignment extension 140 defines six slots 144 to receive the fueling receptacle 4 having three bearings 50 such that the cleaning nozzle 100 need be rotated no more than 30 degrees to align the alignment extension 140 with the fueling receptacle 4. Further, each of the slots 144 defined by the flanges 143 is substantially V-shaped to facilitate the operator 6 in guiding the bearings 50 of the fueling receptacle 4 into the slots 144 of the alignment extension 140. For example, each of the slots 144 is an isosceles triangle with a large vertex angle (e.g., about 30 degrees) to facilitate the operator 6 in coupling the cleaning nozzle 100 to the fueling receptacle 4.

Figure 3:
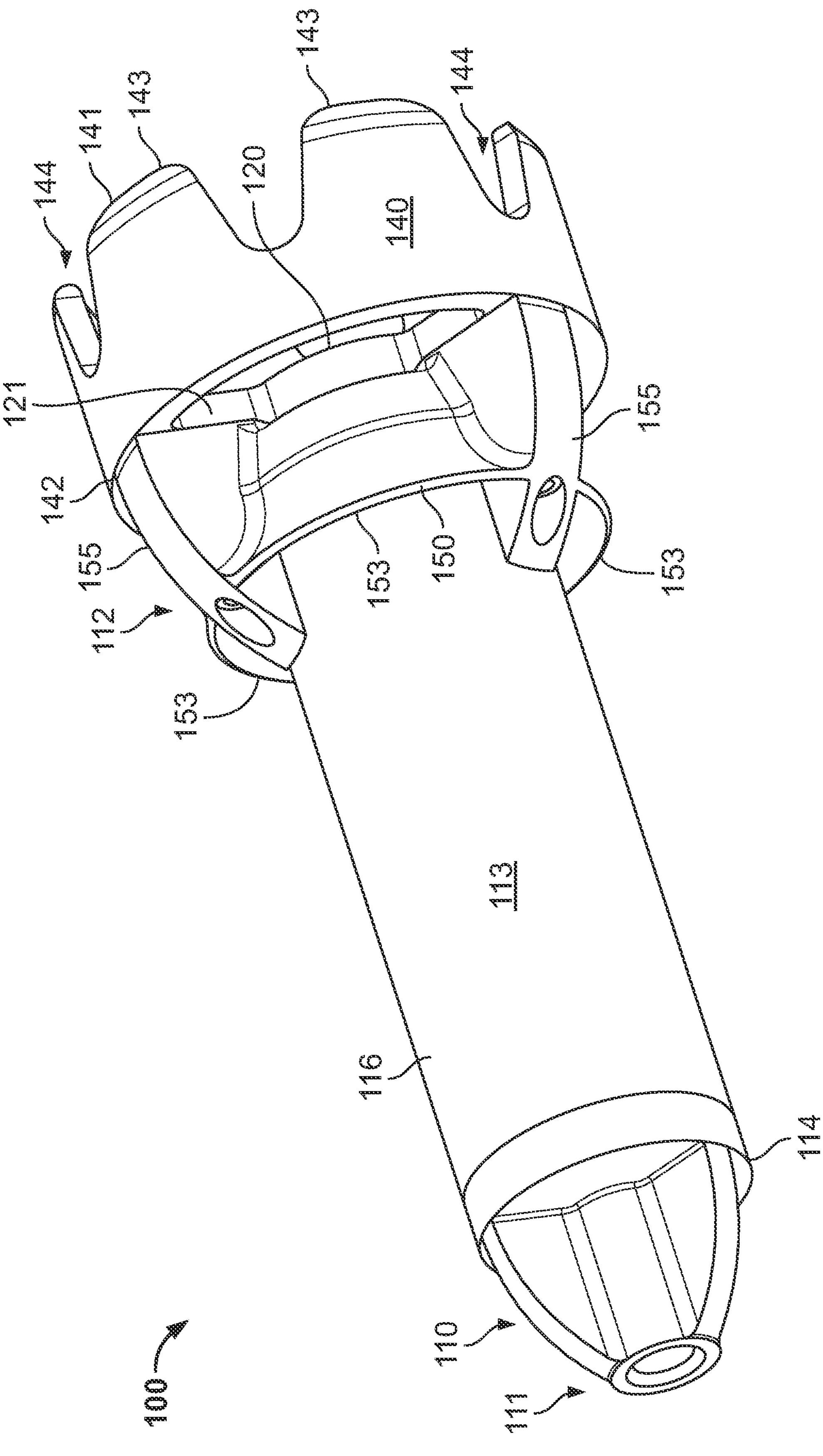
FIG. 3 is a perspective view an example cleaning nozzle in accordance with the teachings herein.

The shield 150 of the cleaning nozzle 100 is configured to prevent debris from blowing back onto the operator 6. For example, the shield 150 is positioned between the nozzle head 120 and a portion of the body 110 held by the operator 6 to protect the hands of the operator 6 during operation. The shield 150 includes one or more posts 155. As shown in FIGS. 8-9, each of the posts 155 defines a through hole 156 through which a fastener 157 extends to couple the shield 150 to the support arms 121 of the nozzle head 120. As shown in FIGS. 3 and 5, the shield 150 also includes a plurality of walls 153 each of which is positioned between two of the posts 155. Additionally, each of the walls 153 is angled backward relative to the outer surface 116 of the body 110 to divert the pressurized air away from the hands of the operator 6 holding the body 110 of the cleaning nozzle 100.

FIGS. 7-9 are cross-sectional views that depict the interior components of the cleaning nozzle 100. More specifically, FIG. 7 depicts the cleaning nozzle 100 coupled to the fueling receptacle 4. When the cleaning nozzle 100 is coupled to the fueling receptacle 4, the slots 144 of the alignment extension 140 receive the bearings 50 of the fueling receptacle 4 to maintain the position of the cleaning nozzle 100 relative to the fueling receptacle 4. Additionally the spray holes 124 of the nozzle head 120 are positioned to thoroughly clean the surfaces of the fueling receptacle 4 without requiring the operator 6 to reposition the cleaning nozzle 100 relative to the fueling receptacle 4.

FIGS. 8-9 depict the cleaning nozzle 100 in an inactive state and an active state, respectively. In the inactive state, the cleaning nozzle 100 prevents pressurized air from being sprayed from the nozzle head 120. In the active state, the cleaning nozzle 100 sprays pressurized air from the nozzle head 120 to clean the fueling receptacle 4. The cleaning nozzle 100 includes a valve 180 that is configured to transition the cleaning nozzle 100 between the inactive and active states.

In the illustrated example, the cavity 170 is divided into an inner chamber 174 and an adjacent outer chamber 175. The inner chamber 174 is fluidly connected to the inlet 171, and the outer chamber 175 is fluidly connected to the spray holes 124 of the nozzle head 120. The valve 180 is configured to slide axially between an open position and a closed position to selectively enable the pressurized air to flow between the inner chamber 174 and the outer chamber 175 and, in turn, selectively enable the pressurized air to flow between the inlet 171 and the spray holes 124. For example, to set the cleaning nozzle 100 in the inactive state as shown in FIG. 8, the valve 180 is closed to prevent the pressurized air from flowing through the cavity 170. To set the cleaning nozzle 100 in the active state as shown in FIG. 9, the valve 180 is opened to enable the pressurized air to flow through the cavity 170.

The valve 180 includes a seat 181 and a plug 182. The seat 181 (also referred to as a "valve seat") is formed by the body 110 of the cleaning nozzle 100. For example, the seat 181 is formed by the main body 113 of the body 110. The plug 182 of the illustrated example is positioned within the inner chamber 174 of the cleaning nozzle 100. The plug 182 includes a plug body 183 and a seal 184, and the plug body 183 includes a first end 185 and an opposing second end 186. The seal 184 (e.g., an O-ring) is fixed to the plug body 183 and extends circumferentially around the first end 185 of the plug body 183. The seal 184 is configured to selectively engage the seat 181 to control flow of the pressurized air between the inner chamber 174 and the outer chamber 175 of the cleaning nozzle 100. The seal 184 of the plug 182 is configured to engage the seat 181 in the closed position to close a pathway 187 between the inner chamber 174 and the outer chamber 175. Additionally, the seal 184 of the plug 182 is configured to engage the seat 181 in the open position to open the pathway 187 between the inner chamber 174 and the outer chamber 175.

As shown in FIGS. 8-9, the second end 186 of the plug body 183 is configured to slidably extend through a guide 190. The guide 190 defines an aperture 191 through which the second end 186 slidably extends. Additionally, the guide 190 at least partially defines one or more openings through which the pressurized air is to flow from the inlet 171 toward the outer chamber 175. As shown in FIG. 6, the guide 190 of the illustrated example includes a plurality of arms 193. The arms 193 are configured to engage the main body 113 such that the guide 190 and the body 110 are arranged to define the openings for the pressurized air. Returning to FIGS. 8-9, the plug body 183 defines a lip 188 adjacent the second end 186 to limit axial movement of the plug 182 in an inward direction toward the inlet 171. A spring 194 (e.g., a compression spring) engages and extends between the guide 190 and the first end 185 of the plug body 183 to bias the plug 182 in the closed position.

A stem 195 is coupled to the first end 185 of the plug body 183. The stem 195 includes a first end 196 and an opposing second end 197. The first end 196 of the stem 195 is coupled to the plug 182, and the second end 197 is coupled to the nozzle head 120.

In the illustrated example, the first end 196 includes a flange 198 that extends circumferentially around the stem 195 and a protrusion 199 that extends beyond the flange 198. The protrusion 199 is configured to be inserted into a bore 189 defined by the plug body 183 to couple the stem 195 to the plug 182. For example, the protrusion 199 and the bore 189 include threads to threadably couple the stem 195 to the plug 182. The flange 198 engages the seal 184 such that the seal 184 is held in place between the first end 196 of the stem 195 and the first end 185 of the plug body 183.

The second end 197 of the stem 195 is inserted into a bore 127 defined by the nozzle head 120 to couple the stem 195 to the nozzle head 120. For example, the second end 197 and the bore 127 include threads to threadably couple the stem 195 to the nozzle head 120. Further, in the illustrated example, the nozzle head 120 partially extends into the outer chamber 175 when coupled to the stem 195. A seal 128 (e.g., an O-ring) extends circumferentially around a portion of the nozzle head 120 within the outer chamber 175 to prevent pressurized air from escaping between the nozzle head 120 and the body 110 of the cleaning nozzle 100.

The stem 195 is configured to couple to both the nozzle head 120 and the plug 182 of the valve 180 to operatively connect the nozzle head 120 and the plug 182. Additionally, since the alignment extension 140 is integrally formed with the nozzle head 120 in the illustrated example, the stem 195 operatively connects the alignment extension 140 and the plug 182. That is, the stem 195 couples to the nozzle head 120 and the plug 182 to cause the nozzle head 120, the alignment extension 140, the stem 195, and the plug 182 to slide axially together as a single unit.

In operation, the spring 194 is configured to bias the plug 182 in the closed position to close the pathway 187 between the inner chamber 174 and the outer chamber 175. When the plug 182 is in the closed position, pressurized air is prevented from being sprayed from the nozzle head 120. In other words, the cleaning nozzle 100 is in the inactive state and does not spray pressurized air when the plug 182 is in the closed position. In contrast, the cleaning nozzle 100 is in the active state and sprays the pressurized air when the plug 182 is in the open position. That is, when the plug 182 is in the open position, pressurized air is enabled to be sprayed from the nozzle head 120.

To transition the plug 182 from the closed position to the open position, a force that overcomes the biasing force of the spring 194 is applied to push the plug 182 axially in direction toward the inlet 171. In the illustrated example, the force is applied when the operator 6 presses the alignment extension 140 against the bearings 50 of the fueling receptacle 4. That is, the bearings 50 and/or other portion(s) of the fueling receptacle 4 apply a force onto the alignment extension 140 in a direction toward the proximal end 111 of the body 110 of the cleaning nozzle 100. Because the alignment extension 140 is coupled to the plug 182 via the nozzle head 120 and the stem 195, the applied force causes the plug 182 to move axially toward the proximal end 111 of the body 110 when the applied force is greater than the biasing force of the spring 194. In turn, the plug 182 disengages from the seat 181 to open the pathway 187 and enable the pressurized air to flow to and be sprayed from the nozzle head 120. In other words, to cause the cleaning nozzle 100 to spray the pressurized air onto the fueling receptacle 4, the operator 6 presses the nozzle head 120 into the cavity 170 of the body 110 by pushing the alignment extension 140 against the bearings 50 of the fueling receptacle 4.

FIGS. 10-14 depict a further embodiment of a cleaning nozzle 200 in accordance with the teachings herein. The cleaning nozzle 200 includes a body 210, a nozzle head 220, one or more support braces 230, an alignment extension 240, a shield 250, a button 260, and a connector 265. The body 210 of the illustrated example is substantially cylindrical. A proximal end 211 of the body 210 (also referred to as a “first end” or an “inlet end”) defines an inlet 271 of the cleaning nozzle 200, and an opposing distal end 213 of the body 210 (also referred to as a “second end” or an “outlet end”) defines an outlet 272 of the cleaning nozzle 200. The inlet 271 and the outlet 272 of the cleaning nozzle 200 are selectively in fluid connection together via a valve (e.g., a valve 180 of FIGS. 7-9). For example, pressurized air is to travel into the inlet 271, through a cavity defined by the body 210, and out of the outlet 272 to clean the fueling receptacle 4.

Figure 10:
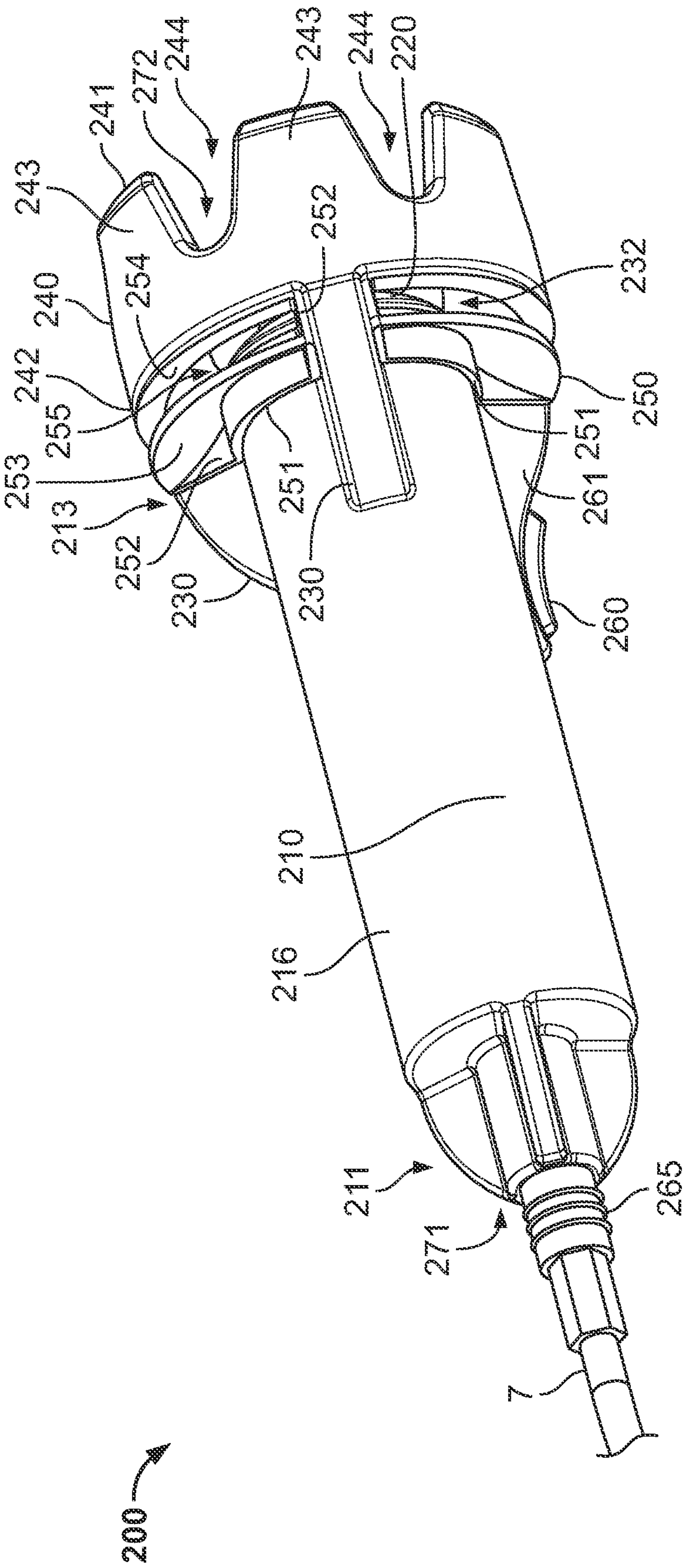
FIG. 10 is a perspective view of another example cleaning nozzle in accordance with the teachings herein.

As shown in FIG. 10, the connector 265 is fixed to the cleaning hose 7. Additionally, the inlet 271 is configured to fixedly receive the connector 265 to enable the cleaning nozzle 200 to receive pressurized air and/or other cleaning fluid from a corresponding source. For example, the inlet 271 includes internal threads and the connector 265 includes external threads to enable the inlet 271 to threadably receive the connector 265.

The button 260 of the cleaning nozzle 200 is housed by the body 210 and is positioned along an outer surface 216 of the body 210. The button 260 is housed by and at least partially extends from a button housing 261 that extends from one of the support braces 230. For example, the button housing 261 is integrally formed with one of the support braces 230. Additionally, the button housing 261 defines an outer surface that is ergonomically shaped to facilitate the operator 6 in engaging the button 260 while securely holding the cleaning nozzle 200. In the illustrated example, the button 260 is a pushbutton that is engaged when the operator 6 presses the pushbutton and disengaged when the operator 6 releases the pushbutton. In other examples, the button 260 is a toggle button, a rocker button, a rotary knob, a lever, a slider, or any other mechanical input device that enables the operator 6 to control operation of the cleaning nozzle 200.

The button 260 enables the operator 6 to control operation of the cleaning nozzle 200. The cleaning nozzle 200 includes a valve, a spring, and a guide that is substantially similar to the valve 180, the spring 194, and the guide 190 of the cleaning nozzle 100 to control the flow of pressurized air through the cleaning nozzle 200. The button 260 is operatively coupled to a plug of the valve (e.g., substantially similar to the plug 182 of the cleaning nozzle 100) to transition the plug between a closed position and open position and, in turn, transition the nozzle between an inactive state and an active state. For example, the button 260 is operatively connected to the plug via a cam. For example, when the operator 6 presses the button 260, the button 260 causes the plug of the valve to disengage from a valve seat (e.g., substantially similar to the seat 181 of the cleaning nozzle 100) to enable the pressurized air to flow through the cleaning nozzle 200. When the operator 6 release the button 260, the spring biases the plug back onto the valve seat to prevent the pressurized air to flow through the cleaning nozzle 200.

Figure 11:
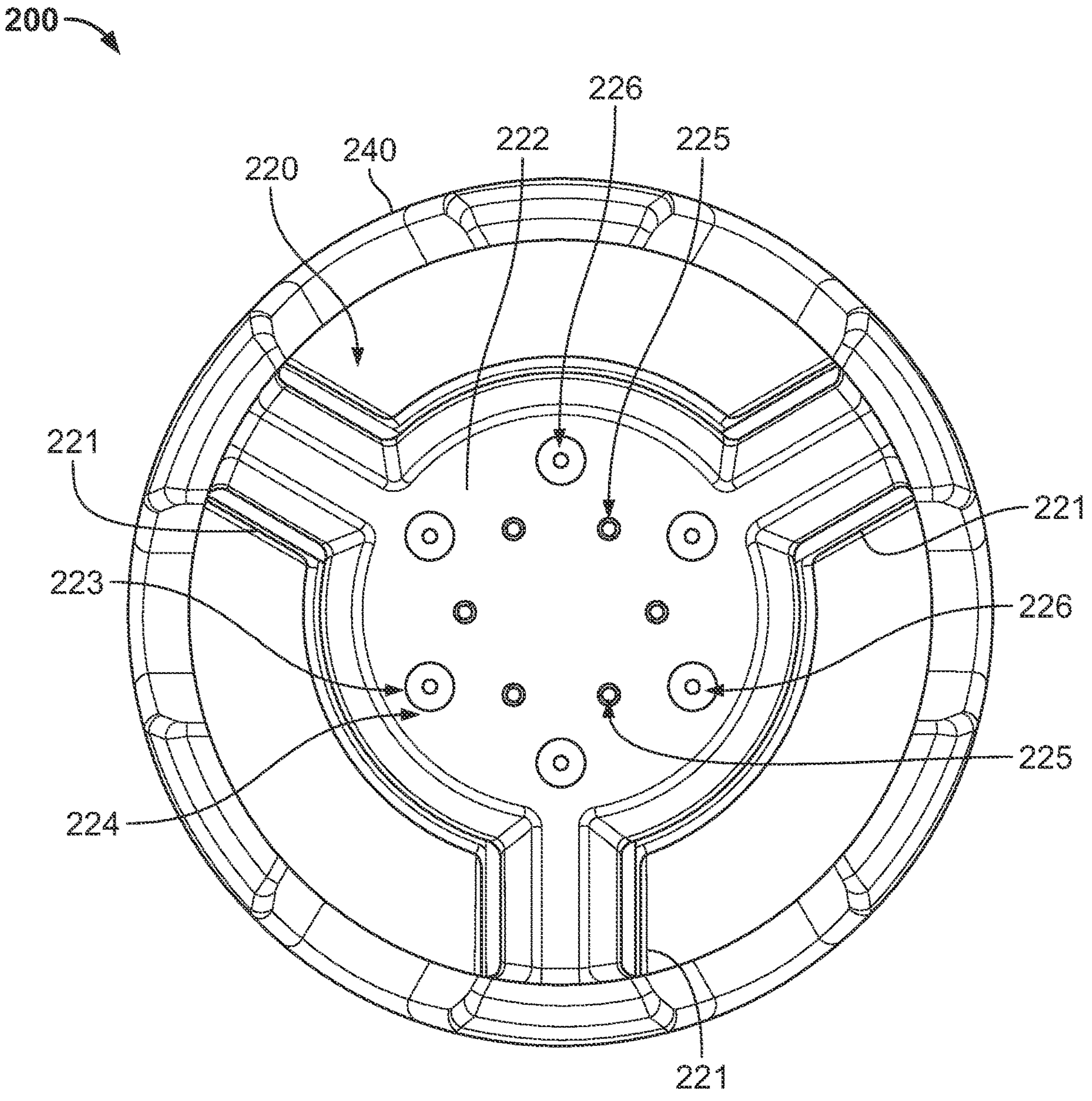
FIG. 11 is a front view of the cleaning nozzle of FIG. 10.
Figure 12:
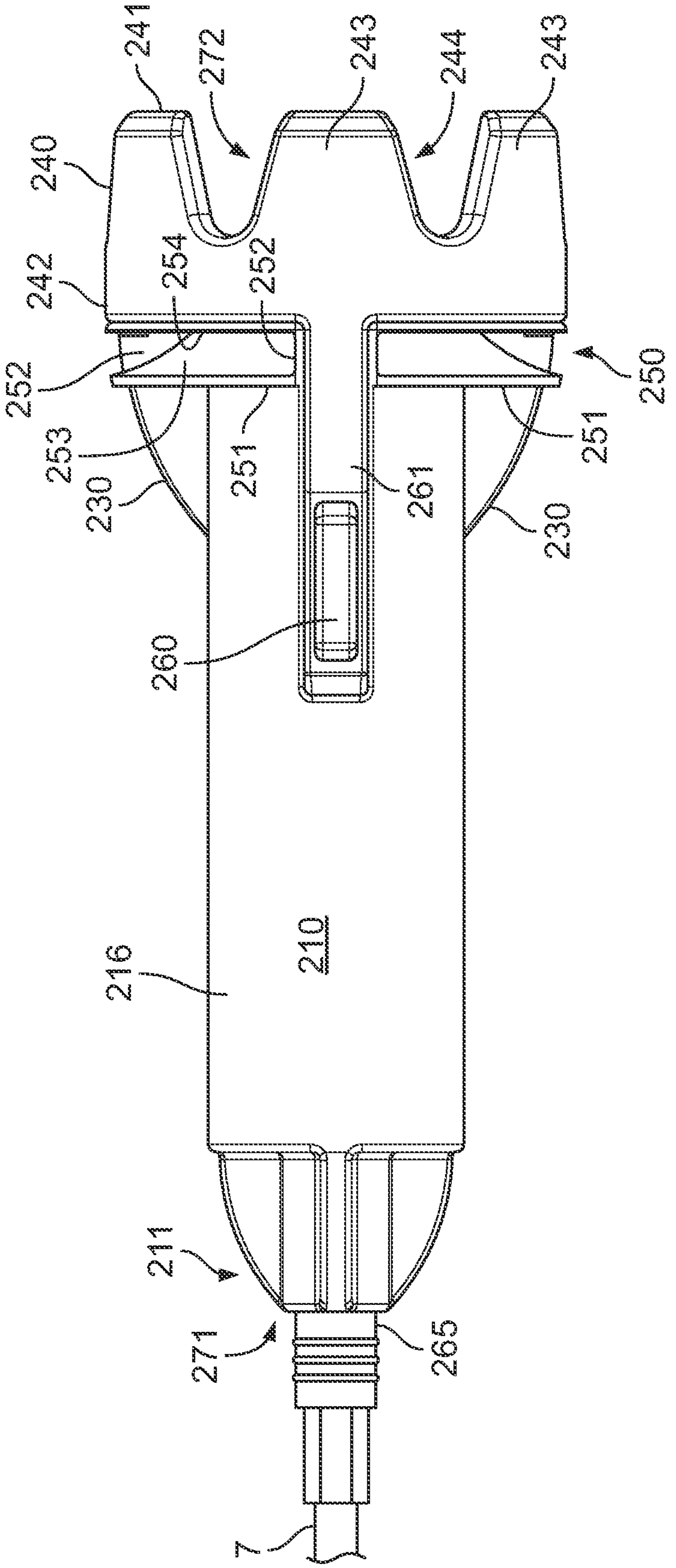
FIG. 12 is a bottom view of the cleaning nozzle of FIG. 10.
Figure 13:
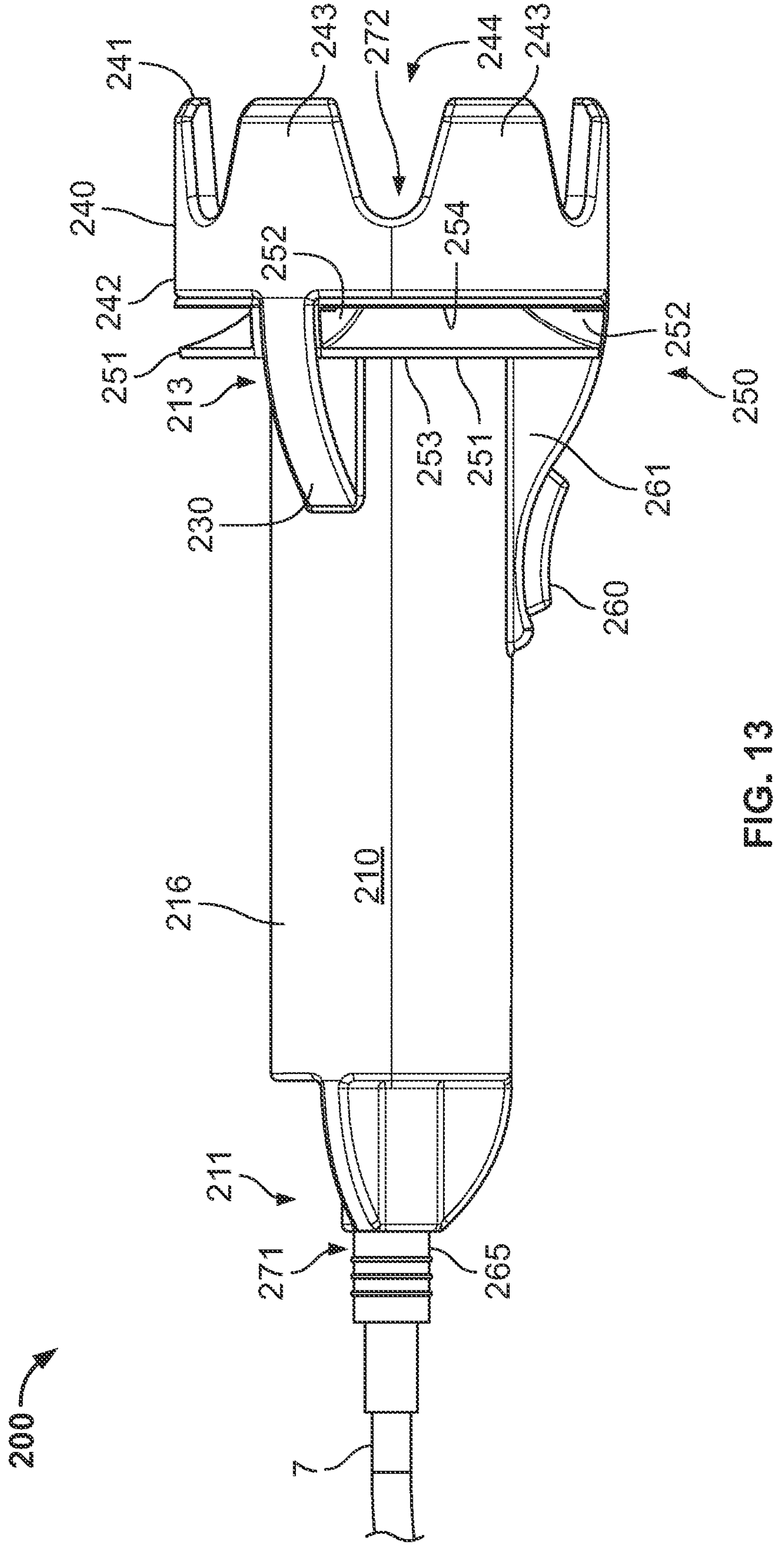
FIG. 13 is a side view of the cleaning nozzle of FIG. 10.
Figure 14:
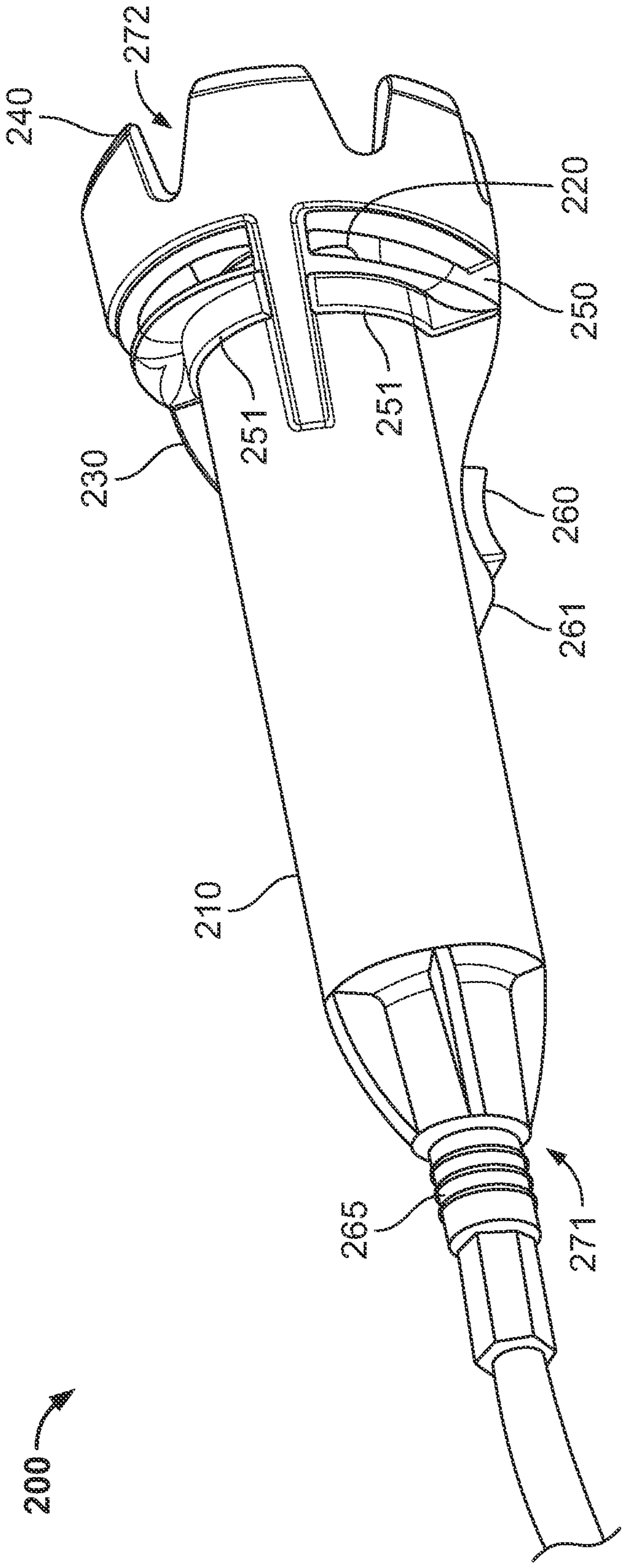
FIG. 14 is a perspective view of the cleaning nozzle of FIG. 10 with a translucent or transparent shield.

The nozzle head 220 extends from the distal end 213 of the body 210. As illustrated in FIG. 11, one or more support arms 221 extend between the nozzle head 220 and the alignment extension 240 to couple the alignment extension 240 to the body 210. In the illustrated example, the support arms 221 are integrally formed with both the nozzle head 220 and the body 210 such that the nozzle head 220 is integrally formed with the body 210. Further, the nozzle head 220 includes an outer surface 222 that defines a plurality of spray openings 223 of a respective plurality of spray holes 224. The spray holes 224 are defined by the nozzle head 220 and extend through a thickness of the nozzle head 220 to fluidly connect to the cavity of the body 210. When the operator 6 engages the button 260, pressurized air flows through the spray holes 224 and out of the spray openings 223 to clean a receptacle (e.g., the fueling receptacle 4).

In the illustrated example, the spray holes 224 include a first set of spray holes 225 and a second set of spray holes 226. The first set of spray holes 225 and a second set of spray holes 226 are configured to thoroughly clean surfaces of the fueling receptacle 4. For example, the first set of spray holes 225 are sized, positioned, and oriented to spray pressurized air onto the poppet 35 of the fueling receptacle 4 to clean surfaces of the poppet 35. The second set of spray holes 226 are sized, positioned, and oriented to spray pressurized air onto and, in turn, clean surfaces of the flow body 30 of the fueling receptacle 4.

As illustrated in FIG. 11, the first set of spray holes 225 are arranged circumferentially about a center axis of the nozzle head 220 and equidistantly apart from each other. The second set of spray holes 226 also are arranged circumferentially about a center axis of the nozzle head 220 and equidistantly apart from each other. Each of the first set of spray holes 225 are closer to each other and the center axis compared to the proximity of each of the second set of spray holes 226 to each other and the center axis. That is, a circumference formed by the first set of spray holes 225 is less than circumference formed by the second set of spray holes 226. Each of the first set of spray holes 225 are shaped and positioned in order to spray pressurized air onto surfaces of the poppet 35 of the fueling receptacle 4. For example, the spray opening 223 of each of the first set of spray holes 225 is substantially straight and perpendicular to the outer surface 222 of the nozzle head 220 in order to direct the pressurized air onto the poppet 35 housed within the flow body 30. Each of the second set of spray holes 226 are shaped and positioned in order to spray pressurized air onto surfaces of the flow body 30 of the fueling receptacle 4. For example, the spray opening 223 of each of the second set of spray holes 226 is defined by an inner chamfer to be cone-shaped (e.g., with a vertex angle of about 45 degrees) in order to direct the pressurized air radially outwardly onto the surfaces of the flow body 30. Additionally, each of the first set of spray holes 225 has a first diameter that is less than a second diameter of each of the second set of spray holes 226 to affect the flow of the pressurized air out of the first and second set of spray holes 225, 226.

The alignment extension 240 extends longitudinally beyond the nozzle head 220 and the distal end 213 of the body 210. The alignment extension 240 includes a distal end 241 and a proximal end 242. The proximal end 242 is coupled to the distal end 213 of the body 210 via the support braces 230. The distal end 241 of the alignment extension 240 includes one or more flanges 243 that define one or more slots 244. The slots 244 are configured to receive the bearings of the fueling receptacle 4 to facilitate the operator 6 in quickly and easily positioning the cleaning nozzle 200 to clean the fueling receptacle 4. In the illustrated example, the slots 244 extend linearly in a direction parallel to a longitudinal center axis of the body 210 to enable the alignment extension 240 to receive and connect to the fueling receptacle 4 without twisting and/or rotating the cleaning nozzle 200.

In the illustrated example, the flanges 243 are equally sized with each other. Further, the flanges 243 are equally spaced apart from each other circumferentially around a center axis of the alignment extension 240 such that the slots 244 are equally sized and spaced apart with respect to each other. The slots 244 are equally sized and equidistantly spaced apart to facilitate alignment with the bearings 50 of the fueling receptacle 4. For example, the alignment extension 240 defines six slots 244 to receive the fueling receptacle 4 having three bearings 50 such that the cleaning nozzle 200 need be rotated no more than 30 degrees to align the alignment extension 240 with the fueling receptacle 4. Further, each of the slots 244 defined by the flanges 243 is substantially V-shaped to facilitate the operator 6 in guiding the bearings 50 of the fueling receptacle 4 into the slots 244 of the alignment extension 240. For example, each of the slots 244 is an isosceles triangle with a large vertex angle (e.g., about 30 degrees) to facilitate the operator 6 in coupling the cleaning nozzle 200 to the fueling receptacle 4.

The support braces 230 extend between and are connected to the body 210 and the alignment extension 240. For example, the support braces 230 are integrally formed with the body 210 and the alignment extension 240. The support braces 230 extend from an outer surface 216 of the body 210 and beyond the distal end 213 to connect to a proximal end 242 of the alignment extension 240. In the illustrated example, the support braces 230 extend in a direction that is parallel to the longitudinal center axis of the body 210. The support braces 230 are arranged circumferentially about the longitudinal center axis of the body 210 and equidistantly apart from each other (e.g., three support braces are spaced apart by about 120 degrees).

The support braces 230 are reinforced bracing that is configured to provide structural support to the alignment extension 240. That is, the support braces 230 support the alignment extension 240 when a force is applied to the distal end 241 of the alignment extension 240. For example, a force may be applied by (1) the fueling receptacle 4 if the alignment extension 240 engages the fueling receptacle 4 and/or (2) pressurized air emitted by the nozzle head 220 that has reflected off the fueling receptacle 4 and back toward the alignment extension 240.

Additionally, in illustrated example, one or more openings 232 are formed between the support braces 230, the distal end 213 of the body 210, and the proximal end 242 of the alignment extension 240. The openings 232 enable reflected pressurized air to flow through the alignment extension 240 to reduce the force applied by the reflected pressurized air onto the alignment extension 240.

The shield 250 of the cleaning nozzle 200 is configured to prevent debris from blowing back onto the operator 6. For example, the shield 250 is positioned between the button 260 and the nozzle head 220 to protect the hand of the operator 6 that engages the button 260 to control operation of the cleaning nozzle 200. In the illustrated example, the shield 250 includes a plurality of shield inserts 251. Each of the shield inserts 251 is positioned adjacent the openings 232 formed between the distal end 213 of the body 210 and the proximal end 242 of the alignment extension 240. Additionally, each of the shield inserts 251 is positioned between two of the support braces 230. For example, each of the shield inserts 251 are configured to clip into place between the support braces 230, the distal end 213 of the body 210, and the proximal end 242 of the alignment extension 240. Further, in FIGS. 11-13, the shield 250 is opaque, while, in FIG. 14, the shield 250 is translucent or transparent.

As illustrated in FIG. 10, each of the shield inserts 251 include opposing side walls 252, a rear wall 253, and a front wall 254 opposite the rear wall 253. Each of the rear wall 253 and the front wall 254 extend between the opposing side walls 252. Each of the side walls 252 is configured to couple to a respective one of the support braces 230. The front wall 254 is configured to couple to the proximal end 242 of the alignment extension 240, and the rear wall 253 is configured to couple to the distal end 213 of the body 210. Additionally, each of the shield inserts 251 defines an opening 255 that is adjacent, aligned with, and fluidly connected to one of the openings 232 formed between the support braces 230 when the shield insert 251 is in place. The openings 255 of the shield inserts 251 enable pressurized air to flow through. The rear wall 253 is angled backward relative to the outer surface 216 of the body 210 to divert the pressurized air away from the hand(s) of the operator 6 holding the body 210 of the cleaning nozzle 200.

Figure 15:
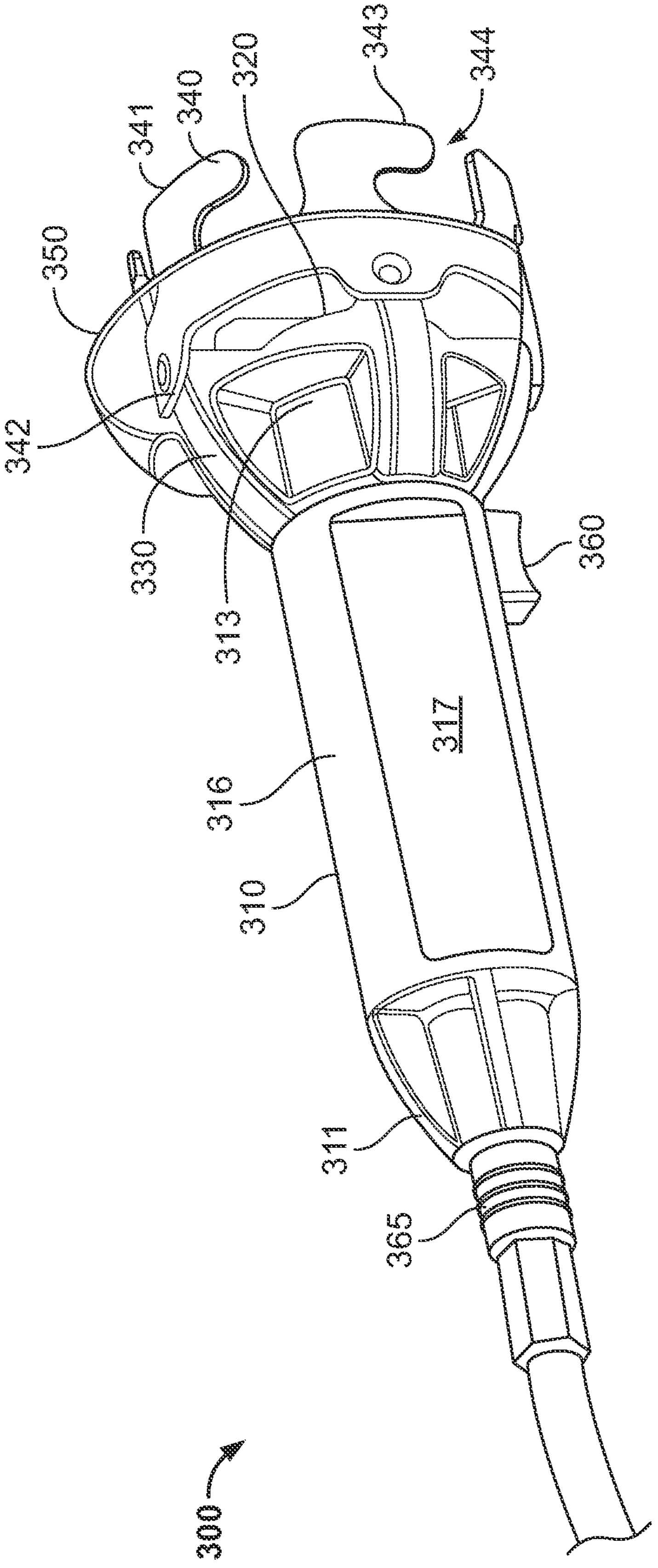
FIG. 15 is a perspective view of another example cleaning nozzle in accordance with the teachings herein.
Figure 16:
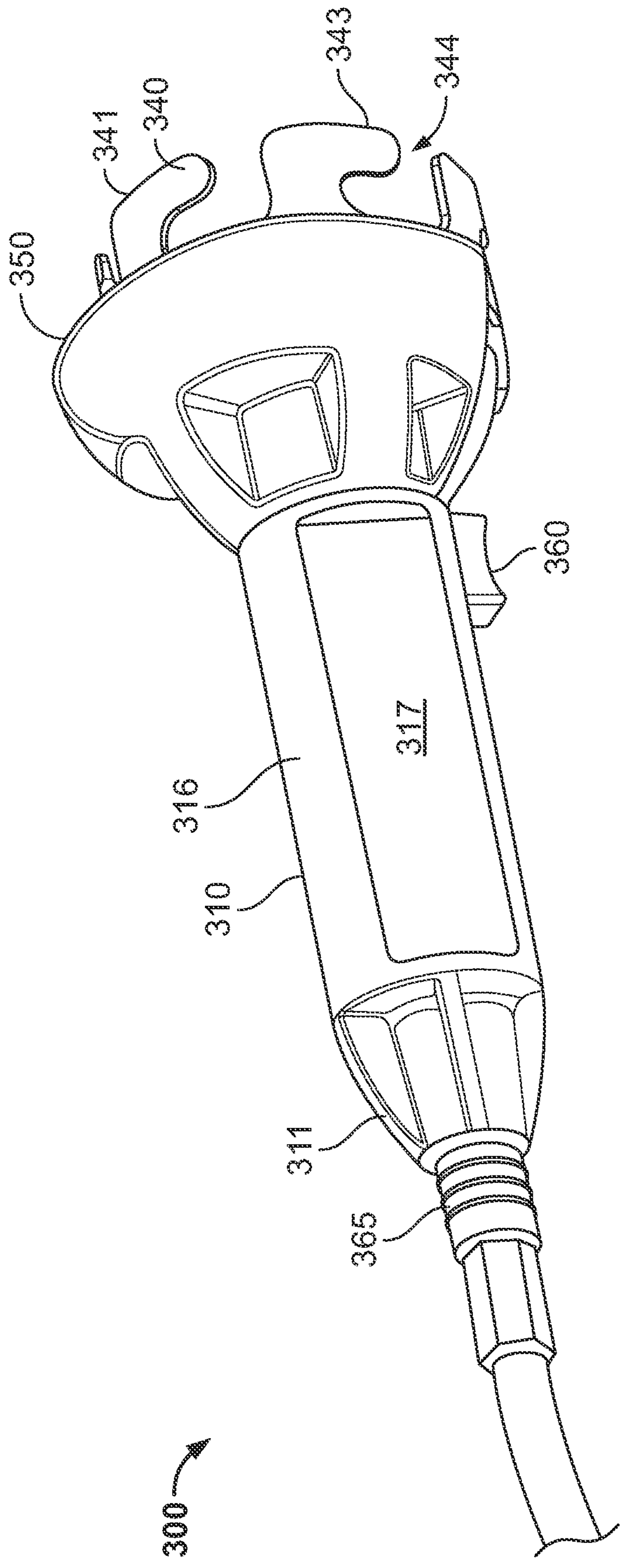
FIG. 16 is a perspective view of the cleaning nozzle of FIG. 15 with an opaque shield.

FIGS. 15-16 depict a further embodiment of a cleaning nozzle 300 in accordance with the teachings herein. In this embodiment, the cleaning nozzle 300 includes components that are identical or substantially similar to that of the cleaning nozzle 100 and/or the cleaning nozzle 200. For example, the cleaning nozzle 300 includes a valve, a spring, and a guide that is substantially similar to the valve 180, the spring 194, and the guide 190 of the cleaning nozzle 100 to control the flow of pressurized air through the cleaning nozzle 300. Additionally, the cleaning nozzle 300 includes a nozzle head 320, one or more support braces 330, a button 360, and a connector 365, that are substantially similar or identical to the nozzle head 220, the support braces 230, the button 260, and the connector 265, respectively, of the cleaning nozzle 200. As such, some features of those components are not disclosed in further detail below. Additionally, other components of the cleaning nozzle 300 are similar to that of the cleaning nozzle 200, except for differences disclosed below. For example, the cleaning nozzle 300 includes a body 310, an alignment extension 340, and a shield 350 that are similar or identical to the body 210, the alignment extension 240, and the shield 250, respectively, of the cleaning nozzle 200, except for differences disclosed below.

An outer surface 316 of the body 310 includes one or more flat surfaces 317 that extend longitudinally between a proximal end 311 and a distal end 313 of the body 310. That is, the body 310 is substantially cylindrical with one or more of the flat surfaces 317 along the outer surface 316. In the illustrated example, the body 310 includes two flat surfaces 317 that have substantially identical dimensions. The flat surfaces 317 are parallel to each other and positioned on opposing sides of the body 310. The shape and position of the flat surfaces 317 facilitate the operator 6 in gripping the body 310 as the orientation of the cleaning nozzle 300 is adjusted to align with the fueling receptacle 4.

The alignment extension 340 extends longitudinally beyond the nozzle head 320 and the distal end 313 of the body 310. A proximal end 342 of the alignment extension 340 is connected to and extends from the support braces 330 such that the alignment extension 340 is coupled to the body 310 via the support braces 330. In the illustrated example, the alignment extension 340 is integrally formed with the support braces 330 and the body 310. Additionally, a distal end 341 of the alignment extension 340 forms a bayonet mount that is configured to securely receive the bearings 50 of the fueling receptacle 4. The distal end 341 of the alignment extension 340 includes one or more L-shaped flanges 343 that define one or more L-shaped slots 344. The slots 344 (e.g., six slots) are equally sized and equidistantly spaced apart to facilitate alignment with the bearings 50 of the fueling receptacle 4. To securely connect the cleaning nozzle 300 to the fueling receptacle 4, the bearings 50 of the fueling receptacle 4 are inserted into the L-shaped slots 344 and the cleaning nozzle 300 is subsequently rotated while the bearings 50 remain in the L-shaped slots 344.

The shield 350 of the cleaning nozzle 300 is substantially dome-shaped. The shield 350 extends from the distal end 313 of the body 310 adjacent the button 360 and toward the distal end 341 of the alignment extension 340. The shield 350 at least partially encloses the nozzle head 320, the support braces 330, and the alignment extension 340 to prevent debris from blowing back onto the operator 6 as the operator 6 interacts with the button 360 to control operation of the cleaning nozzle 300. For example, the shield 350 covers the nozzle head 320, the support braces 330, and a portion of the alignment extension 340 to prevent pressurized air emitted from the nozzle head 320 and debris blown by the pressurized air from blowing back onto the hands of the operator 6. Additionally, in FIG. 15, the shield 250 is translucent or transparent, while, in FIG. 16, the shield 250 is opaque.

Figure 17:
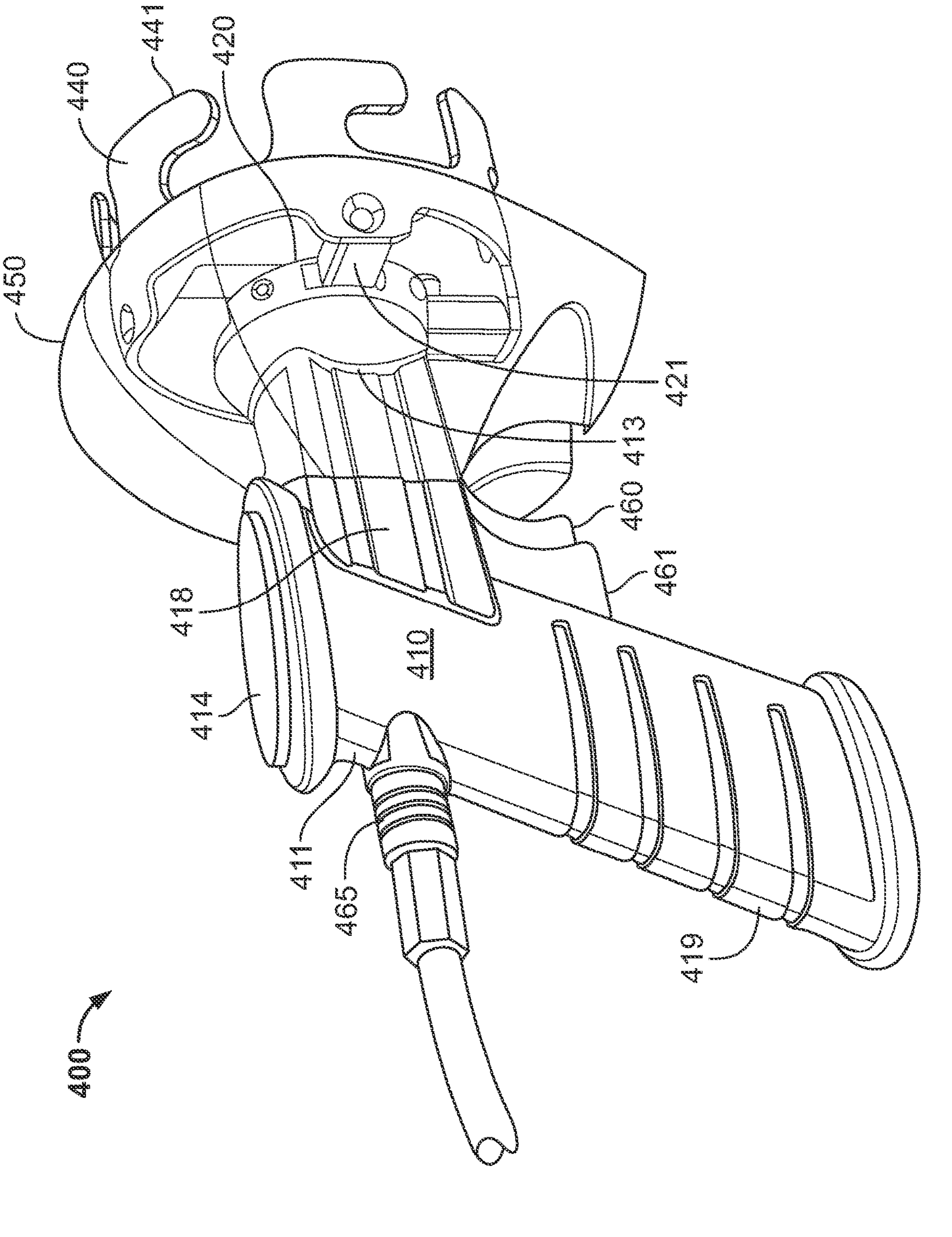
FIG. 17 is a perspective view of another example cleaning nozzle in accordance with the teachings herein.
Figure 18:
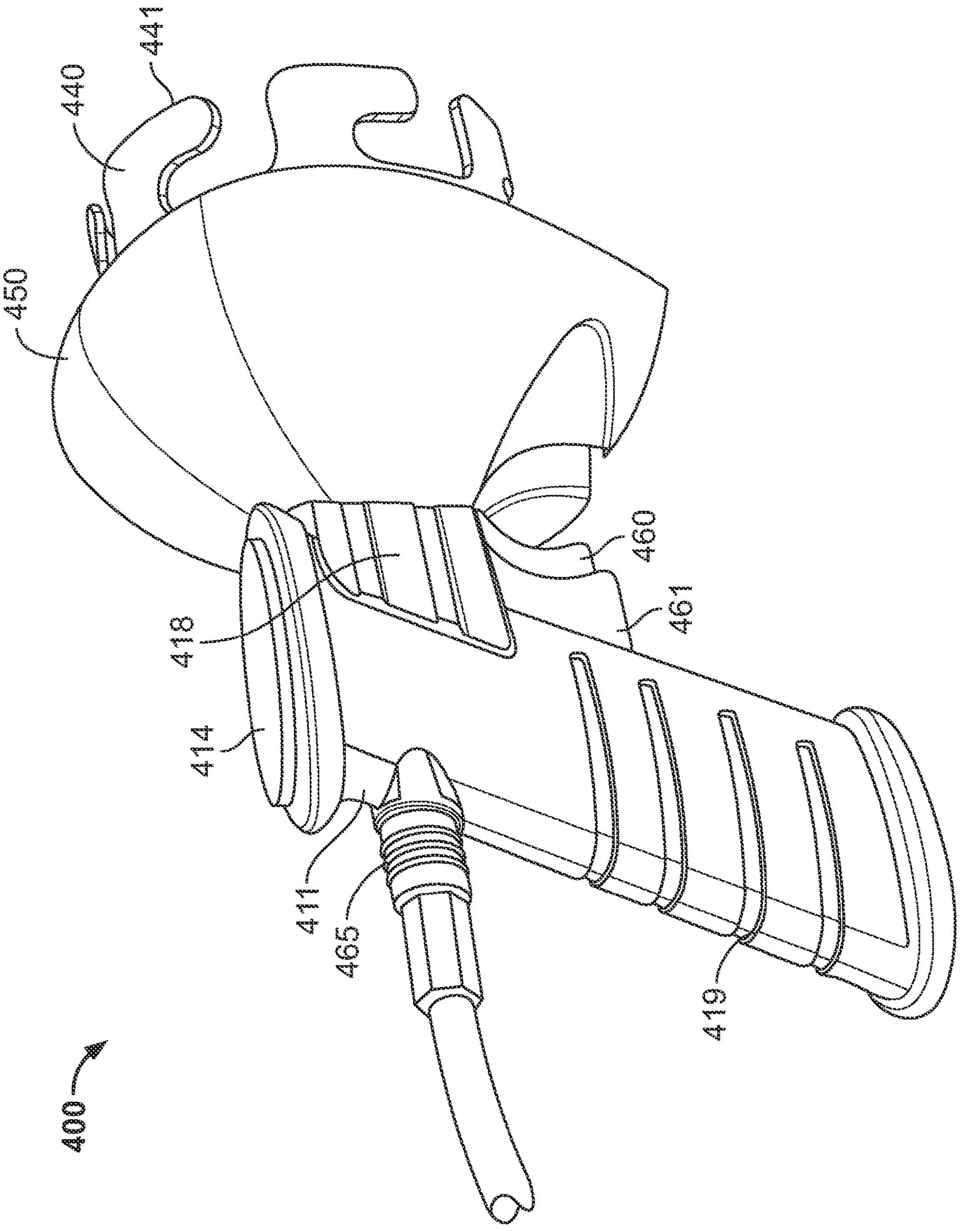
FIG. 18 is a perspective view of the cleaning nozzle of FIG. 17 with an opaque shield.

FIGS. 17-18 depict a further embodiment of a cleaning nozzle 400 in accordance with the teachings herein. In this embodiment, the cleaning nozzle 400 includes components that are identical or substantially similar to that of the cleaning nozzle 100, the cleaning nozzle 200, and/or the cleaning nozzle 300. For example, the cleaning nozzle 400 includes a valve, a spring, and a guide that is substantially similar to the valve 180, the spring 194, and the guide 190 of the cleaning nozzle 100 to control the flow of pressurized air through the cleaning nozzle 400. Additionally, the cleaning nozzle 400 includes a nozzle head 420, a button 460, and a connector 465, that are substantially similar or identical to the nozzle head 220, the button 260, and the connector 265, respectively, of the cleaning nozzle 200. The cleaning nozzle 400 also includes an alignment extension 440 that is substantially similar or identical to the alignment extension 340 of the cleaning nozzle 300. As such, some features of those components are not disclosed in further detail below. Additionally, other components of the cleaning nozzle 400, such as a body 410 and a shield 450, are similar to that of the cleaning nozzle 200 and/or the cleaning nozzle 300, except for differences disclosed below.

The body 410 includes a barrel 418 and a handle 419. The barrel 418 includes a proximal end 411 and an opposing distal end 413. The connector 465 is coupled to the proximal end 411, and the nozzle head 420 extends from the distal end 413. The barrel 418 also defines a cavity in which the valve of the cleaning nozzle 400 is housed between the connector 465 and the nozzle head 420. Additionally, a cap 414 is detachably coupled to the barrel 418 of the body 410. The cap 414 is configured to couple to the barrel 418 to further enclose the components housed within the body 410 of the cleaning nozzle 400. The cap 414 also is configured to be decoupled from the barrel 418 by the operator 6 to provide access for maintenance purposes to the components housed within the body 410.

The handle 419 extends transversely from the barrel 418 adjacent the proximal end 411. For example, the handle 419 is shaped and oriented to facilitate the operator 6 in easily holding and operating the cleaning nozzle 400. The button 460 extends from the handle 419 of the body 410. The button 460 is housed by and at least partially extends from a button housing 461 that extends from the handle 419 underneath and adjacent the barrel 418. The button housing 461 is integrally formed with handle 419 and/or the barrel 418. Further, in the illustrated example, the button 460 is a trigger-style pushbutton. In other examples, the button 460 is a toggle button, a rocker button, a rotary knob, a lever, a slider, or any other mechanical input device that enables the operator 6 to control operation of the cleaning nozzle 400.

The shield 450 of the cleaning nozzle 400 is substantially dome-shaped. The shield 450 extends from the barrel 418 of the body 410 adjacent the button 460 and toward a distal end 441 of the alignment extension 440. In the illustrated example, the alignment extension is coupled to (e.g., integrally formed with) and extends from support arms 421 of the nozzle head 420. The shield 450 at least partially encloses the nozzle head 420 and the alignment extension 440 to prevent debris from blowing back onto the operator 6 as the operator 6 holds the handle 419 of the cleaning nozzle 400. For example, the shield 450 covers the nozzle head 420 and a portion of the alignment extension 440 to prevent pressurized air emitted from the nozzle head 420 and debris blown by the pressurized air from blowing back onto the hands of the operator 6.

Additionally, in FIG. 17, the shield 450 is translucent or transparent, while, in FIG. 18, the shield 450 is opaque.

Figure 19:
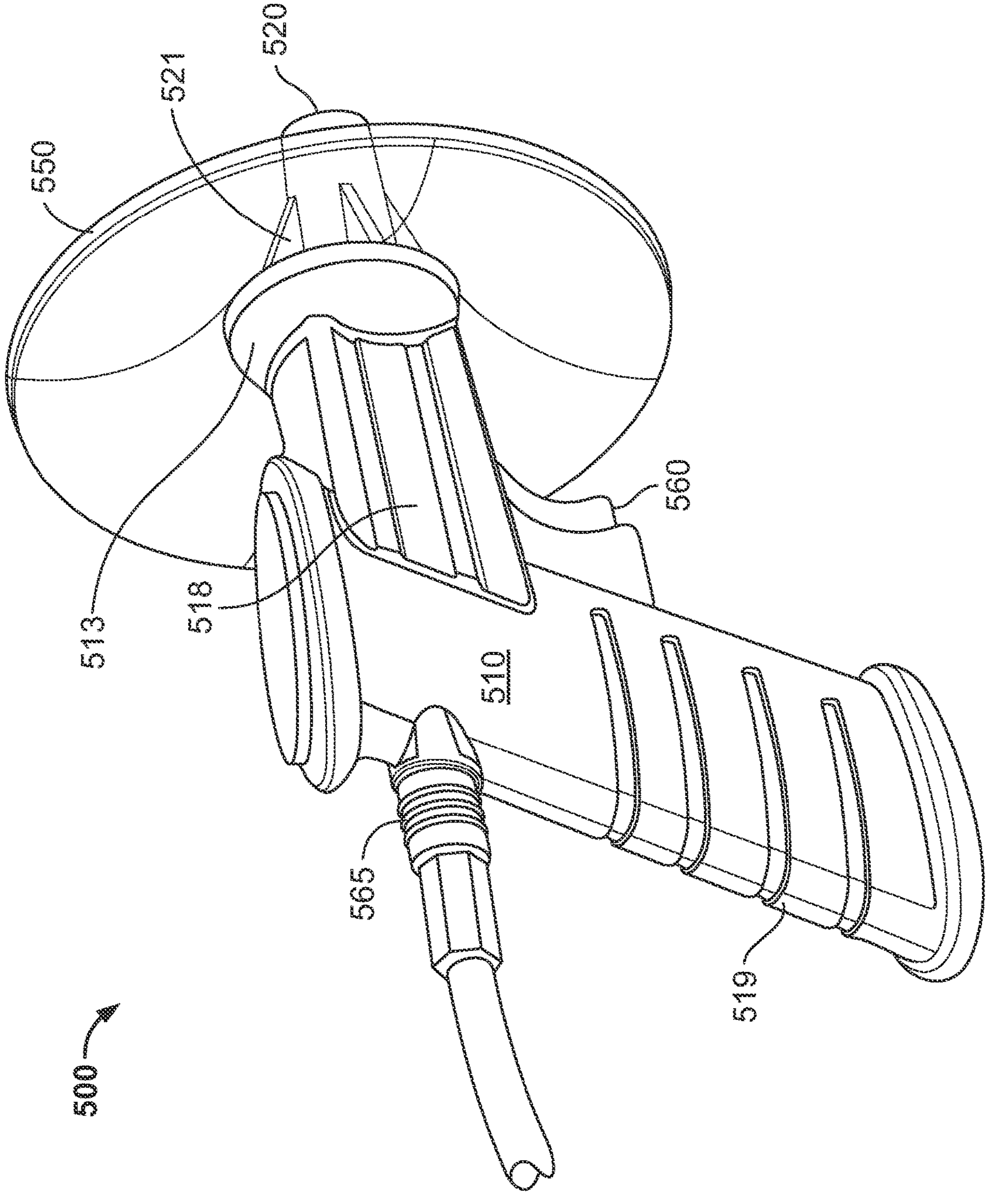
FIG. 19 is a perspective view of another example cleaning nozzle in accordance with the teachings herein.
Figure 20:
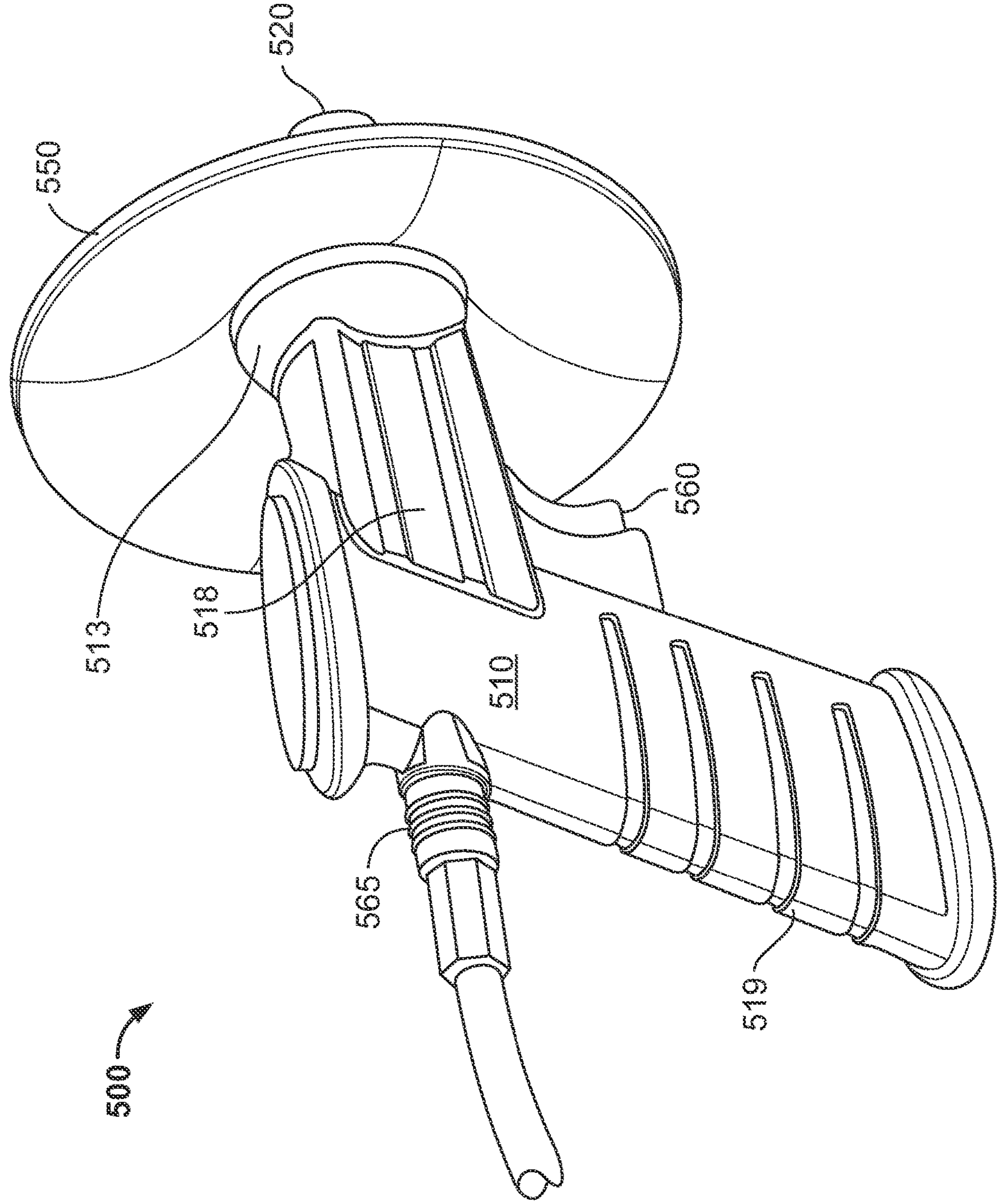
FIG. 20 is a perspective view of the cleaning nozzle of FIG. 19 with an opaque shield.
Figure 21:
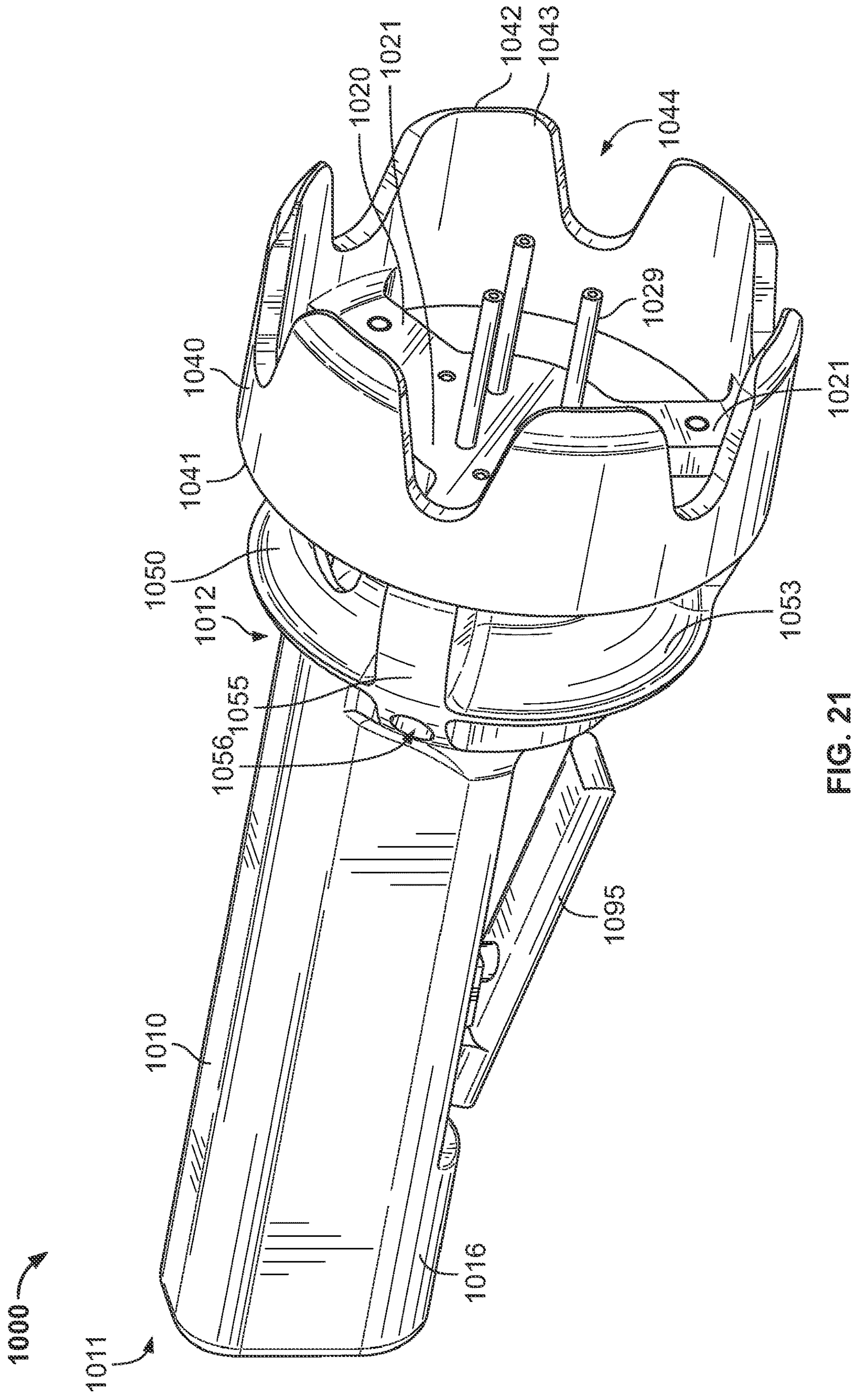
FIG. 21 is a perspective view of another example cleaning nozzle in accordance with the teachings herein.
Figure 22:
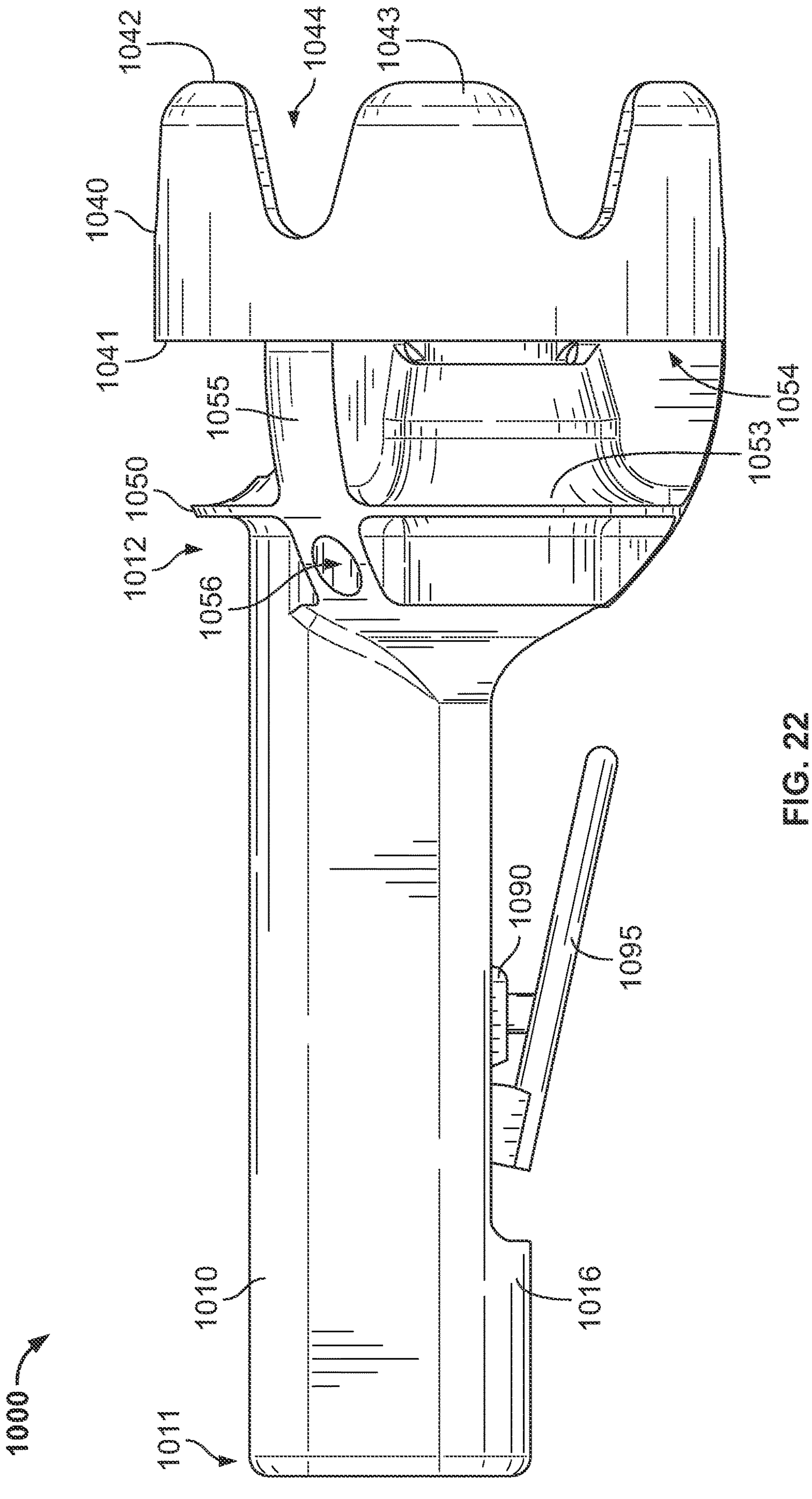
FIG. 22 is a side view of the cleaning nozzle of FIG. 21.

FIGS. 19-20 depict a further embodiment of a cleaning nozzle 500 in accordance with the teachings herein. In this embodiment, the cleaning nozzle 500 includes components that are identical or substantially similar to that of the cleaning nozzle 100, the cleaning nozzle 200, the cleaning nozzle 300, and/or the cleaning nozzle 400. For example, the cleaning nozzle 500 includes a valve, a spring, and a guide that is substantially similar to the valve 180, the spring 194, and the guide 190 of the cleaning nozzle 100 to control the flow of pressurized air through the cleaning nozzle 500. Additionally, the cleaning nozzle 500 includes a button 560 and a connector 565 that are substantially similar or identical to the button 260 and the connector 265, respectively, of the cleaning nozzle 200. The cleaning nozzle 500 also includes a body 510 that is substantially similar or identical to the body 410 of the cleaning nozzle 400. As such, some features of those components are not disclosed in further detail below. Additionally, other components of the cleaning nozzle 500, such as a nozzle head 520 and a shield 550, are similar to that of the cleaning nozzle 200, the cleaning nozzle 300, and/or the cleaning nozzle 400, except for differences disclosed below.

The nozzle head 520 of the cleaning nozzle 500 is substantially cylindrical and extends from a distal end 513 of barrel 518 of the body 510. A proximal end of the nozzle head 520 is connected to the body 510, and an opposing distal end defines one or more spray holes configured to emit the pressurized air. In the illustrated example, one or more support arms 521 extend between the nozzle head 520 and the body 510 to provide structural support to the nozzle head 520 (e.g., if the nozzle head 520 engages the fueling receptacle 4, if pressurized air reflects back off the fueling receptacle 4, etc.).

The nozzle head 520 of the cleaning nozzle 500 has a substantially smaller outer diameter compared to that of the fueling receptacle 4. The relatively small size of the nozzle head 520 enables the operator 6 to tilt, rotate, and/or otherwise adjust an orientation of the cleaning nozzle 500 to adjust the direction at which the spray holes spray the pressurized air onto the fueling receptacle 4. In turn, the size of the nozzle head 520 enables the operator 6 to target different portions of the fueling receptacle 4 for cleaning.

The shield 550 of the cleaning nozzle 500 is substantially disc-shaped. In the illustrated example, the shield 550 extends radially outward from between the distal end 513 of the body 510 and the proximal end of the nozzle head 520. The shield is located between a handle 519 of the body 510 and the nozzle head 520 to prevent pressurized air emitted from the nozzle head 520 and debris blown by the pressurized air from blowing back onto the hands of the operator 6. Additionally, in FIG. 19, the shield 550 is translucent or transparent, while, in FIG. 20, the shield 550 is opaque.

Figure 23:
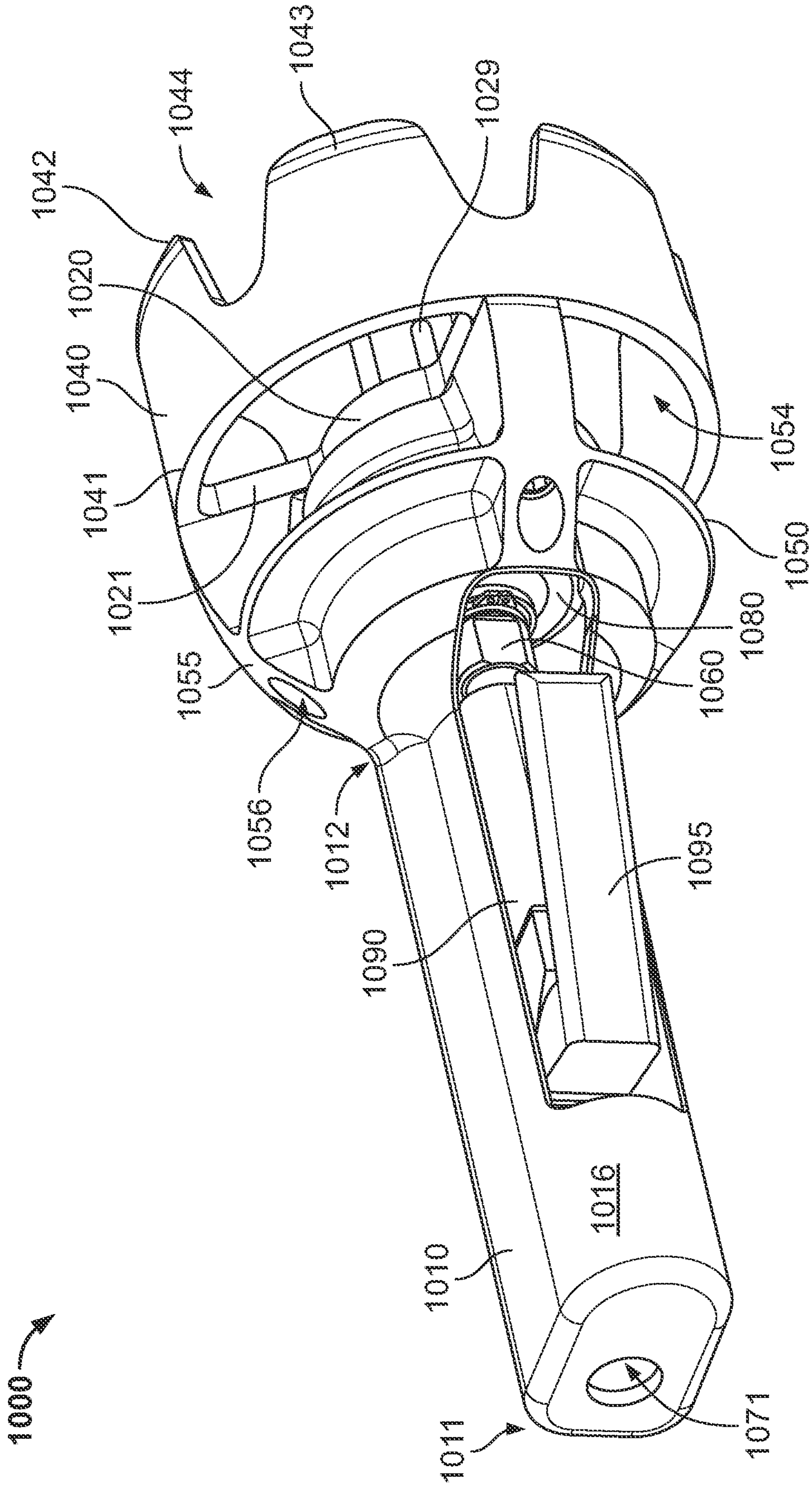
FIG. 23 is another perspective view of the cleaning nozzle of FIG. 21.
Figure 24:
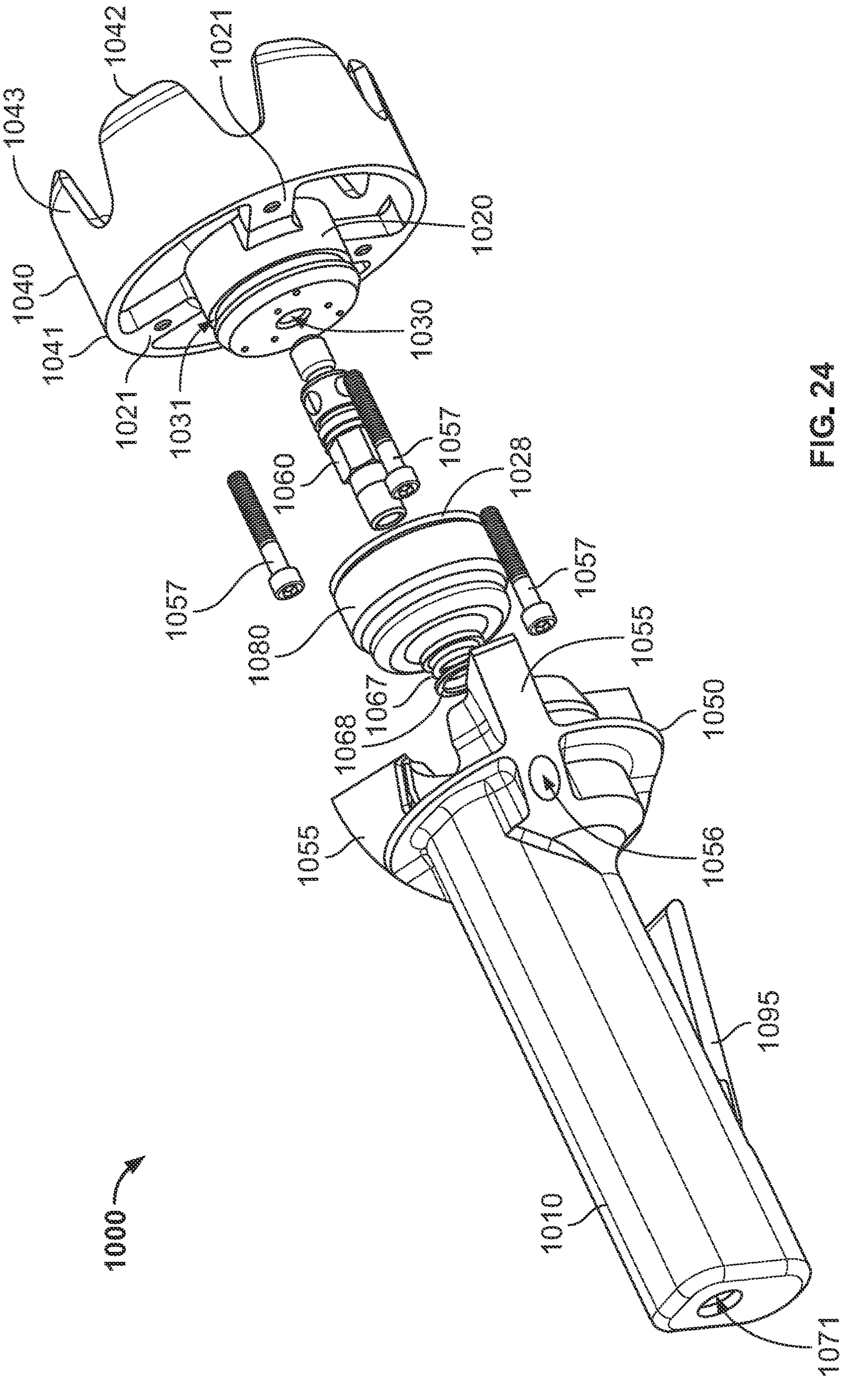
FIG. 24 is an exploded perspective view of the cleaning nozzle of FIG. 21.
Figure 25:
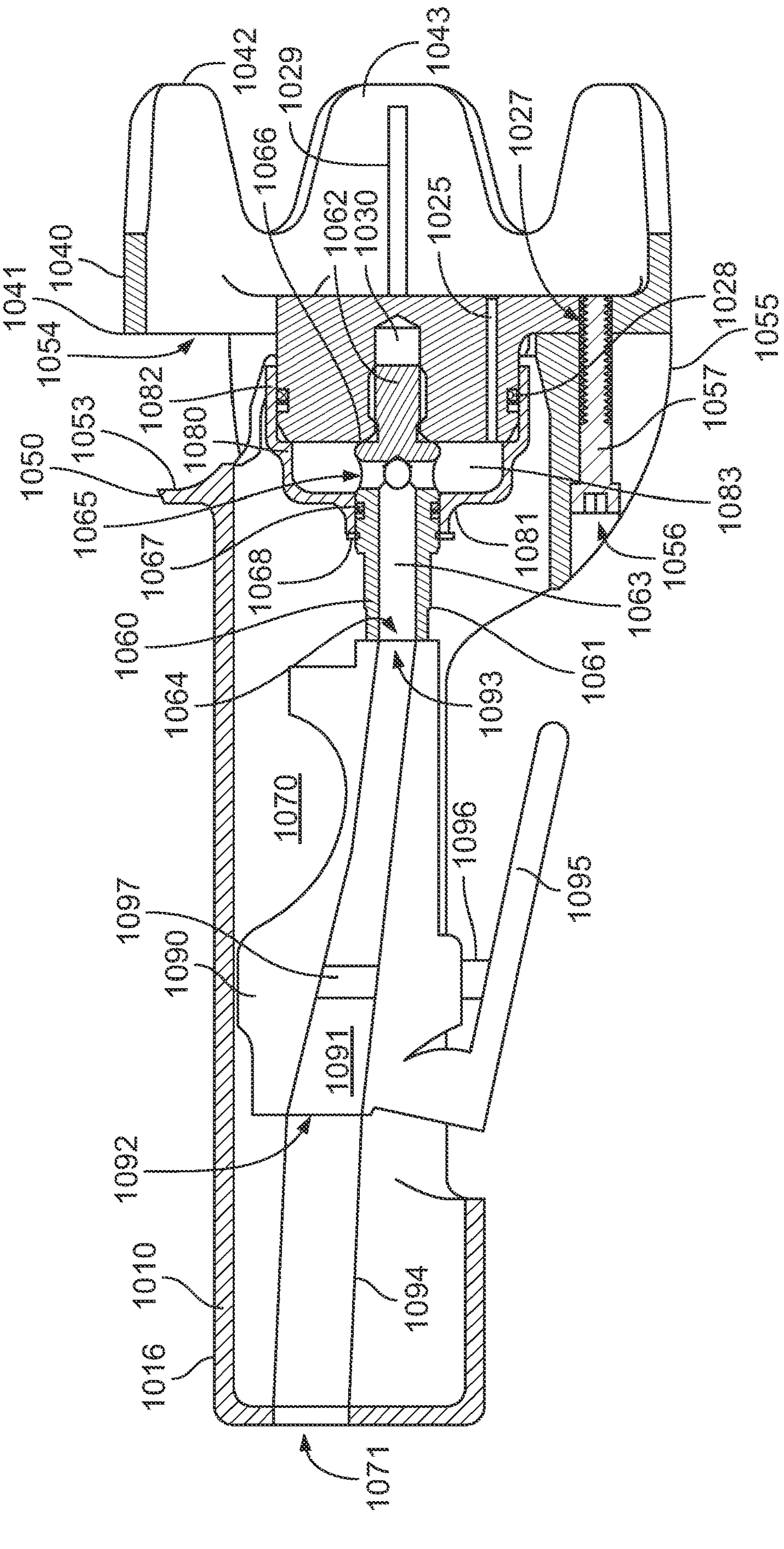
FIG. 25 is a cross-sectional side view of the cleaning nozzle of FIG. 21.
Figure 26:
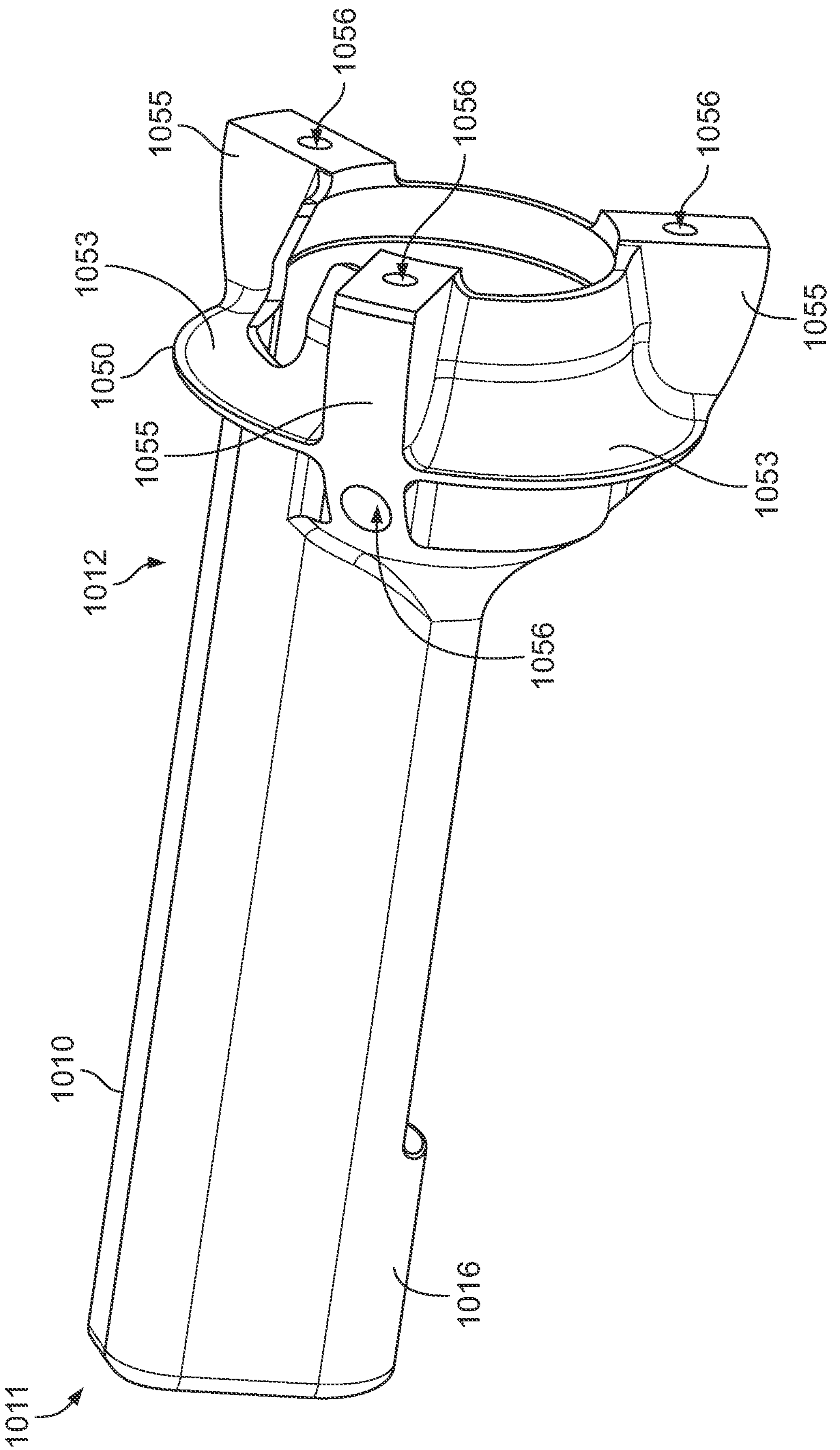
FIG. 26 is a perspective view of an example body of the cleaning nozzle of FIG. 21.

FIGS. 21-28 depict another embodiment of a cleaning nozzle 1000 in accordance with the teachings herein. As shown in FIGS. 24 and 25, the cleaning nozzle 1000 includes a body 1010, a nozzle head 1020, an alignment extension 1040, a shield 1050, an insert 1060 (also referred to as a "flow insert" and an "airflow insert"), a connector 1080 (also referred to as a "flow connector" and an "airflow connector"), and a blower 1090 (also referred to as a "blowgun").

As shown in FIGS. 21-25, a proximal end 1011 of the body 1010 (also referred to as a "first end" or an "inlet end") defines an inlet 1071 of the cleaning nozzle 1000. The proximal end 1011 is configured to fixedly receive a connector (e.g., the connector 265 of FIGS. 10 and 12-14) that is fixed to the cleaning hose 7 to enable the cleaning nozzle 100 to receive pressurized air and/or other cleaning fluid from a corresponding source. The nozzle head 120 defines an outlet 1072 of the cleaning nozzle 1000. As disclosed below in greater detail, the inlet 1071 and the outlet 1072 of the cleaning nozzle 1000 are selectively in fluid connection together via the blower 1090. When the operator engages a button 1095 of the blower 1090, pressurized air is to travel into the inlet 1071, through tubing 1094, and through the blower 1090. In turn, the pressurized air is to travel through the insert 1060, travel through the connector 1080, and be sprayed out through the outlet 1072 to clean the fueling receptacle 4.

As shown in FIGS. 21-24 and 26, the body 1010 has a substantially cuboid shape. In other examples, the body 1010 may have any other shape, such as a substantially cylindrical shape that enables an operator to hold the body 1010 of the cleaning nozzle 1000. As shown in FIG. 25, the body 1010 defines a cavity 1070.

As shown in FIGS. 21-26, the shield 1050 is coupled to a distal end 1012 of the body 1010. In the illustrated example, the shield 1050 is integrally formed with the body 1010 at the distal end 1012. The shield 1050 is configured to prevent debris from blowing back onto the operator 6 holding the body 1010. For example, the shield 1050 is positioned between the nozzle head 1020 and a portion of the body 1010 held by the operator 6 to protect the hands of the operator 6 during operation. The shield 1050 includes one or more posts 1055. Each of the posts 1055 defines a through hole 1056 through which a respective fastener 1057 extends to couple the shield 1050 to the nozzle head 1020. The shield 1050 also includes a plurality of walls 1053 each of which is positioned between two of the posts 1055. Openings 1054 are formed between the posts 1055 and adjacent the walls 1053. The openings 1054 enable reflected pressurized air to flow through the alignment extension 1040 to reduce the force applied by reflected pressurized air onto the alignment extension 1040. Further, each of the walls 1053 is angled backward and outward relative to the outer surface 1016 of the body 1010 to divert the pressurized air, that has been sprayed by the nozzle head 1020 and reflected back toward the body 1010, away from the hands of the operator 6 holding the body 1010 of the cleaning nozzle 1000.

The nozzle head 1020 extends outwardly beyond the distal end 1012 of the body 1010. One or more support arms 1021 extend between the nozzle head 1020 and the alignment extension 1040. In the illustrated example, the support arms 1021 are integrally formed with the alignment extension 1040 such that the nozzle head 1020 is integrally formed with the alignment extension 1040. As shown in FIG. 25, the fasteners 1057 are configured to couple the nozzle head 1020 to the shield 1050 that is integrally formed with the body 1010 by (1) extending through the through holes 1056 defined by the posts 1055 and (2) extending into and being threadably received by threaded holes 1027 defined by the nozzle head 1020.

Figure 27:
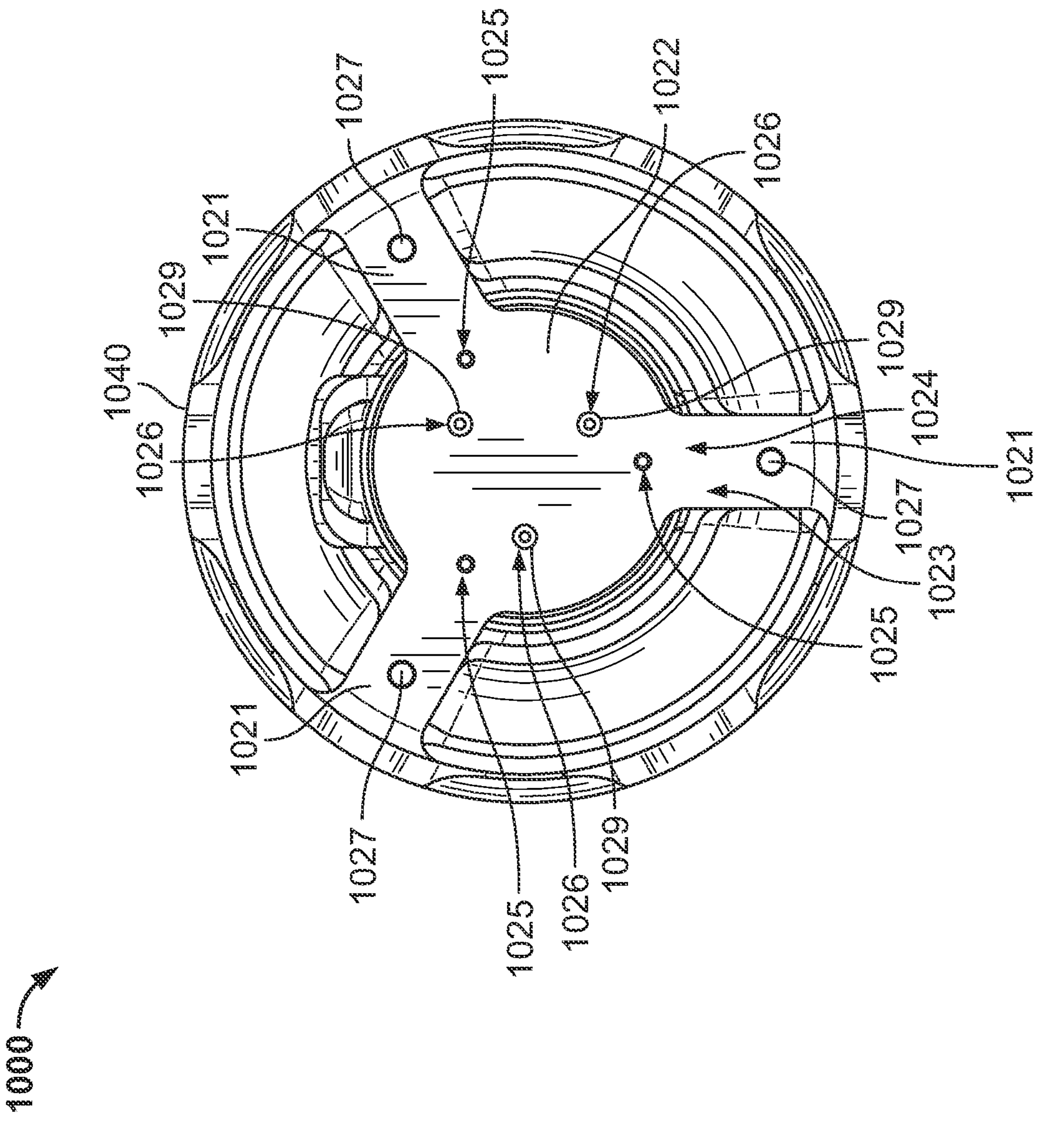
FIG. 27 is a front view of the cleaning nozzle of FIG. 21.

As shown in FIG. 27, the nozzle head 1020 includes an outer surface 1022 that defines a plurality of spray openings 1023 of a respective plurality of spray holes 1024. As shown in FIG. 25, the spray holes 1024 are defined by the nozzle head 1020 and extend through a thickness of the nozzle head 1020 to fluidly connect to the blower 1090 via the connector 1080 and the insert 1060. Pressurized air is to flow through the spray holes 1024 and out of the spray openings 1023 to clean a fueling receptacle (e.g., the fueling receptacle 4).

In the illustrated example, the spray holes 1024 include a first set of spray holes 1025 and a second set of spray holes 1026. The first set of spray holes 1025 extend through the body of the nozzle head 1020. The second set of spray holes 1026 extend through (i) the body of the nozzle head 1020 and (ii) pins 1029 that extend outwardly from and beyond the outer surface 1022 of the nozzle head 1020. The first set of spray holes 1025 and a second set of spray holes 1026 are configured to thoroughly clean surfaces of the fueling receptacle 4. For example, the first set of spray holes 1025 are sized, positioned, and oriented to spray pressurized air onto a first portion of the fueling receptacle 4. The second set of spray holes 126 are sized, positioned, and oriented to spray pressurized air onto a second portion of the fueling receptacle 4. For example, as illustrated in FIG. 27, the first set of spray holes 1025 are arranged circumferentially about a center axis of the nozzle head 1020 and equidistantly apart from each other. The second set of spray holes 1026 also are arranged circumferentially about a center axis of the nozzle head 1020 and equidistantly apart from each other. Each of the first set of spray holes 1025 are farther from each other and the center axis compared to the proximity of each of the second set of spray holes 1026 to each other and the center axis. That is, a circumference formed by the first set of spray holes 1025 is greater than circumference formed by the second set of spray holes 1026.

As shown in FIGS. 21-25, the alignment extension 1040 is positioned longitudinally beyond the distal end 1012 of the body 1010 and extends longitudinally beyond the nozzle head 1020. The alignment extension 1040 includes a distal end 1041 and a proximal end 1042. The proximal end 1042 is coupled to and extends from the nozzle head 1020. As shown in FIGS. 23-24 and 27, the alignment extension 1040 is integrally formed with the nozzle head 1020.

The distal end 1041 of the alignment extension 1040 includes one or more flanges 1043 that define one or more slots 1044. The slots 1044 are configured to receive the bearings 50 of the fueling receptacle 4 to facilitate the operator 6 in quickly and easily positioning the cleaning nozzle 1000 to clean the fueling receptacle 4. In the illustrated example, the slots 1044 extend linearly in a direction parallel to a longitudinal center axis of the body 1010 to enable the alignment extension 1040 to receive and connect to the fueling receptacle 4 without twisting and/or rotating the cleaning nozzle 1000.

In the illustrated example, the flanges 1043 are equally sized with each other. Further, the flanges 1043 are equally spaced apart from each other circumferentially around a center axis of the alignment extension 1040 such that the slots 1044 are equally sized and spaced apart with respect to each other. The slots 1044 are equally sized and equidistantly spaced apart to facilitate alignment with the bearings 50 of the fueling receptacle 4. For example, the alignment extension 1040 defines six slots 1044 to receive the fueling receptacle 4 having three bearings 50 such that the cleaning nozzle 1000 need be rotated no more than 30 degrees to align the alignment extension 1040 with the fueling receptacle 4. Further, each of the slots 1044 defined by the flanges 1043 is substantially V-shaped to facilitate the operator 6 in guiding the bearings 50 of the fueling receptacle 4 into the slots 1044 of the alignment extension 1040. For example, each of the slots 1044 is an isosceles triangle with a large vertex angle (e.g., about 30 degrees) to facilitate the operator 6 in coupling the cleaning nozzle 1000 to the fueling receptacle 4.

FIG. 25 is cross-sectional views that depicts the arrangement of the insert 1060, the connector 1080, and the blower 1090 relative to the body 1010, the nozzle head 1020, the alignment extension 1040, and the shield 1050.

When the cleaning nozzle 100 is coupled to the fueling receptacle 4, the slots 144 of the alignment extension 140 receive the bearings 50 of the fueling receptacle 4 to maintain the position of the cleaning nozzle 100 relative to the fueling receptacle 4. Additionally the spray holes 124 of the nozzle head 120 are positioned to thoroughly clean the surfaces of the fueling receptacle 4 without requiring the operator 6 to reposition the cleaning nozzle 100 relative to the fueling receptacle 4.

Figure 28:
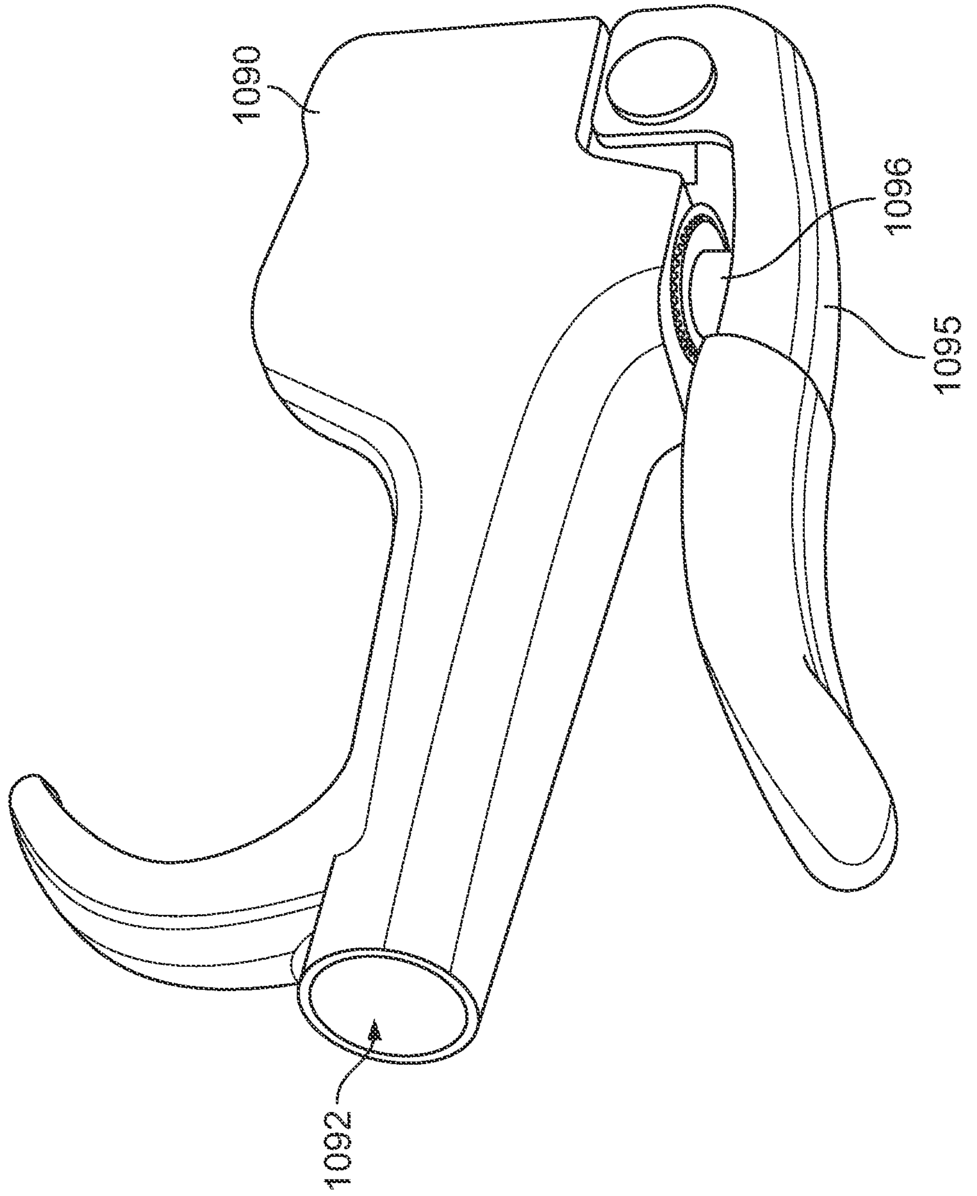
FIG. 28 depicts an example blower of the cleaning nozzle of FIG. 21.

As shown in FIGS. 25 and 28, the blower 1090 includes a button 1095 and an actuator 1096 that is coupled to and operatively connects the button 1095 to a valve 1097 of the blower 1090. The blower 1090 is at least partially housed within the cavity 1070 of the body 1010. The button 1095 of the blower 1090 extends beyond and outside of the body 1010 to enable an operator to engage the button 1095. In the illustrated example, the button 1095 is a trigger-style lever. In other examples, the button 1095 is a toggle button, a rocker button, a rotary knob, a slider, or any other mechanical input device that enables the operator 6 to control operation of the blower 1090 and, in turn, the cleaning nozzle 1000.

The blower defines an inlet 1092, an outlet 1093, and a flow path 1091 that extends between the inlet 1092 and the outlet 1093. The inlet 1092 is fluidly coupled to the tubing 1094, and the outlet 1093 is fluidly coupled to insert 1060. The tubing 1094 extends between the inlet 1071 of the cleaning nozzle 1000 to the inlet 1092 of the blower 1090 to fluidly connect the inlet 1071 to the flow path 1091 of the blower 1090. The valve 1097 of the blower 1090 is configured to selectively fluidly connect the outlet 1093 of the blower 1090 to the inlet 1092. As shown in FIG. 25, the valve 1097 is in a closed position when the button 1095 is in a disengaged position. When the valve 1097 is closed, the flow path 1091 is closed to prevent pressurized air from travelling through the blower 1090. In contrast, the valve 1097 is an open position when the button 1095 is in an engaged position. When the valve 1097 is opened, the flow path 1091 is opened to enable pressurized air to travel through the blower 1090.

As shown in FIGS. 24-25, the insert 1060 includes a first portion 1061 adjacent a first end and a second portion 1062 adjacent an opposing second end. The first portion 1061 and the second portion 1062 are adjacent, connected to, and integrally formed with each other.

The first portion 1061 of the insert 1060 defines a flow path 1063 that extends between and fluidly connects an inlet 1064 and one or more outlets 1065. The inlet 1064 is located at the first end of the insert 1060, and the outlets 1065 are located between the ends of the insert 1060. The outlets 1065 include a plurality of ports that are positioned radially about the first portion 1061 of the insert 1060. In the illustrated example, the outlets 1065 include four ports that extend radially and are equidistantly spaced apart from each other. In other examples, the outlets 1065 may include more or less ports and/or be arranged in a different configuration with respect to each other.

As shown in FIG. 25, the insert 1060 is configured to extend between and fluidly connect the blower 1090 and the nozzle head 1020. The first portion 1061 is housed at least partially within the cavity 1070 of the body 1010. The first end of the insert 1060 is positioned to couple to an end of the blower 1090 such that the inlet 1064 of the insert 1060 is fluidly coupled to the outlet 1093 of the blower 1090. Adjacent the outlets 1065, the first portion 1061 of the insert 1060 defines a seat 1066 that engages a back surface of the nozzle head 1020.

The second portion 1062 of the insert 1060 extends into and is securely received (e.g., threadably) by a blind-hole 1030 of the nozzle head 1020 to securely couple the insert 1060 to the nozzle head 1020. An opening of the blind-hole 1030 is defined along the back surface of nozzle head 1020. The seat 1066 of the insert 1060 is configured to engage the back surface of the nozzle head 1020 when the second portion 1062 is securely positioned within and received by the blind-hole 1030. In the illustrated example, the second portion 1062 and the blind-hole 1030 are threaded to threadably couple the insert 1060 and the nozzle head 1020 together.

As shown in FIGS. 24-25, the connector 1080 includes a first end 1081 and a second end 1082. The connector 1080 has a substantially truncated conical shape with the first end 1081 having a smaller diameter than that of the second end 1082.

As illustrated in FIG. 25, the first end 1081 of the connector 1080 defines a first opening that is configured receive the insert 1060. In the illustrated example, the first end 1081 of the connector 1080 engages the first portion 1061 of the insert 1060 adjacent the outlets 1065 of the insert 1060. A seal 1066 (e.g., an O-ring) is positioned between and engages an outer surface of the first portion 1061 of the insert 1060 and an inner surface of the first end 1081 of the connector 1080 to form a sealed connection between the insert 1060 and the connector 1080. In the illustrated example, the outer surface of the insert 1060 defines a circumferential groove (e.g., a first circumferential groove) in which the seal 1066 is positioned. A clip 1068 is positioned circumferentially around the outer surface of the first portion 1061 of the insert 1060 and adjacent the first end 1081 of the connector 1080. The clip 1068 engages the first portion 1061 of the insert 1060 and the first end 1081 of the connector 1080 to securely retain the coupling between the connector 1080 and the insert 1060. In the illustrated example, the outer surface of the insert 1060 defines a circumferential groove (e.g., a secure circumferential groove) in which the clip 1068 is securely positioned.

The second end 1082 of the connector 1080 defines a second opening that is configured receive a back portion of the nozzle head 1020. In the illustrated example, the second end 1082 of the connector 1080 engages an outer circumferential surface of the nozzle head 1020. A seal 1028 (e.g., an O-ring) is positioned between and engages an inner surface of the second end 1082 of the connector 1080 and the outer circumferential surface of the nozzle head 1020 to form a sealed connection between the nozzle head 1020 and the connector 1080. The outer circumferential surface of the insert 1060 defines a circumferential groove 1031 (FIG. 24) in which the seal 1028 is positioned.

The connector 1080 is positioned relative to the insert 1060 and the nozzle head 1020 such that the outlets 1065 of the insert 1060 are positioned longitudinally between (1) the sealed connection formed between the first end 1081 of the connector 1080 and the insert 1060 and (2) the sealed connection formed between the second end 1082 of the connector 1080 and the nozzle head 1020. In turn, the connector 1080 defines a sealed flow path 1083 that extends between and fluidly connects the flow path 1063 of the insert 1060 and the spray holes 1025 of the nozzle head 1020.

As shown in FIG. 25, the inlet 1071 of the cleaning nozzle 1000 is selectively fluidly connected to the spray holes 1025 of the nozzle head 1020 via the tubing 1094, the flow path 1091 of the blower 1090, the flow path 1063 of the insert 1060, and the flow path 1083 of the connector 1080. When the button 1095 is pressed by the operator, the valve 1097 of the blower 1090 is opened by the actuator 1096, thereby enabling pressurized air to flow from the inlet 1071 and out through the spray holes 1095 to clean a receptacle (e.g., the fueling receptacle 4). When the button 1095 is released by the operator, the valve 1097 of the blower 1090 is closed by the actuator 1096, thereby preventing pressurized air to flow from the inlet 1071 and out through the spray holes 1095.

Figure 29:
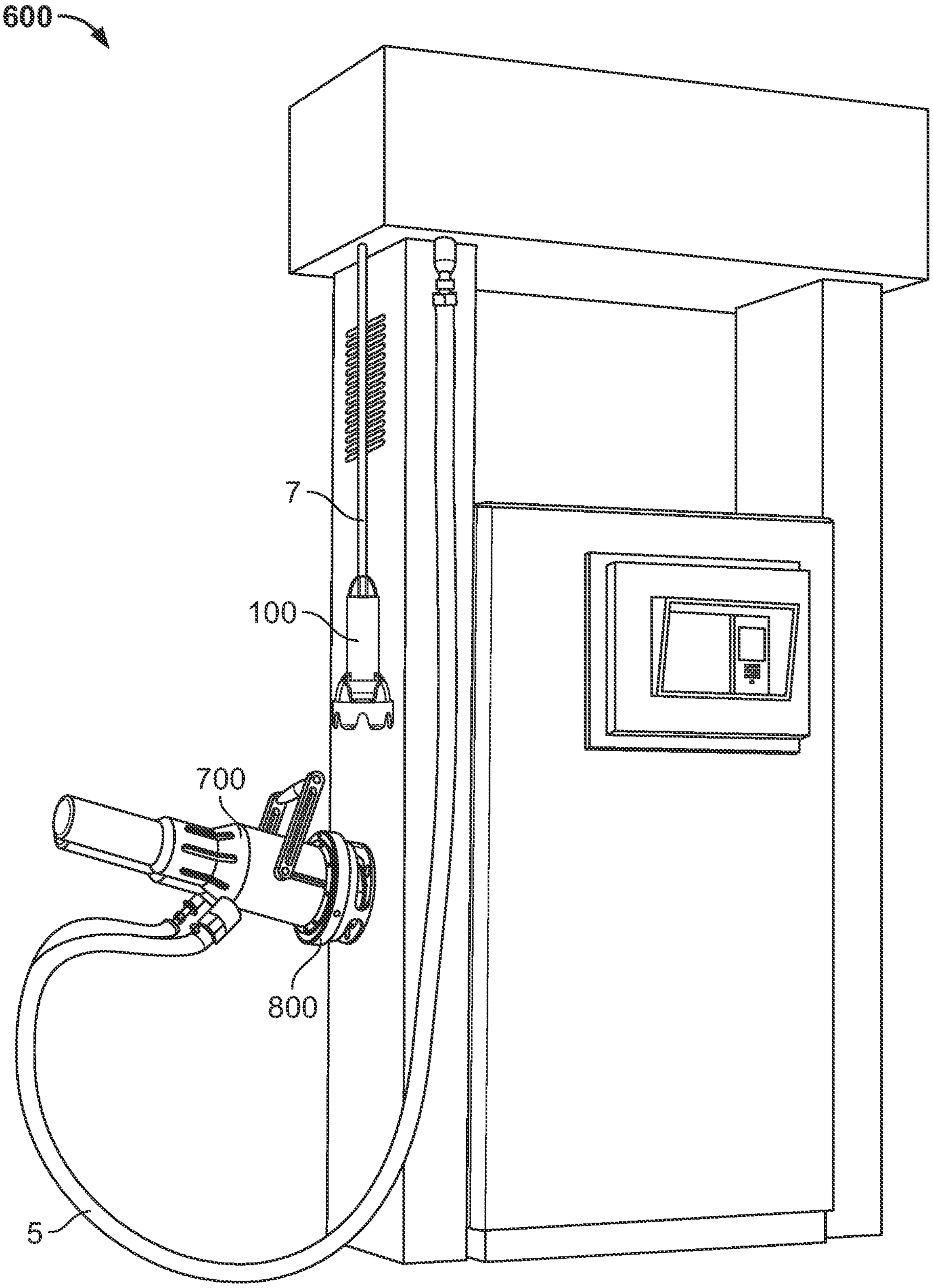
FIG. 29 depicts an example fueling station that includes an example cleaning nozzle and an example cleaning receptacle in accordance with the teachings herein.

FIG. 29 depicts an embodiment of a fueling station 600 in accordance with the teachings herein. For example, the fueling station 600 enables the operator 6 to control the transfer of cryogenic fluid from a source tank (e.g., the source tank 3 of FIG. 1) to a fill tank (e.g., the fill tank 2 of FIG. 1). As illustrated in FIG. 29, the cleaning hose 7 extends from fueling station 600. In the illustrated example, the cleaning nozzle 100 is connected to an end of the cleaning hose 7. In other examples, any other cleaning nozzle that is configured to clean the fueling receptacle 4 (such as the cleaning nozzle 200, the cleaning nozzle 300, the cleaning nozzle 400, or the cleaning nozzle 500) may be connected to the end of the cleaning hose 7. Additionally, the hose 5 that is fluidly connected to the source tank 3 extends from the fueling station 600. A fueling nozzle 700 is connected to an end of the hose 5 and is docked to a cleaning receptacle 800.

Figure 30:
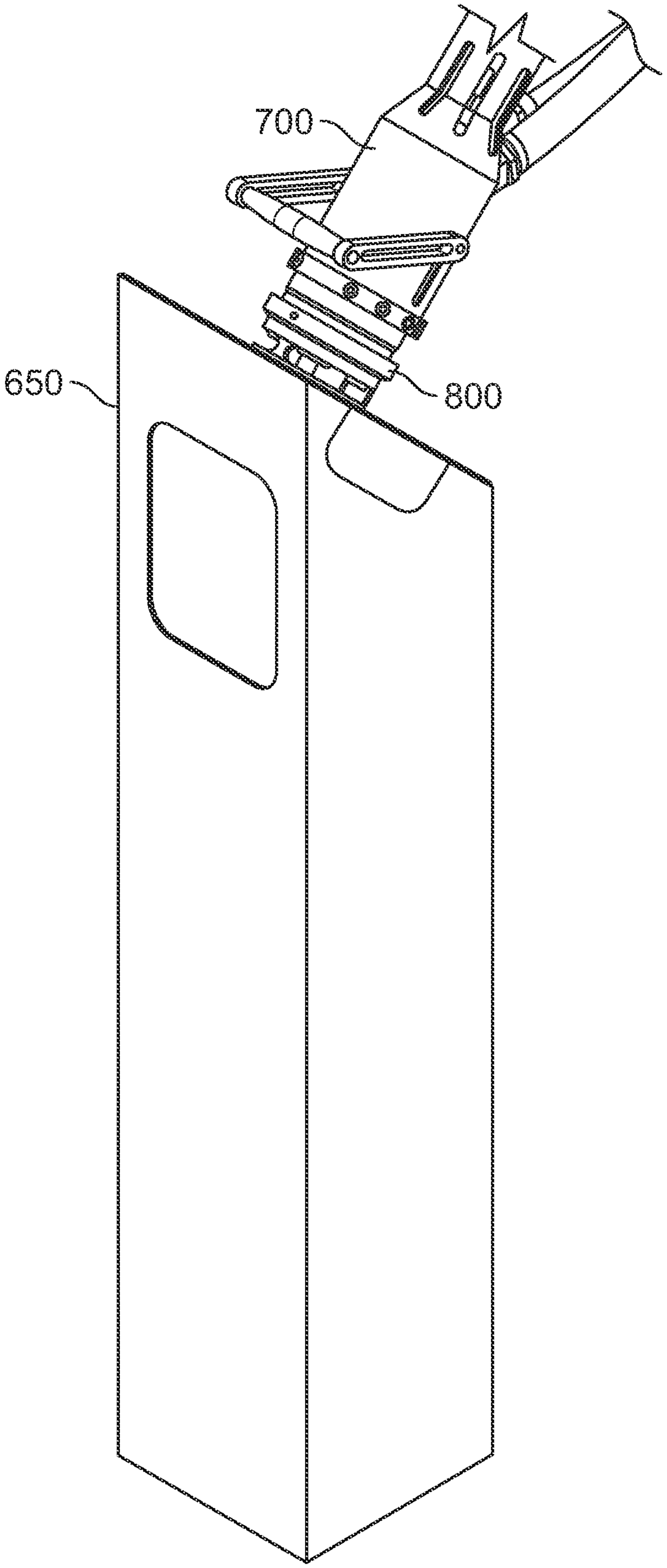
FIG. 30 depicts an example cleaning dock station that includes an example cleaning receptacle in accordance with the teachings herein.

In some examples, the fueling station 600 does not include the cleaning receptacle. In such examples, a cleaning dock station that includes the cleaning receptacle 800 may be positioned near the fueling station. FIG. 30 depicts an embodiment of a cleaning dock station 650 in accordance with the teachings herein that is separate from and intended to be located near a fueling station. The cleaning dock station 650 includes the cleaning receptacle 800 that is configured to receive and clean the fueling nozzle 700.

Figure 31:
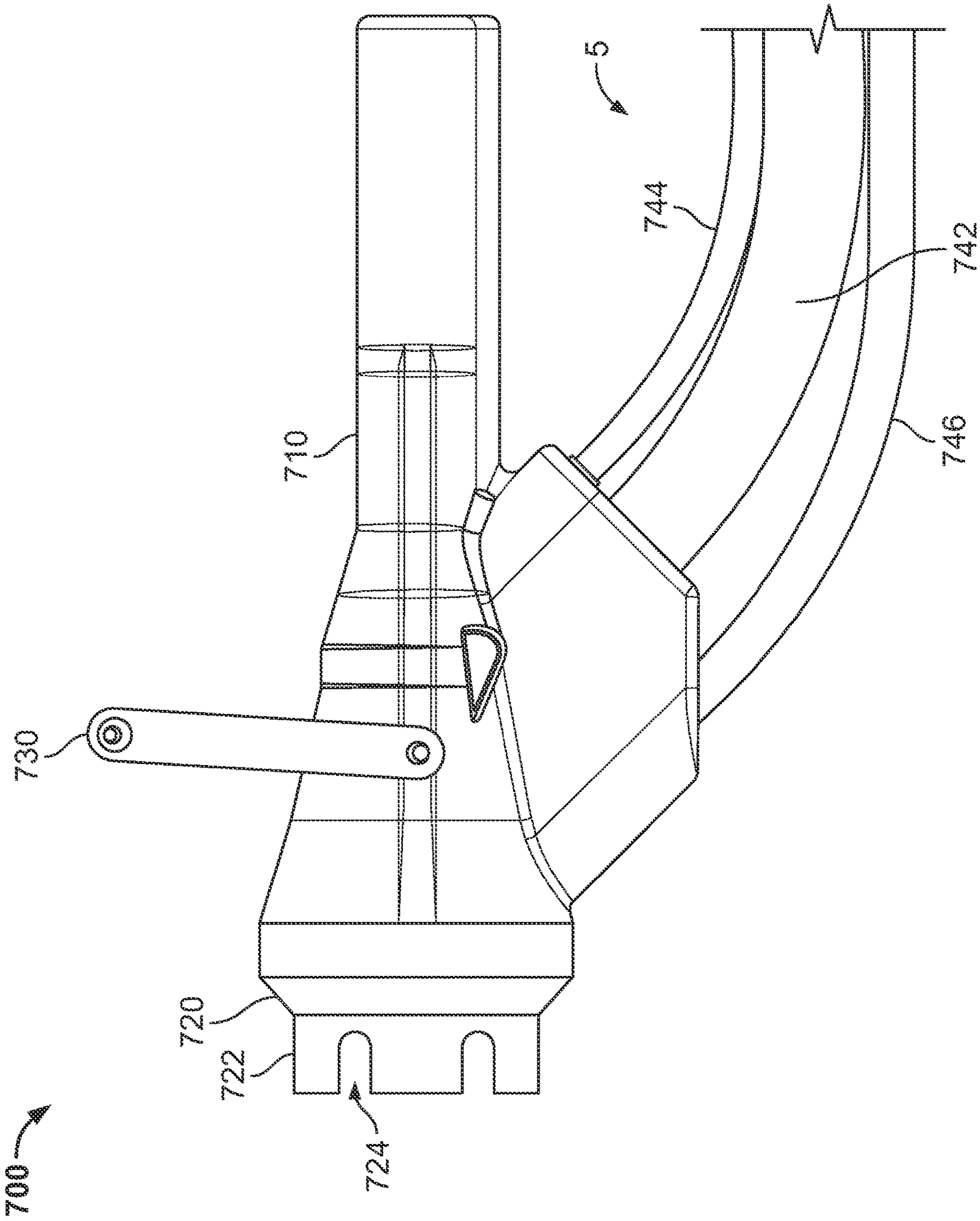
FIG. 31 is a side view an example fueling nozzle of the fueling station of FIG. 29.
Figure 32:
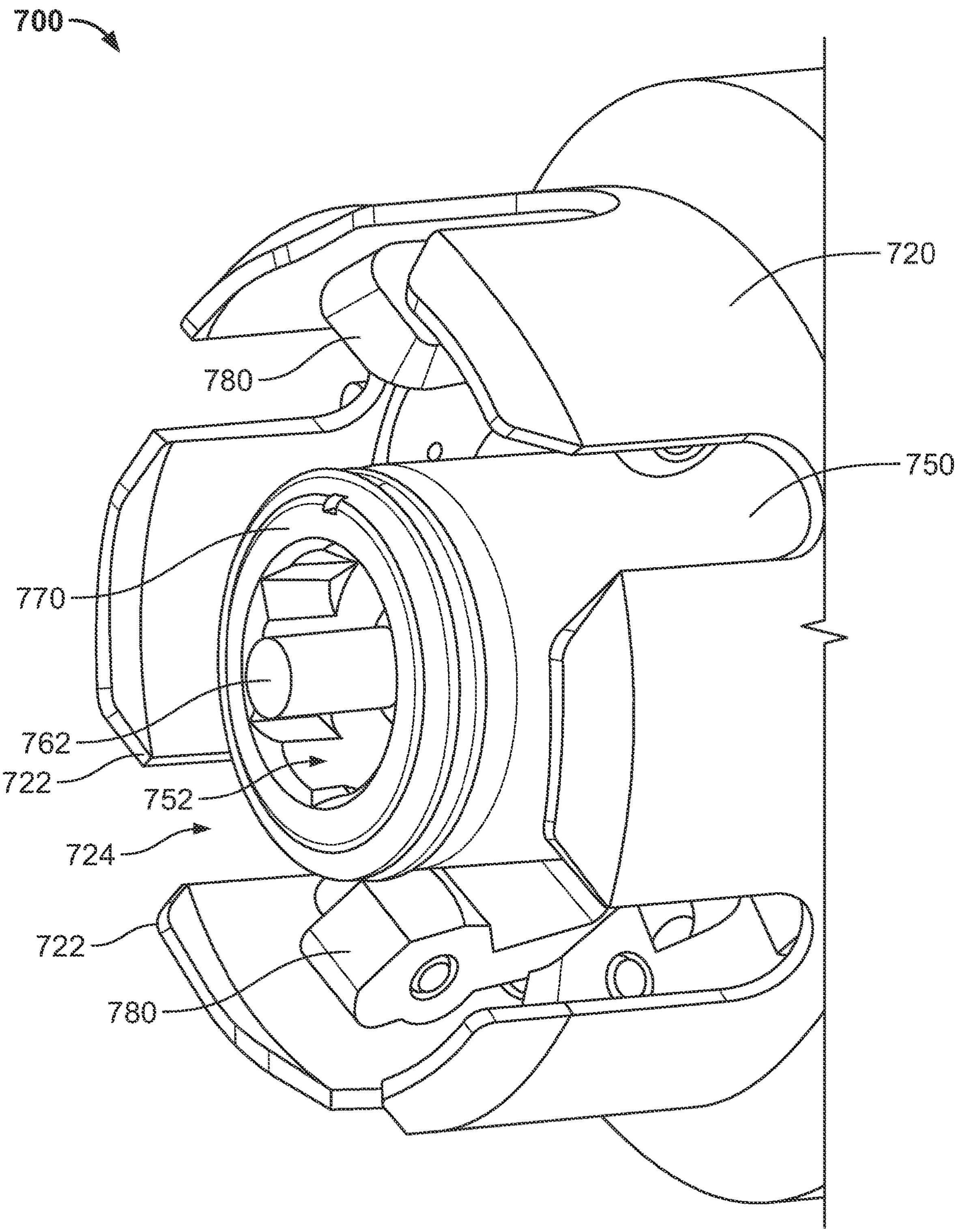
FIG. 32 is a perspective view of a front end of the fueling nozzle of FIG. 29.

FIGS. 31-32 depict an embodiment of the fueling nozzle 700 of the fueling station 600. The fueling nozzle 700 is configured to couple and fluidly connect to a fueling receptacle, such as the fueling receptacle 4, to transfer cryogenic fluid from the source tank 3 and transfer the cryogenic fluid into the fill tank 2. The fueling nozzle 700 also is configured to couple and fluidly connect to the cleaning receptacle 800 for cleaning between fueling cycles. For example, prior to connecting the fueling nozzle 700 to the fueling receptacle 4, the operator 6 connected the fueling nozzle 700 onto the cleaning receptacle 800 of the fueling station 600 and/or the cleaning dock station 650. In turn, the cleaning receptacle 800 sprays warm air onto inner surfaces of the fueling nozzle 700 to remove moisture that may otherwise freeze and subsequently prevent the fueling nozzle 700 from opening and/or closing. After the fueling nozzle 700 has been cleaned by the cleaning receptacle 800, the operator 6 connects the fueling nozzle 700 to the fueling receptacle 4 to begin a fueling process.

As shown in FIG. 31, the example fueling nozzle 700 includes a sleeve 710, an end cover 720, and a rotating handle 730. The sleeve 710 covers other components of the fueling nozzle 700, such as a flow body 750 shown in FIGS. 32 and 38, to enable the operator 6 to safely and securely hold the fueling nozzle 700. The end cover 720 include flanges 722 that define slots 724 for receiving bearings of a nozzle, such as the bearings 50 of the fueling receptacle 4 shown in FIG. 2 and/or bearings 822 of the cleaning receptacle 800 shown in FIGS. 33-38. The slots 724 of the illustrated example are linear and are configured to receive bearings of a receptacle linearly, without rotation of the end cover 720 and/or the fueling nozzle 700. The rotating handle 730 enables the operator 6 to manually actuate a locking mechanism for securely connecting and disconnecting the fueling nozzle 700 to and from a receptacle.

Additionally, the hose 5 that extends between the fueling nozzle 700 and the fueling station 600 includes a bundle of a fill hose 742, a pneumatic hose 744, and electrical conduit 746. The fill hose 742 is coupled to the flow body 750 to transfer cryogenic fluid flowing through the flow body 750. The pneumatic hose 744 is configured to provide pressurized fluid to a pneumatic cylinder of the fueling nozzle 700 that is configured to pneumatically actuate the locking mechanism. The electrical conduit 746 is configured to house electrical wiring that couples to electrical devices of the fueling nozzle 700.

FIG. 32 depicts an end of the fueling nozzle 700 at which the end cover 720 is positioned. An end of the flow body 750 extends at least partially through the end cover 720. The flow body 750 defines a conduit through which the cryogenic fluid is to flow. A stem 762 of a poppet 760, which is shown in further detail in FIG. 38, and a valve seat 770 extend partially from within the flow body 750. Additionally, linkages 780 of a locking mechanism are positioned between the flow body 750 and the end cover 720. The linkages 780 of the locking mechanism are actuated by a pneumatic cylinder of the fueling nozzle 700 couple and decouple the fueling nozzle 700 from a receptacle, such as the fueling receptacle 4 and/or the cleaning receptacle 800. For example, as disclosed below in greater detail with respect to FIG. 38, the linkages 780 of the locking mechanism are configured to engage the cleaning receptacle 800 to securely couple the fueling nozzle 700 to the cleaning receptacle 800 during a cleaning process.

Figure 38:
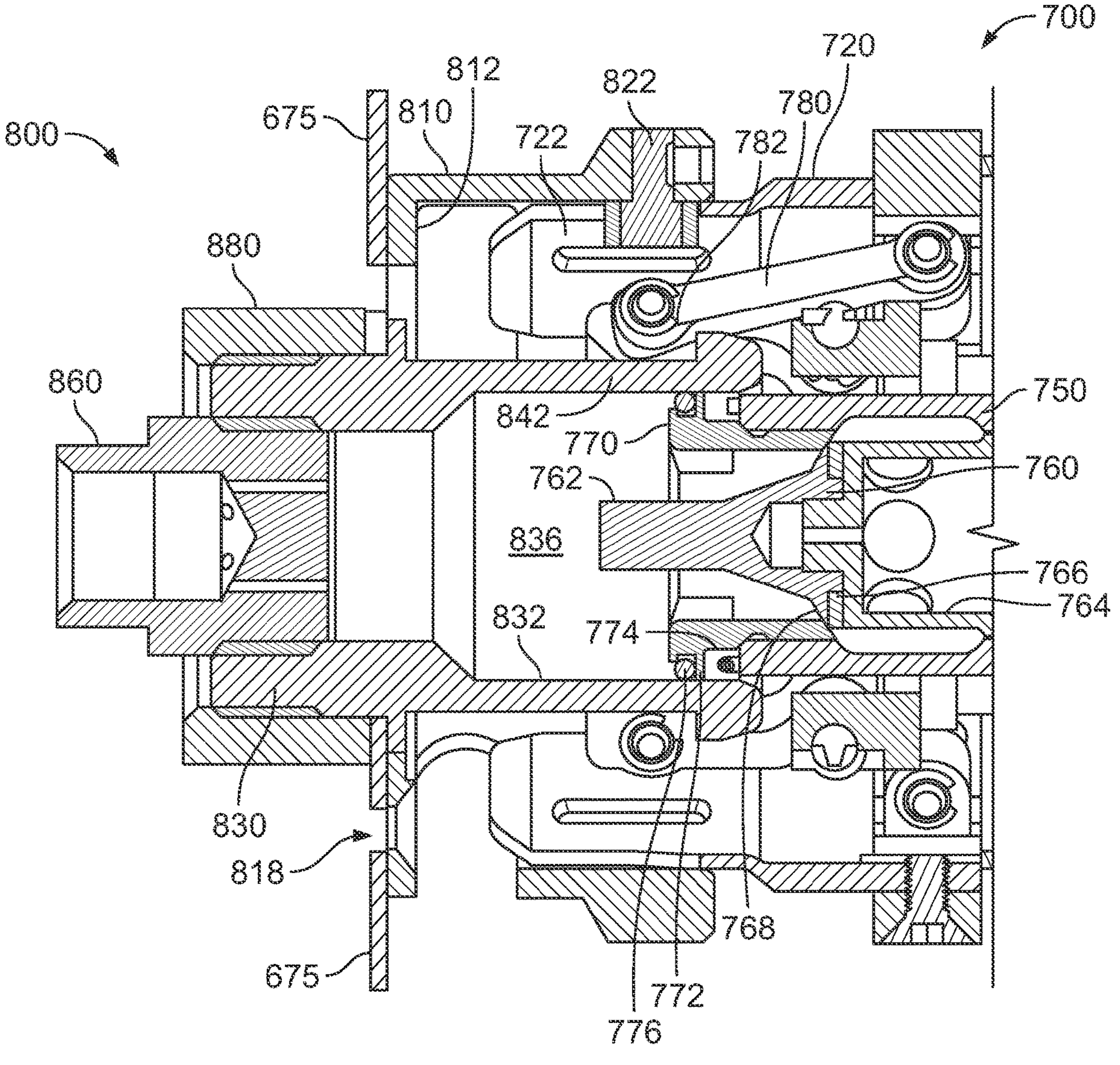
FIG. 38 is a cross-sectional side view of the cleaning receptacle of FIG. 33 coupled to the fueling nozzle of FIG. 31.

Features of the example fueling nozzle 700 are further disclosed in commonly owned U.S. Pat. application Ser. No. 17/016,008 and International App. No. PCT/US2020/049872, the disclosures of which are incorporated by reference in their entirety. Additionally, while FIGS. 29-30 and 38 depict that the cleaning receptacle 800 is configured to couple to and clean the fueling nozzle 700, the cleaning receptacle 800 is configured to couple to and clean any other fueling nozzle that is capable of securely coupling to the fueling receptacle 4 for a fueling process.

As shown in FIGS. 33-37, the example cleaning receptacle 800 includes an outer body 810, a flow body 830, a spray body 860, and a locking nut 880.

Figure 33:
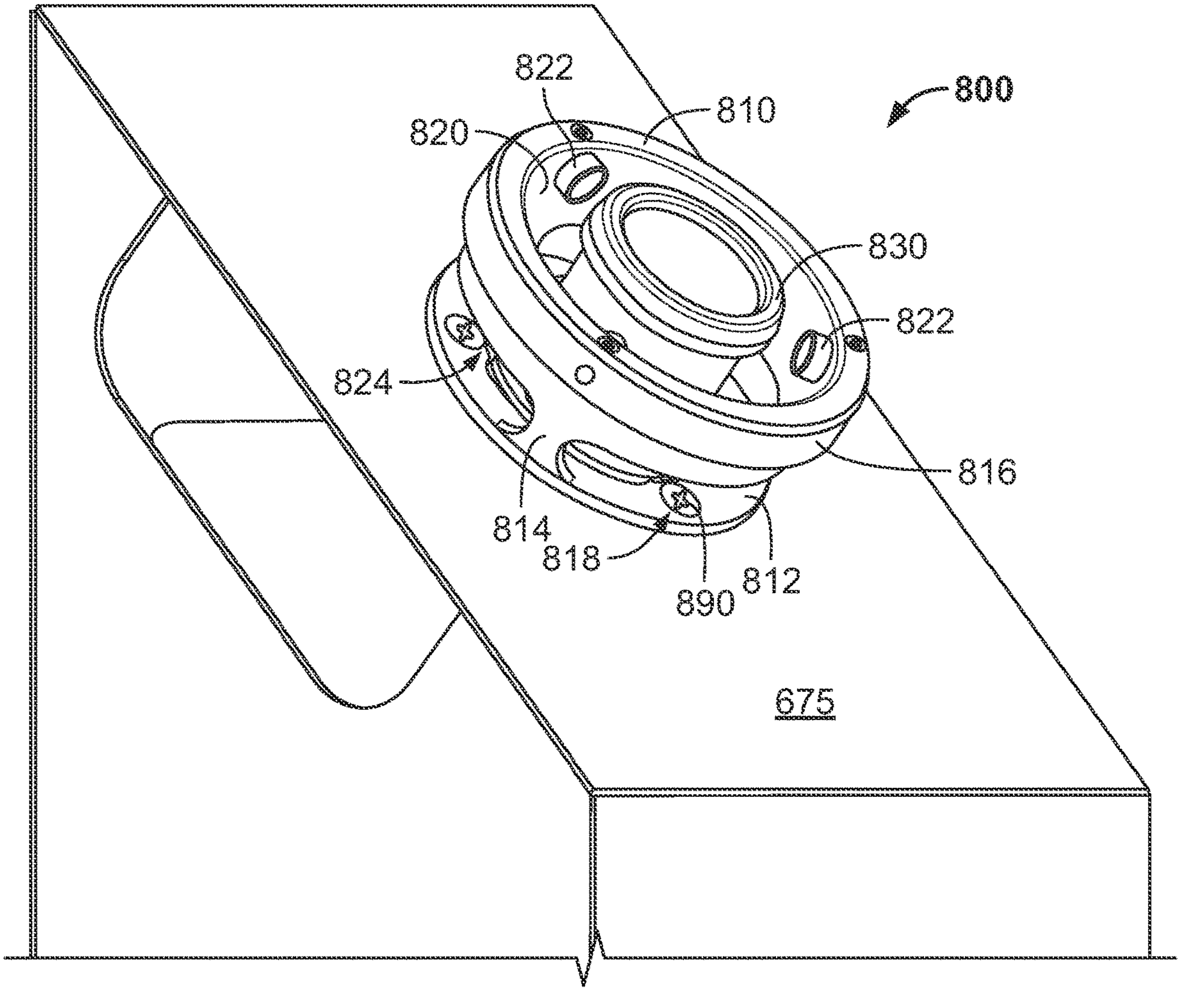
FIG. 33 depicts an example cleaning receptacle of the fueling station of FIG. 29 and/or the cleaning dock station of FIG. 30 in accordance with the teachings herein.
Figure 34:
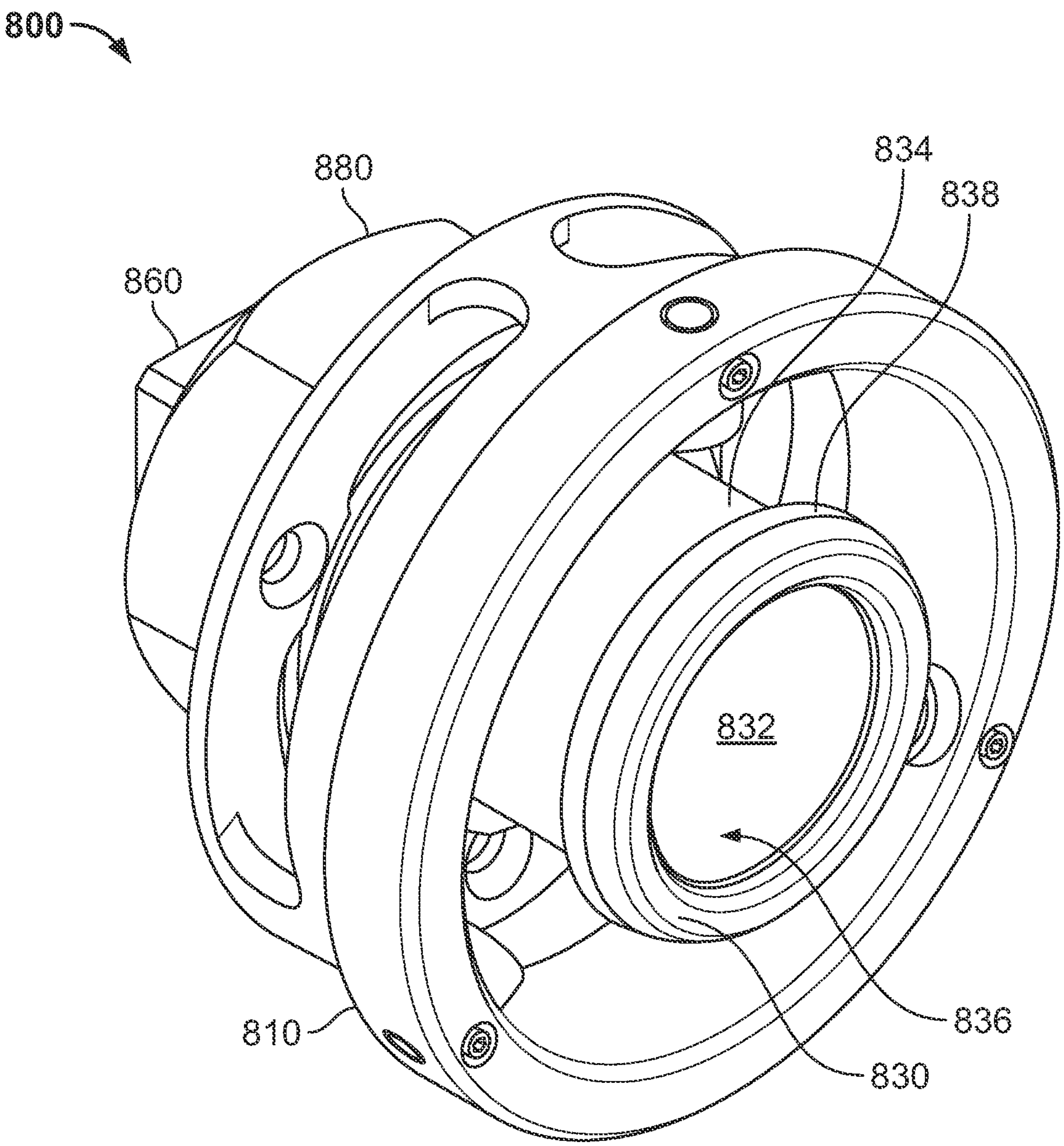
FIG. 34 is a perspective view of the cleaning receptacle of FIG. 33.

The outer body 810 includes a base 812, side posts 814, and an outer wall 816. The base 812 and the outer wall 816 are spaced apart and extend circumferentially about a center axis of the cleaning receptacle 800, and the side posts 814 extend between and connect the base 812 and the outer wall 816. The base 812, the outer wall 816, and the side posts 814 define slots 824 therebetween. As shown in FIG. 33, the base 812 of the outer body 810 engages a panel 675 of the fueling station 600 or the cleaning dock station 650. The base 812 defines through holes 818 that receive respective fasteners 890 to secure the cleaning receptacle 800 to the panel 675.

The outer wall 816 defines an inner surface 820 (also referred to as a "first inner surface") from which a plurality of locating members extend. In the illustrated example, the locating members are bearings 822 that extend inwardly from the outer wall 816 toward the flow body 830. The bearings 822 are sized and arranged with respect to each other in a manner substantially similar to the bearings 50 of the fueling receptacle 4 such that the cleaning receptacle 800 is capable of securely receiving any fueling nozzle (e.g., the fueling nozzle 700) that the fueling receptacle 4 is capable of securely receiving. In turn, fueling nozzle 700 is capable of being received by the cleaning receptacle 800 and the fueling receptacle 4 in a similar manner. For example, the bearings 822 are configured to engage the flanges 722 of the end cover 720 of the fueling nozzle 700 to facilitate alignment between the fueling nozzle 700 and the cleaning receptacle 800 as the fueling nozzle 700 is coupled to the cleaning receptacle 800. Additionally, when the nozzle is coupled to the fueling receptacle 4, the bearings 822 prevent rotation of the fueling nozzle 700 when the fueling nozzle 700 is coupled to the cleaning receptacle 800. In the illustrated example, the bearings 822 are equally spaced apart along the inner surface 820 of the outer wall 816 (e.g., by about 120 degrees).

The flow body 830 defines an inner surface 832 (also referred to as a "second inner surface") and an outer surface 834. Both the inner surface 832 and the outer surface 834 extend a length of the flow body 830 and circumferentially about the center axis of the cleaning receptacle 800. The inner surface 832 of the flow body 830 defines a cavity 836 that extends the length of the flow body 830.

The flow body 830 includes a lip 838 at a second end (also referred to as an "outer end") of the flow body 830. The lip 838 projects radially outward from the outer surface 834 and extends circumferentially around the second end of the flow body 830. The lip 838 is configured to engage the linkages 780 of the locking mechanism of the fueling nozzle 700 when the fueling nozzle 700 is securely coupled to the cleaning receptacle 800.

Figure 35:
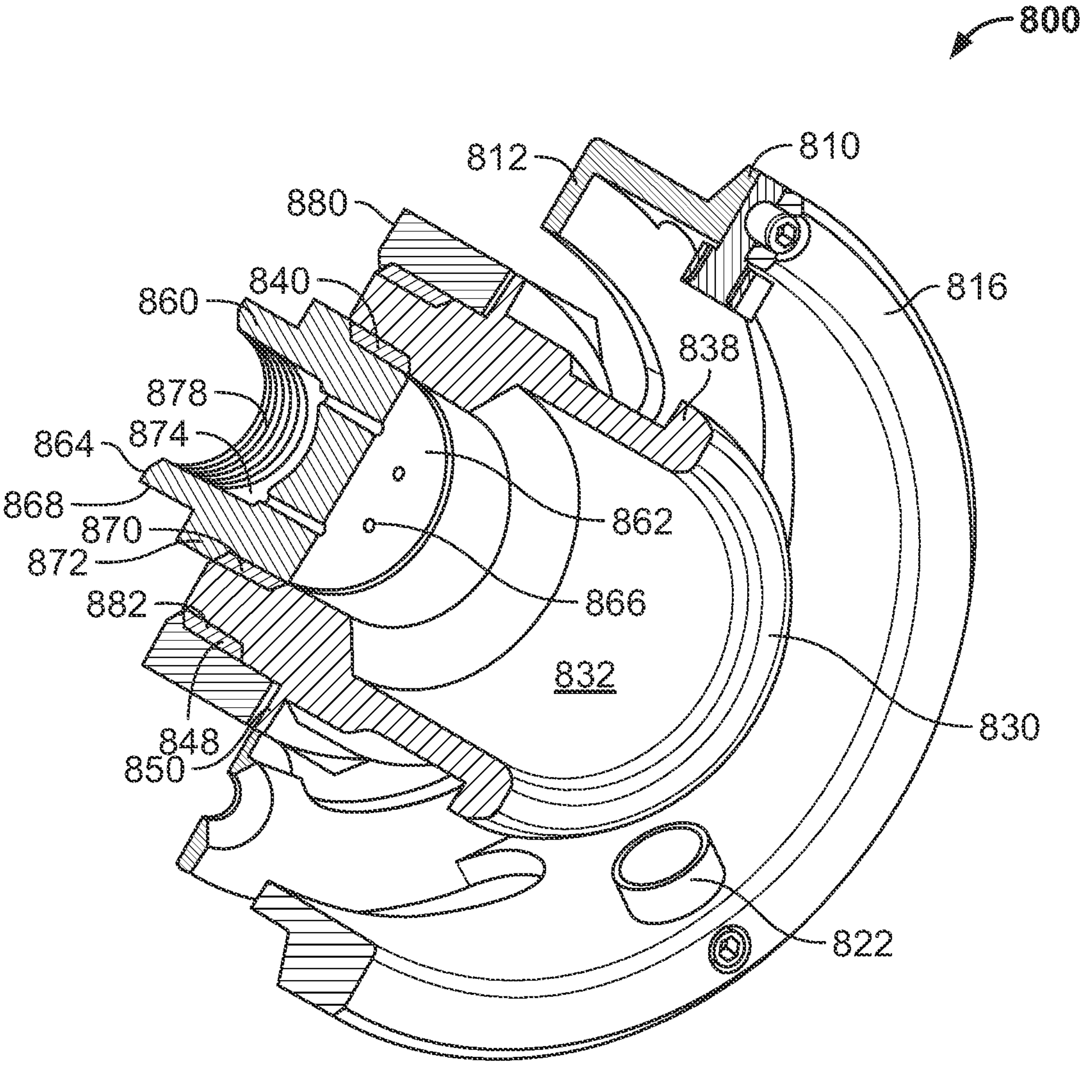
FIG. 35 is a cross-sectional perspective view of the cleaning receptacle of FIG. 33.
Figure 37:
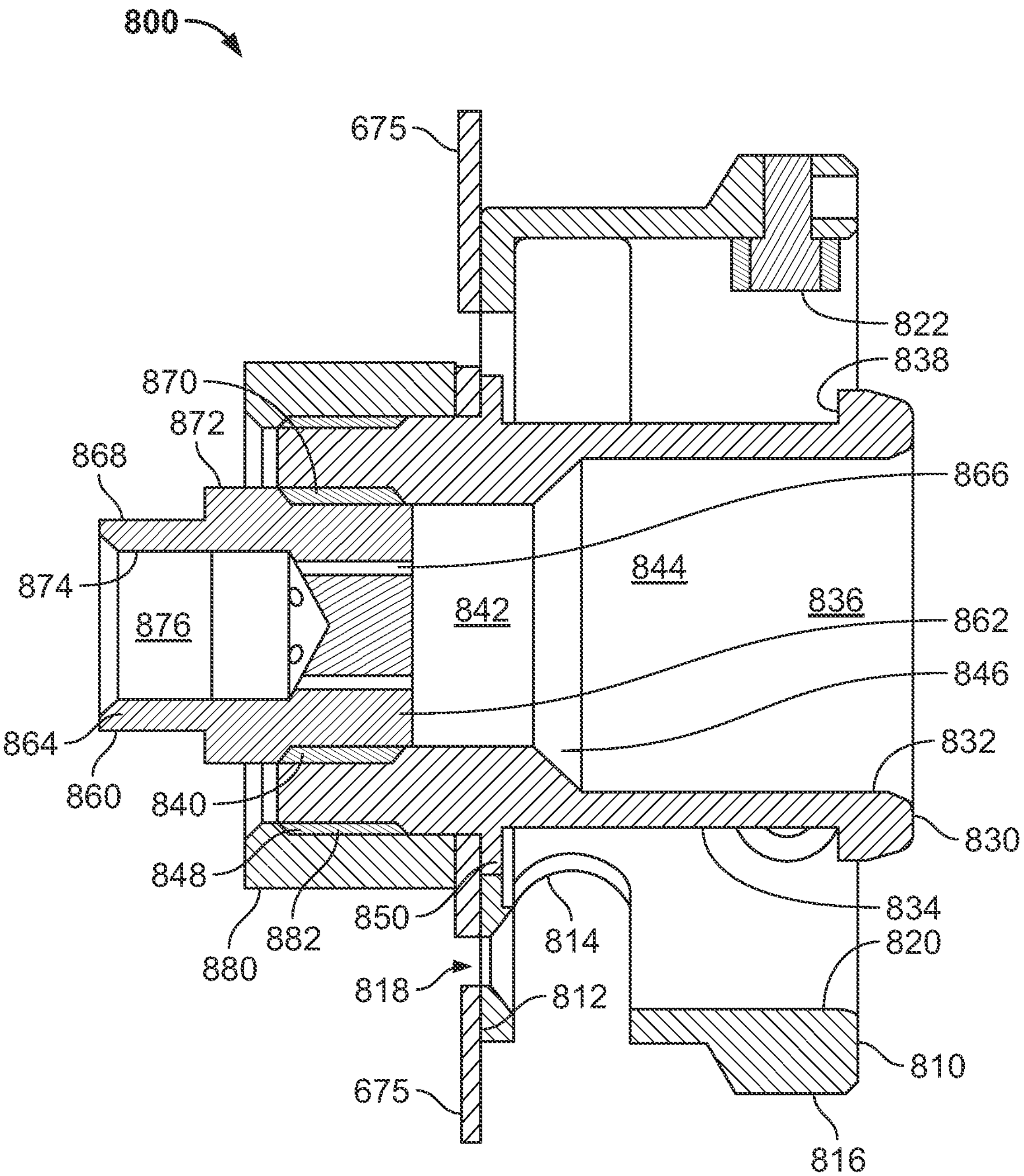
FIG. 37 is a cross-sectional side view of the cleaning receptacle of FIG. 33.

As shown in FIGS. 35 and 37, the inner surface 832 of flow body 830 includes internal threads 840 at a first end (also referred to as an "inner end") of the flow body 830. The internal threads 840 are configured to receive the spray body 860. The inner surface 832 includes a first segment 842 adjacent the first end of the flow body 830, a second segment 844 adjacent the second end, and a middle segment 846 axially between the first segment 842 and the second segment 844. Each of the segments 842, 844, 846 defines a respective portion of the cavity 836 of the flow body 830. The first segment 842 of the inner surface 832 has a smaller circumference than that of the second segment 844. In turn, the outer diameter of the first portion of the cavity 836 defined by the first segment 842 is smaller than the outer diameter of the second portion of the cavity 836 defined by the second segment 844. The circumference of the middle segment 846 transitions between that of the first segment 842 and that of the second segment 844. In turn, the outer diameter of the middle portion of the cavity 836 transitions between that of the first portion and the second portion of the cavity 836.

The outer surface 834 of the flow body 830 includes external threads 848 at the first end of the flow body 830. The external threads 848 are configured to receive the locking nut 880 to securely fasten the cleaning receptacle 800 to the panel 675. The flow body 830 also includes a flange 850 that extends radially outward from the outer surface 834 adjacent the external threads 848. The flange 850 is to align with, extend to, and engage the base 812 of the outer body 810.

Figure 36:
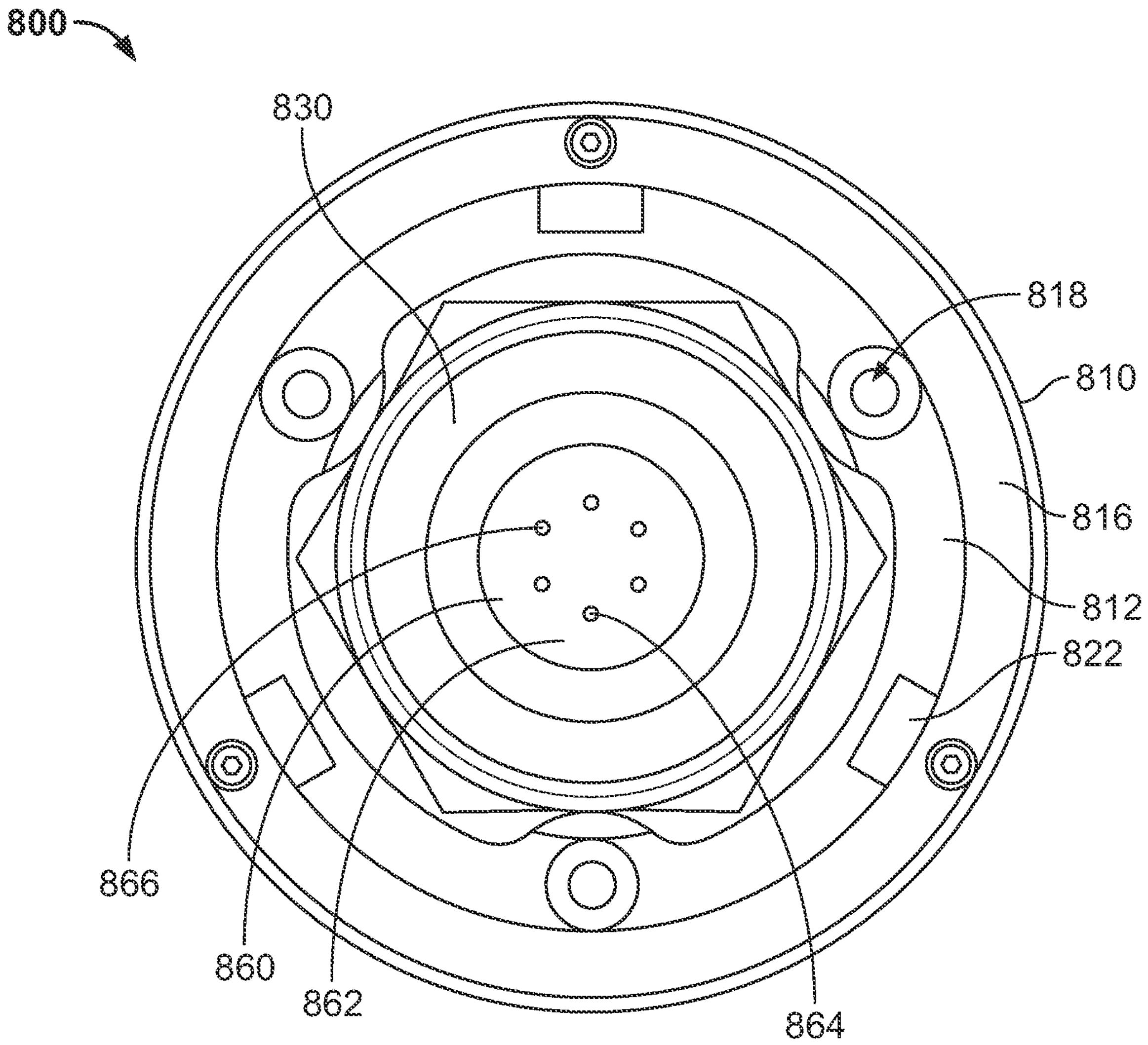
FIG. 36 is a front view of the cleaning receptacle of FIG. 33.

As shown in FIGS. 35-37, the spray body 860 includes a spray head 862 and a cylindrical wall 864 extending from the spray head 862. The spray head 862 defines a plurality of spray holes 866 that extend through a depth of the spray head 862. As disclosed below in greater detail, the spray holes 866 are configured to spray warm air onto inner surfaces of the fueling nozzle 700 when the fueling nozzle 700 is securely coupled to the cleaning receptacle 800. As shown in FIG. 36, the spray holes 866 include six spray holes that are arranged to form a regular-hexagon shape in which each of the spray holes are spaced apart from adjacent spray holes by the same distance and at the same angle. In other examples, the spray holes 866 may include more or less spray holes and/or may be arranged in any pattern that facilitates cleaning of the fueling nozzle 700.

The spray head 862 and the cylindrical wall 864 define an outer surface 868 of the spray body 860. The outer surface 868 includes external threads 870 adjacent a second end of the spray body 860. The spray body 860 also includes a stopper flange 872 that extends radially outward from the outer surface 868 adjacent the external threads 870. The stopper flange 872 is configured to limit how far the spray body 860 is able to extend into the cavity 836 of the flow body 830 via the external threads 870 of the spray body 860 and the internal threads 840 of the flow body 830.

The cylindrical wall 864 also defines an inner surface 874 that defines a chamber 876 of the spray body 860 adjacent the spray head 862. As shown in FIG. 35, the spray holes 866 of the spray head 862 fluidly connect and extend between the chamber 876 of the spray body 860 and the cavity 836 of the flow body 830. Additionally, the inner surface 874 includes inner threads 878 adjacent a first end of the spray body 860. The inner threads 878 are configured to threadably receive a tube or hose that provides warm air to the cleaning receptacle 800 for cleaning the fueling nozzle 700. For example, to clean the fueling nozzle 700, warm air flows (1) into the chamber 876 of the spray body 860 from the attached tube or hose, (2) through the spray holes 866 of the spray body 860, (3) through the cavity 836 of the flow body 830, and (4) onto surfaces of the fueling nozzle 700.

As shown in FIGS. 35 and 37, the locking nut 880 includes internal threads 882 that are configured to threadably couple to the external threads 848 of the flow body 830.

To securely fasten the cleaning receptacle 800 to the panel 675, the flow body 830 is positioned through an opening formed in the panel 675 such that the flange 850 of the flow body 830 engages an outer surface of the panel 675 (also referred to as an "outer panel surface"). The locking nut 880 is threaded onto the flow body 830, via the internal threads 882 of the locking nut 880 and the external threads 848 of the flow body 830, until the locking nut 880 engages an inner surface of the panel 675 (also referred to as an "inner panel surface") to pin the flow body 830 to the panel 675. The outer body 810 is positioned over the flow body 830 such that the base 812 engages the outer surface of the panel 675. The fasteners 890 are extended through the through holes 818 of the base 812 to pin and securely coupled the outer body 810 to the panel 675.

Figure 39:
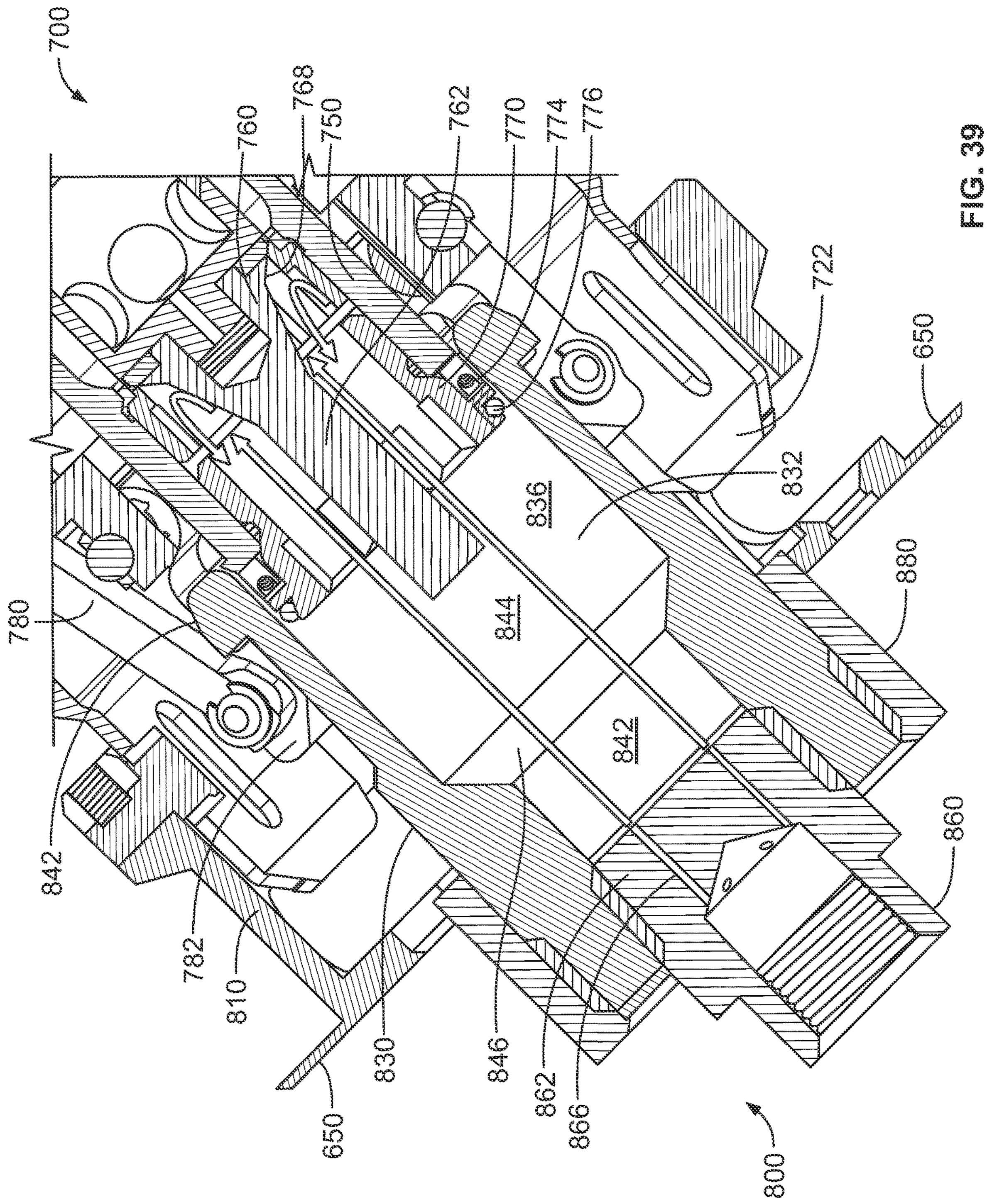
FIG. 39 is a cross-sectional view of the cleaning receptacle of FIG. 33 in a position to clean the fueling nozzle of FIG. 31.

FIGS. 38-39 depict the cleaning receptacle 800 fastened to the panel 675 and securely coupled to the fueling nozzle 700. For example, the cleaning receptacle 800 is fastened to the panel 675 via the locking nut 880 and the fasteners 890 (shown in FIG. 33) that extend through the base 812 of the outer body 810. When the fueling nozzle 700 is coupled to the cleaning receptacle 800, the flanges 722 of the end cover 720 extend partially into the cavity 836 of the flow body 830. The bearings 822 of the cleaning receptacle 800 facilitate alignment between the fueling nozzle 700 and the cleaning receptacle 800 and prevent rotation of the fueling nozzle 700 when coupled to the cleaning receptacle 800.

In the illustrated example, the fueling nozzle 700 includes a flow body 750, the poppet 760, and the valve seat 770. Each of the poppet 760 and the valve seat 770 are partially disposed in the flow body 750 of the fueling nozzle 700 and partially extend into the cavity 836 of the cleaning receptacle 800 when the fueling nozzle 700 is coupled to the cleaning receptacle 800.

The valve seat 770 includes a flange 772 that is located beyond the flow body 750 and extends radially outward. A seal 774 (e.g., an O-ring) is positioned and retained between the flange 772 and an outer end of the flow body 750. A mechanical wiper 776 extends circumferentially around the valve seat 770 adjacent an outer end of the valve seat 770.

The poppet 760 includes the stem 762, a poppet body 764, and a seal 766. The poppet body 764 is hollow and defines openings through which cryogenic fluid is configured to flow when coupled to the fueling receptacle 4. The stem 762 is coupled to the poppet body 764, and the seal 766 is positioned between the stem 762 and the poppet body 764. The stem 762, the poppet body 764, and/or the seal 766 define a sealing surface 768 that is configured to sealingly engage the valve seat 770 in a closed position of the fueling nozzle 700.

As shown in FIG. 39, the spray holes 866 are configured to spray warm air onto the sealing surface 768 of the poppet 760 and/or a surface of the valve seat 770 to inhibit the poppet 760 from freezing in place (e.g., in a closed position or an open position). The spray holes 866 are positioned and oriented with the spray head 862 such that the warm air is sprayed in a direct path to the sealing surface 768 of the poppet 760 and the surface of the valve seat 770. For example, the spray holes 866 are spaced apart from and extend parallel to the center axis of the cleaning receptacle 800 to enable the warm air to flow directly toward the sealing surface 768 of the poppet 760 and the surface of the valve seat 770. The spray holes 866 spray the warm air onto the surfaces of the poppet 760 and the valve seat 770 to melt and remove moisture that may otherwise freeze the poppet 760 in place.

Additionally, the flow body 830 of the cleaning receptacle 800 is sized and shaped to cause the moisture to flow away from fueling nozzle 700. As the warm air is sprayed onto the surfaces of the poppet 760 and the valve seat 770, the moisture is removed from those surfaces and pushed back toward the cavity 836 of the flow body 830. The inner surface 832 of the flow body 830 is shaped to facilitate the moisture in being vented from the cleaning receptacle 800 and into the atmosphere. For example, the first segment 842 has a smaller circumference than that of the second segment 844 to deter the moisture from flowing back toward the spray body 860. Further, the middle segment 846 and/or other adjacent segments of the inner surface 832 direct the moisture through a vent path 852 formed between the flow body 830 of the cleaning receptacle 800 and the fueling nozzle 700.

Figure 40:
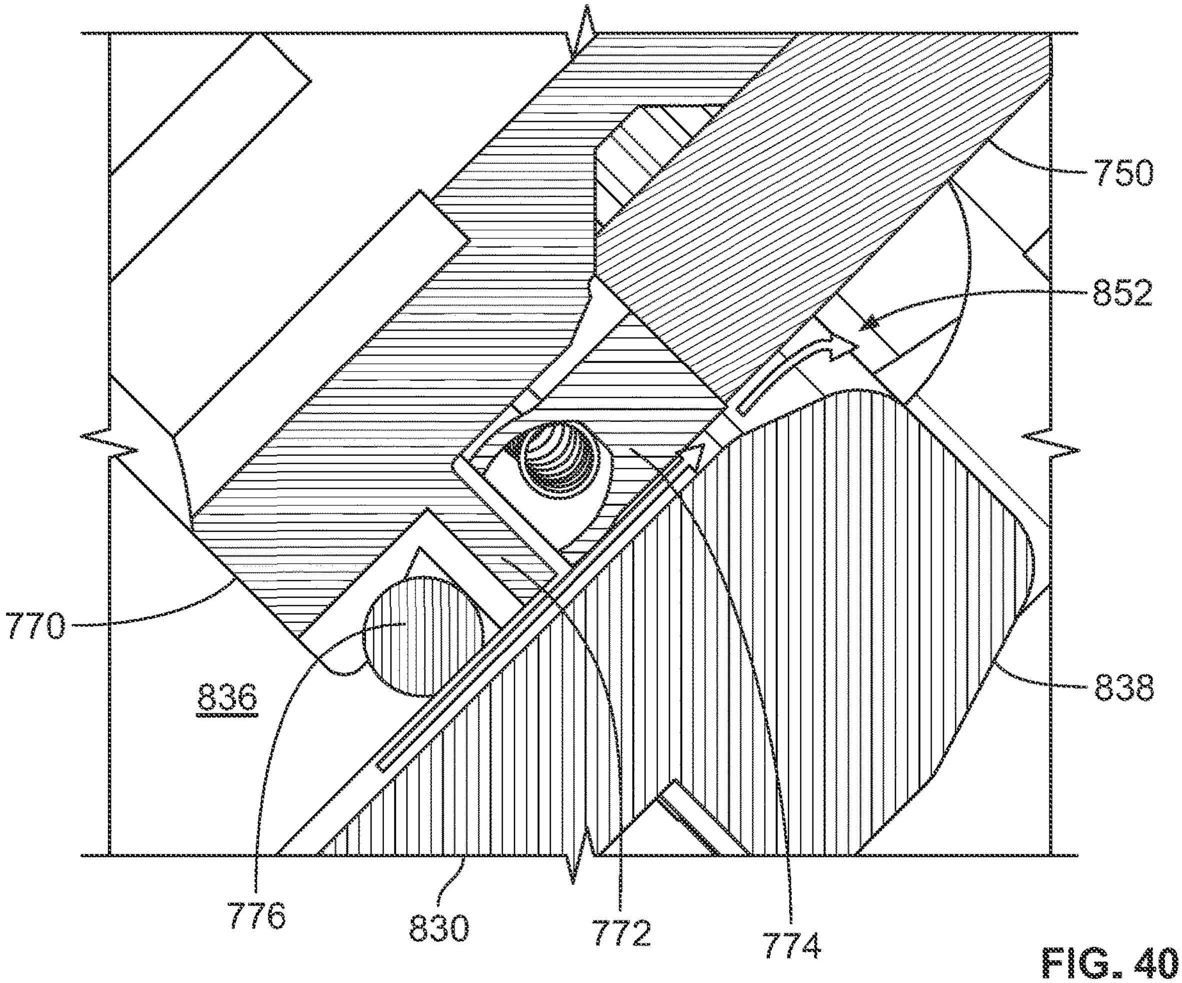
FIG. 40 is an enlarged cross-sectional view of a portion of the cleaning receptacle of FIG. 33 during cleaning of the fueling nozzle of FIG. 31.

FIG. 40 illustrates the vent path 852 through which moisture is vented. The vent path 852 formed between (1) the flow body 830 of the cleaning receptacle 800 and (2) the flow body 750 and the valve seat 770 of the fueling nozzle 700. In the illustrated example, the vent path 852 is defined between (1) the lip 838 of the flow body 830 of the cleaning receptacle 800 and (2) the flow body 750 and the flange 772, the seal 774, and the mechanical wiper 776 of the valve seat 770 of the fueling nozzle 700.

In order to create the vent path 852 with the fueling nozzle 700, the flow body 830 of the cleaning receptacle has a slightly larger inner diameter than that of the flow body 30 of the fueling receptacle 4. For example, the flow body 30 of the fueling receptacle 4 is sized to sealingly engage the seal 774 and/or the mechanical wiper 776 when the fueling nozzle 700 is coupled to the fueling receptacle 4. The flow body 830 of the cleaning receptacle 800 is sized such that a small gap is formed between the flow body 830 and the seal 774 and the mechanical wiper 776 of the fueling nozzle 700 in order to form the vent path 852 when the fueling nozzle 700 is coupled to the cleaning receptacle 800.

Figure 41:
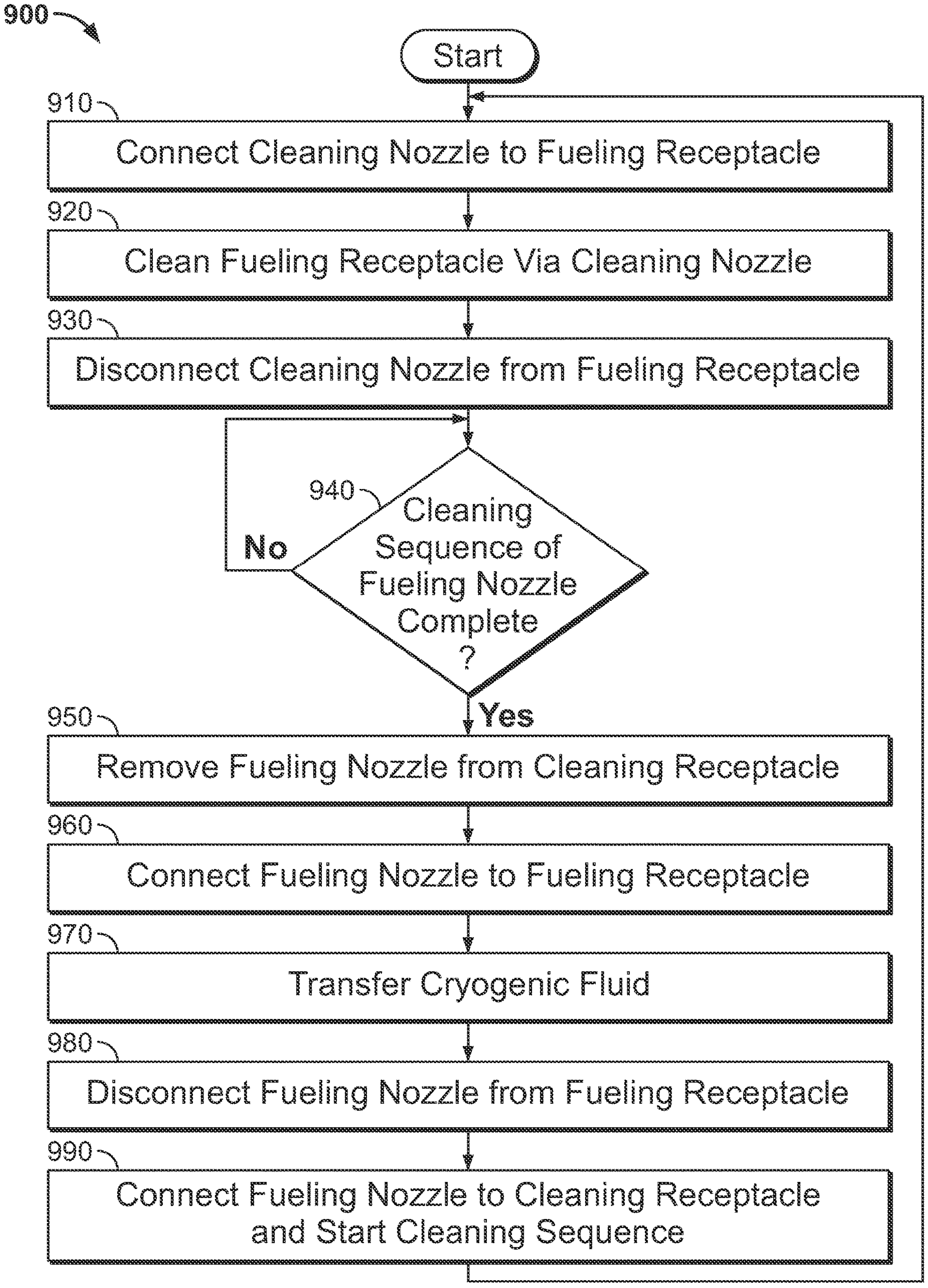
FIG. 41 is a flowchart for cleaning a fueling nozzle and receptacle and using the fueling nozzle and receptacle for filling a tank with cryogenic fluid in accordance with the teachings herein.

Additionally, the cleaning receptacle 800 for the fueling nozzle 700 and the cleaning nozzle 100 for the fueling receptacle 4 are located near each other to facilitate a quick cleaning process of both the fueling nozzle 700 and the fueling receptacle 4 between fueling events. FIG. 41 is a flowchart of a process 900 for cleaning the fueling nozzle 700 and the fueling receptacle 4 and using the fueling nozzle 700 and the fueling receptacle 4 to fill the fill tank 2 with cryogenic fluid in accordance with the teachings herein.

At block 910, the operator 6 connects the cleaning nozzle 100 to the fueling receptacle 4. For example, to connect the cleaning nozzle 100 to the fueling receptacle 4, the operator 6 (1) aligns the slots 144 of the alignment extension 140 of the cleaning nozzle 100 with the bearings 50 of the fueling receptacle 4 and (2) extends the cleaning nozzle 100 toward the fueling receptacle 4 until the flanges of the alignment extension 140 engage the bearings 50 of the fueling receptacle 4. At block 920, the operator cleans the fueling receptacle 4 with the cleaning nozzle 100. For example, the operator 6 causes the cleaning nozzle 100 to spray pressurized air onto the fueling receptacle 4 by pushing the alignment extension 140 against the bearings 50 of the fueling receptacle 4. In other examples, the operator 6 causes a cleaning nozzle (e.g., the cleaning nozzle 200, the cleaning nozzle 300, the cleaning nozzle 400, or the cleaning nozzle 500) to spray the pressurized air by pressing a button (e.g., the button 260, the button 360, the button 460, or the button 560). At block 930, the operator 6 disconnects the cleaning nozzle 100 from the fueling receptacle 4 by pulling the cleaning nozzle 100 away from the fueling receptacle 4.

At block 940, it is determined whether a cleaning sequence for the fueling nozzle 700 is complete. In some examples, the cleaning sequence includes the cleaning receptacle 800 spraying warm air onto the fueling nozzle 700 for a predetermined amount of time (e.g., 3 minutes). For example, the fueling nozzle 700 may include a proximity sensor that detects when the fueling nozzle 700 is coupled to the cleaning receptacle 800. In such examples, the cleaning receptacle 800 is configured to start to spray the warm air for the predetermined amount of time once the fueling nozzle 700 is detected by the proximity sensor. In other examples, the cleaning receptacle 800 may spray the warm air continuously or intermittently for relatively short periods of time such that the cleaning sequence occurs whenever the fueling nozzle 700 is coupled to the cleaning receptacle 800. In response to determining that the cleaning sequence is not complete, the process 900 remains at block 910. Otherwise, in response to determining that the cleaning sequence is complete, the process 900 proceeds to block 950.

At block 950, the operator 6 removes the fueling nozzle 700 from the cleaning receptacle 800. For example, the operator 6 (1) causes the locking mechanism of the fueling nozzle 700, via the rotating handle 730 and/or the pneumatic cylinder, to decouple from the cleaning receptacle 800 and (2) subsequently pulls the fueling nozzle 700 away from the cleaning receptacle 800. At block 960, the operator connects the fueling nozzle 700 to the fueling receptacle 4. For example, the operator 6 (1) aligns the fueling nozzle 700 with the fueling receptacle 4 via the bearings 50 of the fueling receptacle 4 and the end cover 720 of the fueling nozzle 700 and (2) causes the locking mechanism of the fueling nozzle 700, via the rotating handle 730 and/or the pneumatic cylinder, to securely couple the fueling nozzle 700 to the fueling receptacle 4.

At block 970, the operator 6 operates the fueling nozzle 700 to cause cryogenic fluid to transfer from the source tank 3 to the fill tank 2. Features of the cryogenic fluid transfer sequence are further disclosed in commonly owned U.S. Pat. application Ser. No. 17/016,008 and International App. No. PCT/US2020/049872, the disclosures of which are incorporated by reference in their entirety.

Once the fueling sequence is complete, the operator 6 disconnects the fueling nozzle 700 from the fueling receptacle 4 at block 980. For example, the operator 6 (1) causes the locking mechanism of the fueling nozzle 700 to decouple from the fueling receptacle 4 and (2) subsequently pulls the fueling nozzle 700 away from the fueling receptacle 4. At block 990, the operator 6 connects the fueling nozzle 700 to the cleaning receptacle 800 and subsequently starts the cleaning sequence for the fueling nozzle 700. For example, to connect the fueling nozzle 700 to the cleaning receptacle 800, the operator 6 (1) aligns the fueling nozzle 700 with the cleaning receptacle 800 via the bearings 822 of the cleaning receptacle 800 and the end cover 720 of the fueling nozzle 700 and (2) subsequently securely couples the fueling nozzle 700 to the cleaning receptacle 800 via the locking mechanism of the fueling nozzle 700.

Once the cleaning sequence for the fueling nozzle 700 has started, the process 900 returns to block 910. For example, after the operator 6 has (1) cleaned the fueling receptacle 4, (2) started and completed a fueling sequence for the fill tank 2, and (3) started the cleaning sequence for the fueling nozzle 700, the operator 6 may transport the fill tank 2 away from the source tank 3 to enable another operator to (4) approach the source tank 3 with another fill tank, (5) cleaned a corresponding fueling receptacle, (6) start and complete a fueling sequence, and (7) subsequently start another cleaning sequence for the fueling nozzle 700.

An example fueling station for cryogenic fluid comprises a first hose fluidly connected to a source tank for the cryogenic fluid. The example fueling station also comprises a fueling nozzle connected to an end of the first hose and fluidly connected to the source tank via the first hose. The fueling nozzle is configured to securely couple to a fueling receptacle to transfer the cryogenic fluid from the source tank and into a fuel tank. The example fueling station also comprises a cleaning receptacle configured to receive the fueling nozzle and clean the fueling nozzle by spraying air, a second hose configured to transfer pressurized air, and a cleaning nozzle configured to couple to the fueling receptacle and clean the fueling receptacle by spraying the pressurized air.

In some examples, the cleaning nozzle comprises a body including a proximal end and a distal end. The body defines a cavity and a seat adjacent the cavity between the proximal end and the distal end. The cleaning nozzle comprises a nozzle head slidably received by the cavity at the distal end of the body and an alignment extension configured to engage the fueling receptacle. The alignment extension is coupled to, extends beyond, and is configured to slide with the nozzle head. The cleaning nozzle comprises a stem configured to slide axially within the cavity. The stem includes a first end and a second end that is coupled to the nozzle head. The cleaning nozzle comprises a plug coupled to the first end of the stem within the cavity. The plug is configured to slide axially with the stem between a closed position and an open position. The plug is configured to disengage from the seat in the open position to enable pressurized air to travel through the cavity and be sprayed by the nozzle head. The plug is configured to sealingly engage the seat in the closed position to prevent the pressurized air from being sprayed by the nozzle head. The plug is configured to be pushed from the closed position to the open position by the stem when the alignment extension is pressed against the fueling receptacle. The cleaning nozzle comprises a spring configured to bias the plug to the closed position.

In some examples, the cleaning nozzle comprises a body including a proximal end, a distal end, and an outer surface. The body defines a cavity. The cleaning nozzle comprises a nozzle head coupled to and extending from the distal end of the body. The cleaning nozzle comprises a button positioned along the outer surface of the body and configured to control operation of the cleaning nozzle. When the button is released by an operator, the button is configured to prevent pressurized air from flowing through the cavity and being sprayed by the nozzle head. When the button is pressed by the operator, the button is configured to enable the pressurized air to flow through the cavity and be sprayed by the nozzle head to clean the fueling receptacle. The cleaning nozzle comprises a shield positioned between the nozzle head and a portion of the body configured to be held by the operator. The shield is configured to prevent debris from blowing back onto the operator when the nozzle head sprays the pressurized air.

In some examples, the cleaning nozzle comprises a body including a proximal end and a distal end. The body defines a cavity. The cleaning nozzle comprises a nozzle head coupled to and extending from the distal end of the body. The nozzle head defines a plurality of spray holes to spray pressurized air onto the fueling receptacle. The cleaning nozzle comprises a blower at least partially housed in the cavity. The blower defines a blower inlet, a blower outlet, and a blower flow path extending between the blower inlet and the blower outlet. The blower comprises a valve and a lever operatively coupled to the valve. The valve is movably positioned between an open position and a closed position within the blower flow path. The lever is configured to position the valve in the closed position when released by an operator to prevent the pressurized air from flowing through the blower flow path. The lever is configured to position the valve in the open position when pressed by the operator to enable the pressurized air to flow through the nozzle head. The cleaning nozzle comprises an insert housed in the cavity, sealingly coupled to the blower, and defining an insert flow path that is fluidly coupled to the blower outlet. The cleaning nozzle comprises a connector housed in the cavity and sealingly coupled to and fluidly connecting the insert and the nozzle head. The connector and the insert fluidly connect the blower outlet to the plurality of spray holes of the nozzle head.

In some examples, the cleaning receptacle comprises an outer body. The outer body includes an outer wall that extends circumferentially around a center axis of the cleaning receptacle. The outer wall has a first inner surface. The outer body includes a plurality of locating members extending inwardly from the first inner surface toward the center axis. The plurality of locating members are configured to engage an end of the fueling nozzle to facilitate alignment with and prevent rotation of the fueling nozzle relative to the cleaning receptacle. The cleaning receptacle comprises a flow body extending circumferentially around the center axis of the cleaning receptacle. The flow body includes a second inner surface that defines a cavity and a lip at an outer end of the flow body. The lip is configured to securely engage a locking mechanism of the fueling nozzle. The cleaning receptacle comprises a spray body disposed at an inner end of the flow body. The spray body includes a spray head that defines a plurality of spray holes configured to spray air through the cavity of the flow body and onto surfaces of the fueling nozzle when the fueling nozzle is securely coupled to the flow body.

An example cleaning nozzle is for cleaning a fueling receptacle capable of receiving a separate fueling nozzle for transferring cryogenic fluid from a fueling station. The cleaning nozzle comprises a body including a proximal end and a distal end. The body defines a cavity and a seat adjacent the cavity between the proximal end and the distal end. The cleaning nozzle comprises a nozzle head slidably received by the cavity at the distal end of the body and an alignment extension configured to engage a fueling receptacle. The alignment extension is coupled to, extends beyond, and is configured to slide with the nozzle head. The cleaning nozzle comprises a stem configured to slide axially within the cavity. The stem includes a first end and a second end that is coupled to the nozzle head. The cleaning nozzle comprises a plug coupled to the first end of the stem within the cavity. The plug is configured to slide axially with the stem between a closed position and an open position. The plug is configured to disengage from the seat in the open position to enable pressurized air to travel through the cavity and be sprayed by the nozzle head. The plug is configured to sealingly engage the seat in the closed position to prevent the pressurized air from being sprayed by the nozzle head. The plug is configured to be pushed from the closed position to the open position by the stem when the alignment extension is pressed against the fueling receptacle. The cleaning nozzle comprises a spring configured to bias the plug to the closed position.

In some examples, the body defines an inner chamber and an outer chamber of the cavity. The inner chamber and the outer chamber are fluidly connected together when the plug is in the open position.

In some examples, the nozzle head is integrally formed with the alignment extension.

In some examples, the nozzle head includes a plurality of support arms that extend and connect to the alignment extension.

In some examples, the nozzle head includes a plurality of spray holes configured to spray the pressurized air onto the fueling receptacle to clean the fueling receptacle. In some such examples, the plurality of spray holes includes a first set of spray holes configured to spray the pressurized air onto a poppet of the fueling receptacle and a second set of spray holes configured to spray the pressurized air onto a flow body of the fueling receptacle.

In some examples, the alignment extension defines a plurality of slots that are configured to receive locating members of the fueling receptacle to facilitate an operator in aligning the cleaning nozzle with the fueling receptacle. In some such examples, each of the plurality of slots is V-shaped, equally sized, and equidistantly spaced apart with respect to each other to facilitate alignment of the alignment extension with the locating members of the fueling receptacle.

In some examples, the first end of the stem is threadably coupled to the plug. In some such examples, the second end of the stem is threadably coupled to the nozzle head.

In some examples, the plug includes a plug body and a seal fixed to the plug body. The seal of the plug is configured to engage the seat in the closed position. Some such examples further comprise a guide that defines an aperture through which an end of the plug body slidably extends.

Some examples further comprise an end cap received by the proximal end of body. The end cap defines an inlet to the cavity. The inlet is configured to receive the pressurized air from a source.

Some examples further comprise a shield positioned between the nozzle head and a portion of the body configured to be held by an operator. The shield is configured to prevent debris from blowing back onto the operator. In some such examples, the shield includes a plurality of posts. Such examples further comprise a plurality of fasteners configured to couple the plurality of posts of the shield to the nozzle head. In some such examples, the shield includes a plurality of walls each of which is positioned between two of the plurality of posts. Each of the plurality of walls is angled to divert the pressurized air away from a portion of the body to be held by the hands of the operator.

Another example cleaning nozzle is for cleaning a fueling receptacle capable of receiving a separate fueling nozzle for transferring cryogenic fluid from a fueling station. The cleaning nozzle comprises a body including a proximal end, a distal end, and an outer surface. The body defines a cavity. The cleaning nozzle comprises a nozzle head coupled to and extending from the distal end of the body. The cleaning nozzle comprises a button positioned along the outer surface of the body and configured to control operation of the cleaning nozzle. When the button is released by an operator, the button is configured to prevent pressurized air from flowing through the cavity and being sprayed by the nozzle head. When the button is pressed by the operator, the button is configured to enable the pressurized air to flow through the cavity and be sprayed by the nozzle head to clean a fueling receptacle. The cleaning nozzle comprises a shield positioned between the nozzle head and a portion of the body configured to be held by the operator. The shield is configured to prevent debris from blowing back onto the operator when the nozzle head sprays the pressurized air.

Some examples further comprise an alignment extension configured to engage a fueling receptacle. The alignment extension is coupled to and extends longitudinally beyond the nozzle head. In some such examples, the alignment extension defines a plurality of slots that are configured to receive locating members of the fueling receptacle to facilitate the operator in aligning the cleaning nozzle with the fueling receptacle. Further, in some such examples, each of the plurality of slots is equally sized and equidistantly spaced apart with respect to each other to facilitate alignment of the alignment extension with the locating members of the fueling receptacle. Moreover, in some such examples, each of the plurality of slots is V-shaped to further facilitate alignment of the alignment extension with the locating members of the fueling receptacle. Moreover, in some such examples, each of the plurality of slots is L-shaped to facilitate a secure connection between the cleaning nozzle and the fueling receptacle.

In some examples, the nozzle head is integrally formed with the alignment extension.

In some examples, the nozzle head includes a plurality of support arms that extend and connect to the alignment extension.

In some examples, the nozzle head includes a plurality of spray holes configured to spray the pressurized air onto the fueling receptacle to clean the fueling receptacle. In some such examples, the plurality of spray holes includes a first set of spray holes configured to spray the pressurized air onto a poppet of the fueling receptacle and a second set of spray holes configured to spray the pressurized air onto a flow body of the fueling receptacle.

Some examples further comprise a plurality of support braces that extend between and are connected to the body and the alignment extension. In some such examples, the shield comprises a plurality of shield inserts each of which is positioned between a corresponding two of the plurality of support braces. Further, in some such examples, each of the plurality of shield inserts comprises a rear wall and defines an opening. The rear wall is angled to divert the pressurized air through the opening and away from a portion of the body to be held by hands of the operator.

In some examples, the shield is substantially dome-shaped and extends toward a distal end of the alignment extension.

In some examples, the body comprises a barrel and a handle. The barrel defines the cavity through which the pressurized air is to flow. The button is positioned along the handle.

In some examples, the nozzle head is substantially cylindrical and the shield is substantially di s c-shaped.

In some examples, the shield is transparent, translucent, or opaque.

Another example cleaning nozzle is for cleaning a fueling receptacle capable of receiving a separate fueling nozzle for transferring cryogenic fluid from a fueling station. The cleaning nozzle comprises a body including a proximal end and a distal end. The body defines a cavity. The cleaning nozzle comprises a nozzle head coupled to and extending from the distal end of the body. The nozzle head defines a plurality of spray holes to spray pressurized air onto the fueling receptacle. The cleaning nozzle comprises a blower at least partially housed in the cavity. The blower defines a blower inlet, a blower outlet, and a blower flow path extending between the blower inlet and the blower outlet. The blower comprises a valve and a lever operatively coupled to the valve. The valve is movably positioned between an open position and a closed position within the blower flow path. The lever is configured to position the valve in the closed position when released by an operator to prevent the pressurized air from flowing through the blower flow path. The lever is configured to position the valve in the open position when pressed by the operator to enable the pressurized air to flow through the nozzle head. The cleaning nozzle comprises an insert housed in the cavity, sealingly coupled to the blower, and defining an insert flow path that is fluidly coupled to the blower outlet. The cleaning nozzle comprises a connector housed in the cavity and sealingly coupled to and fluidly connecting the insert and the nozzle head. The connector and the insert fluidly connect the blower outlet to the plurality of spray holes of the nozzle head.

Some examples further comprise an alignment extension configured to engage the fueling receptacle. The alignment extension is coupled to and extends longitudinally beyond the nozzle head.

In some such examples, the alignment extension defines a plurality of slots that are configured to receive locating members of the fueling receptacle to facilitate the operator in aligning the cleaning nozzle with the fueling receptacle. Further, in some such examples, each of the plurality of slots is V-shaped, equally sized, and equidistantly spaced apart with respect to each other to facilitate alignment of the alignment extension with the locating members of the fueling receptacle.

In some such examples, the nozzle head is integrally formed with the alignment extension.

In some such examples, the nozzle head includes a plurality of support arms that extend and connect to the alignment extension.

In some such examples, the plurality of spray holes includes a first set of spray holes configured to spray the pressurized air onto a first portion of the fueling receptacle and a second set of spray holes configured to spray the pressurized air onto a second portion of the fueling receptacle. Further, in some such examples, the nozzle head includes an outer surface and a plurality of pins extending outwardly from and beyond the outer surface. Each of the second set of spray holes extends through one of the plurality of pins.

Some such examples further comprise a shield positioned between the nozzle head and a portion of the body configured to be held by the operator. The shield is configured to prevent debris from blowing back onto the operator when the nozzle head sprays the pressurized air. Further, in some such examples, the shield is integrally formed with the distal end of the body. Further, in some such examples, the shield includes a plurality of posts and further comprises a plurality of fasteners configured to couple the plurality of posts of the shield to the nozzle head. Moreover, in some such examples, the shield includes a plurality of walls each of which is positioned between two of the plurality of posts. Each of the plurality of walls is angled to divert the pressurized air away from the portion of the body to be held by the operator.

In some examples, the insert includes a first portion and a second portion. The first portion is sealingly coupled to the blower, and the second portion is securely coupled to the nozzle head. In some such examples, the nozzle head defines a blind hole that is configured to securely receive the insert to couple the insert to the nozzle head.

In some examples, the connector includes a first end defining a first opening and a second end defining a second opening. The first opening is configured to receive the insert to couple the connector to the insert. The second opening is configured to receive the nozzle head to couple the connector to the nozzle head. Some such examples further comprise a first seal configured to form a sealed connection between the connector and the nozzle head. Some such examples further comprise a second seal configured to form a sealed connection between the connector and the insert. Some such examples further comprise a clip configured to engage the insert and the first end of the connector to securely couple the connector to the insert.

In some examples, the body defines an inlet to the cavity and further comprises tubing that fluidly connects the inlet of the cavity to the blower inlet of the blower to receive the pressurized air from the source.

An example cleaning receptacle is for cleaning a fueling nozzle used to transfer cryogenic fluid. The cleaning receptacle comprises an outer body. The outer body includes an outer wall that extends circumferentially around a center axis of the cleaning receptacle. The outer wall has a first inner surface. The outer body includes a plurality of locating members extending inwardly from the first inner surface toward the center axis. The plurality of locating members are configured to engage an end of the fueling nozzle to facilitate alignment with and prevent rotation of the fueling nozzle relative to the cleaning receptacle. The cleaning receptacle comprises a flow body extending circumferentially around the center axis of the cleaning receptacle. The flow body includes a second inner surface that defines a cavity and a lip at an outer end of the flow body. The lip is configured to securely engage a locking mechanism of the fueling nozzle. The cleaning receptacle comprises a spray body disposed at an inner end of the flow body. The spray body includes a spray head that defines a plurality of spray holes configured to spray air through the cavity of the flow body and onto surfaces of the fueling nozzle when the fueling nozzle is securely coupled to the flow body.

In some examples, the second inner surface of the flow body includes a first segment that defines a first portion of the cavity adjacent the inner end, a second segment that defines a second portion of the cavity adjacent the outer end, and a middle segment that defines a middle portion of the cavity axially between the first portion and the second portion. In some such examples, the first portion of the cavity has an outer circumference smaller than that of the second portion of the cavity to deter moisture that is removed from the surfaces of the fueling nozzle by the air from flowing back toward the spray body. Further, in some such examples, the middle portion of the cavity has an outer circumference that transitions between that of the first portion and that of the second portion of the cavity. The middle portion of the cavity is shaped and positioned relative to the plurality of spray holes to direct the moisture removed from the surfaces of the fueling nozzle through a vent path that is formed between the flow body and the fueling nozzle.

In some examples, the flow body is configured to form a vent path with the fueling nozzle. In some such examples, the lip of the flow body is configured to at least partially form the vent path with the fueling nozzle. In some such examples, the plurality of spray holes and the cavity of the flow body are arranged to direct moisture removed from the fueling nozzle by the air through the vent path to prevent the moisture from flowing back onto the surfaces of the fueling nozzle.

In some examples, the outer body further includes a base and side posts. The base is configured to couple to a panel of the station. The base is spaced apart from the outer wall. The side posts extend between and connect to the base and the outer wall.

In some examples, the inner end of the flow body defines internal threads and the spray head of the spray body defines external threads. The spray body is threadably coupled to the flow body via the internal threads and the external threads.

In some examples, the spray head is located at a first end of the spray body. The spray body further comprises a cylindrical wall located at a second end of the spray body. The cylindrical wall includes inner threads configured to threadably receive a tube that provides the air sprayed by the plurality of spray holes.

In some examples, the flow body is configured to be positioned through an opening defined by a panel of a station. In some such examples, the flow body defines a flange that extends radially outward from an outer surface of the flow body. The flange is configured to engage an outer panel surface of the panel of the station when the flow body is positioned through the opening. Further, in some such examples, the inner end of the flow body defines external threads. Moreover, some such examples further comprise a locking nut configured to be threaded onto the flow body via the external threads and engage an inner panel surface of the panel of the station. The locking nut and the flange of the flow body are configured to pin the flow body to the panel. Additionally, in some such examples, the outer body further comprises a base. The outer body is configured to be positioned over the flow body such that the base engages the outer panel surface of the panel of the station. Also, some such examples further comprise fasteners configured to extend through holes defined by the base to securely couple the outer body to the panel of the station.

In some examples, the plurality of spray holes are configured to direct the air onto surfaces of a poppet and a valve seat of the fueling nozzle to inhibit the poppet from freezing in place with respect to the valve seat.

An example method is for operating a fueling station for cryogenic fluid. The fueling station includes a fueling nozzle fluidly connected to a source tank via a hose, a cleaning nozzle for cleaning fueling receptacles, and a cleaning receptacle for mounting and cleaning the fueling nozzle. The method comprises cleaning a fueling receptacle using the cleaning nozzle to blow air onto one or more surfaces of the fueling receptacle, disconnecting the cleaning nozzle from the fueling receptacle, and removing the fueling nozzle from the cleaning receptacle upon completion of a first cleaning sequence. The method comprises transferring the cryogenic fluid from the source tank to a fill tank via the hose, the fueling nozzle, and the fueling receptacle by securely coupling the fueling nozzle to the fueling receptacle. The method comprises reconnecting the fueling nozzle to the cleaning receptacle when the transferring of the cryogenic fluid is complete.

Some examples further comprise connecting the cleaning nozzle to the fueling receptacle prior to cleaning the fueling receptacle via the cleaning nozzle. In some such examples, connecting the cleaning nozzle to the fueling receptacle includes aligning a plurality of slots of the cleaning nozzle with a plurality of locating members of the fueling receptacle and extending the cleaning nozzle toward the fueling receptacle until flanges of the cleaning nozzle engage the locating members of the fueling receptacle.

Some examples further comprise pushing an alignment extension of the cleaning nozzle against locating members of the fueling receptacle to cause the cleaning nozzle to spray pressurized air.

Some examples further comprise pressing a button or a lever of the cleaning nozzle to cause the cleaning nozzle to spray pressurized air.

Some examples further comprise conducting the first cleaning sequence for the fueling nozzle. In some such examples, the first cleaning sequence includes spraying air onto surface of the fueling nozzle via the cleaning receptacle. Further, in some such examples, spraying the air via the cleaning receptacle includes spraying the air for a predetermined amount of time. Further, in some such examples, spraying the air via the cleaning receptacle includes spraying the air continuously or intermittently. Further, in some such examples, the air is sprayed for the first cleaning sequence when the fueling nozzle is detected to be coupled to the cleaning receptacle. Moreover, some such examples further comprise detecting that the fueling nozzle is coupled to the cleaning receptacle via a proximity sensor of the fueling nozzle.

In some examples, removing the fueling nozzle from the cleaning receptacle includes causing a locking mechanism of the fueling nozzle to decouple from a flow body of the cleaning receptacle and subsequently pulling the fueling nozzle away from the cleaning receptacle. In some such examples, securely coupling the fueling nozzle of the fueling station to the fueling receptacle includes aligning slots of the fueling nozzle with locating members of the fueling receptacle, extending the fueling nozzle toward the fueling receptacle until flanges of the fueling nozzle engage the locating members of the fueling receptacle, and causing a locking mechanism of the fueling nozzle to securely couple the fueling nozzle to the fueling receptacle.

Some examples further comprise, prior to reconnecting the fueling nozzle to the cleaning receptacle, decoupling the fueling nozzle from the fueling receptacle. In some such examples, decoupling the fueling nozzle from the fueling receptacle includes causing a locking mechanism of the fueling nozzle to decouple from the fueling receptacle and subsequently pulling the fueling nozzle away from the fueling receptacle. Some such examples further comprise starting a second cleaning sequence for the fueling nozzle upon reconnecting the fueling nozzle to the cleaning receptacle. Further in some such examples, the second cleaning sequence includes spraying air, via the cleaning receptacle, onto surface of the fueling nozzle. Moreover, in some such examples, spraying the air via the cleaning receptacle includes spraying the air continuously, intermittently, or for a predetermined amount of time. Additionally, in some such examples, the second cleaning sequence is started in response to detecting that the fueling nozzle is coupled to the cleaning receptacle via a proximity sensor of the fueling nozzle.

Another example method is for operating a fueling station for cryogenic fluid. The fueling station includes a fueling nozzle fluidly connected to a source tank via a hose, a cleaning nozzle for cleaning fueling receptacles, and a cleaning receptacle for mounting and cleaning the fueling nozzle. The method comprises performing a first cleaning sequence that includes blowing air, via the cleaning receptacle, onto surfaces of the fueling nozzle while the fueling nozzle is mounted in the cleaning receptacle. The method comprises cleaning a fueling receptacle that is fluidly connected to a fill tank using the cleaning nozzle to blow air onto one or more surfaces of the fueling receptacle, disconnecting the cleaning nozzle from the fueling receptacle, and removing the fueling nozzle from the cleaning receptacle. The method comprises transferring the cryogenic fluid from the source tank to a fill tank via the hose, the fueling nozzle, and the fueling receptacle by securely coupling the fueling nozzle to the fueling receptacle. The method comprises reconnecting the fueling nozzle to the cleaning receptacle when the transferring of the cryogenic fluid is complete.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A cleaning nozzle for cleaning a fueling receptacle configured to receive a separate fueling nozzle for transferring cryogenic fluid from a fueling station, the cleaning nozzle comprising:

a body including a proximal end and a distal end, wherein the body defines a cavity;

a nozzle head coupled to and extending from the distal end of the body, wherein the nozzle head defines a plurality of spray holes to spray pressurized air onto the fueling receptacle;

a blower at least partially housed in the cavity, wherein the blower comprises a blower body at least partially enclosed by the body of the cleaning nozzle that defines a blower inlet, a blower outlet, and a blower flow path extending between the blower inlet and the blower outlet, wherein the blower further comprises a valve and a lever operatively coupled to the valve, wherein the valve is movably positioned between an open position and a closed position within the blower flow path, wherein the lever is configured to position the valve in the closed position when released by an operator to prevent the pressurized air from flowing through the blower flow path, and wherein the lever is configured to position the valve in the open position when pressed by the operator to enable the pressurized air to flow through the nozzle head;

an insert housed in the cavity, sealingly coupled to the blower body of the blower, and defining an insert flow path that is fluidly coupled to the blower outlet; and a connector housed in the cavity and sealingly coupled to and fluidly connecting the insert and the nozzle head, wherein the connector and the insert fluidly connect the blower outlet to the plurality of spray holes of the nozzle head.

2. The cleaning nozzle of claim 1, further comprising an alignment extension configured to engage the fueling receptacle, wherein the alignment extension is coupled to and extends longitudinally beyond the nozzle head.

3. The cleaning nozzle of claim 2, wherein the alignment extension defines a plurality of slots that are configured to receive locating members of the fueling receptacle to facilitate the operator in aligning the cleaning nozzle with the fueling receptacle.

4. The cleaning nozzle of claim 3, wherein each of the plurality of slots is V-shaped, equally sized, and equidistantly spaced apart with respect to each other to facilitate alignment of the alignment extension with the locating members of the fueling receptacle.

5. The cleaning nozzle of claim 2, wherein the nozzle head is integrally formed with the alignment extension.

6. The cleaning nozzle of claim 2, wherein the nozzle head includes a plurality of support arms that extend and connect to the alignment extension.

7. The cleaning nozzle of claim 2, wherein the plurality of spray holes includes a first set of spray holes configured to spray the pressurized air onto a first portion of the fueling receptacle and a second set of spray holes configured to spray the pressurized air onto a second portion of the fueling receptacle.

8. The cleaning nozzle of claim 1, wherein the nozzle head includes an outer surface and a plurality of pins extending outwardly from and beyond the outer surface, wherein at least one of the plurality of spray holes of the nozzle head extends through at least one of the plurality of pins.

9. The cleaning nozzle of claim 2, further comprising a shield positioned between the nozzle head and a portion of the body configured to be held by the operator, wherein the shield is configured to prevent debris from blowing back onto the operator when the nozzle head sprays the pressurized air.

10. The cleaning nozzle of claim 9, wherein the shield includes a plurality of posts configured to receive a plurality of fasteners to couple the plurality of posts of the shield to the nozzle head.

11. The cleaning nozzle of claim 10, wherein the shield includes a plurality of walls each of which is positioned between two of the plurality of posts, wherein each of the plurality of walls is angled to divert the pressurized air away from the portion of the body to be held by the operator.

12. The cleaning nozzle of claim 1, wherein the insert includes a first portion and a second portion, wherein the first portion is sealingly coupled to the blower, and wherein the second portion is securely coupled to the nozzle head.

13. The cleaning nozzle of claim 1, wherein the connector includes a first end defining a first opening and a second end defining a second opening, wherein the first opening is configured to receive the insert to couple the connector to the insert, wherein the second opening is configured to receive the nozzle head to couple the connector to the nozzle head.

14. The cleaning nozzle of claim 13, further comprising a clip configured to engage the insert and the first end of the connector to securely couple the connector to the insert.

15. The cleaning nozzle of claim 1, wherein the body defines an inlet to the cavity, and further comprising tubing that fluidly connects the inlet of the cavity to the blower inlet of the blower to receive the pressurized air from the source.

* * * * *